United States Patent
Hu et al.

(10) Patent No.: US 12,136,970 B2
(45) Date of Patent: Nov. 5, 2024

(54) DATA TRANSMISSION METHOD AND RELATED APPARATUS

(71) Applicant: HUAWEI TECHNOLOGIES CO., LTD., Shenzhen (CN)

(72) Inventors: Mengshi Hu, Shenzhen (CN); Jian Yu, Shenzhen (CN); Ming Gan, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 7 days.

(21) Appl. No.: 17/994,045

(22) Filed: Nov. 25, 2022

(65) Prior Publication Data
US 2023/0121851 A1 Apr. 20, 2023

Related U.S. Application Data

(63) Continuation of application No. PCT/CN2021/091501, filed on Apr. 30, 2021.

(30) Foreign Application Priority Data

May 28, 2020 (CN) .......................... 202010470338.9
Jul. 22, 2020 (CN) .......................... 202010710446.9

(51) Int. Cl.
*H04L 23/02* (2006.01)
*H04B 7/0452* (2017.01)
*H04L 5/00* (2006.01)

(52) U.S. Cl.
CPC ......... *H04B 7/0452* (2013.01); *H04L 5/0053* (2013.01)

(58) Field of Classification Search
CPC ............ H04W 84/12; H04W 52/0229; H04W 74/0833; H04L 5/0053; H04L 27/2602;
(Continued)

(56) References Cited

U.S. PATENT DOCUMENTS

2015/0256309 A1 9/2015 Tong et al.
2017/0064718 A1* 3/2017 Bharadwaj ........... H04B 7/0452
(Continued)

FOREIGN PATENT DOCUMENTS

CN 105589506 A 5/2016
CN 108199820 A 6/2018
(Continued)

OTHER PUBLICATIONS

IEEE 802.11-20/0380r0, Sameer Vermani et al, U-SIG Structure and Preamble Processing, 10 pages.
(Continued)

*Primary Examiner* — Khai Tran
(74) *Attorney, Agent, or Firm* — HAUPTMAN HAM, LLP

(57) ABSTRACT

A data transmission method includes generating a signaling field of a PPDU, where a channel bandwidth for transmitting the PPDU includes at least two frequency segments, which include a first frequency segment, and the channel bandwidth includes an RU for MU-MIMO transmission; the signaling field includes a common field and a user-specific field, the user-specific field includes a user field corresponding to the RU, and the user field is a user field of a station to which the RU is allocated and that parks on the first frequency segment; and the common field includes a resource unit allocation subfield corresponding to the RU, indicating the RU and a quantity of user fields corresponding to the RU; and sending the signaling field on the first frequency segment. Some embodiments are applied to a WLAN system that supports 802.11be standard.

20 Claims, 45 Drawing Sheets

(58) Field of Classification Search
CPC ............ H04L 27/2613; H04L 27/2607; H04B 7/0452; H04B 7/0626
USPC ........................................ 375/262, 260, 267
See application file for complete search history.

(56) References Cited

U.S. PATENT DOCUMENTS

| | | | | |
|---|---|---|---|---|
| 2018/0160429 | A1* | 6/2018 | Seok | H04L 1/0075 |
| 2019/0007977 | A1* | 1/2019 | Asterjadhi | H04W 74/0833 |
| 2020/0329519 | A1* | 10/2020 | Cao | H04L 5/0046 |
| 2023/0066731 | A1* | 3/2023 | Gan | H04W 72/23 |
| 2023/0094276 | A1* | 3/2023 | Huang | H04L 5/001 |
| | | | | 370/329 |

FOREIGN PATENT DOCUMENTS

| | | |
|---|---|---|
| CN | 108432173 A | 8/2018 |
| CN | 110140374 A | 8/2019 |
| CN | 110768757 A | 2/2020 |

OTHER PUBLICATIONS

IEEE 802.11-20/0439r0, Jianhan Liu, Efficient EHT Preamble Design, Mar. 2020, 10 pages.
IEEE 802.11-20/0587r0, Tianyu Wu, Minutes 802.11 be PHY ad hoc Telephone Conferences, Apr. 2020, Apr. 2020, 7 pages.
IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.
IEEE P802.11ax/D4.3, Aug. 2019, Draft Standard for Information technology—Tele-communications and information exchange between systems Local and metropolitan area networks—Specific requirements, 782 pages.
International Search Report issued in corresponding International Application No. PCT/CN2021/091501, dated Jul. 27, 2021, pp. 1-9.
Chinese Office Action issued in corresponding Chinese Application No. 202010710446.9, dated Jun. 16, 2022, pp. 1-12.

* cited by examiner

| | First legacy preamble field | First U-SIG | First EHT-SIG |
|---|---|---|---|
| First 80 MHz | | | |
| Second 80 MHz | Second legacy preamble field | Second U-SIG | Second EHT-SIG |
| Third 80 MHz | Third legacy preamble field | Third U-SIG | Third EHT-SIG |
| Fourth 80 MHz | Fourth legacy preamble field | Fourth U-SIG | Fourth EHT-SIG |

FIG. 6B

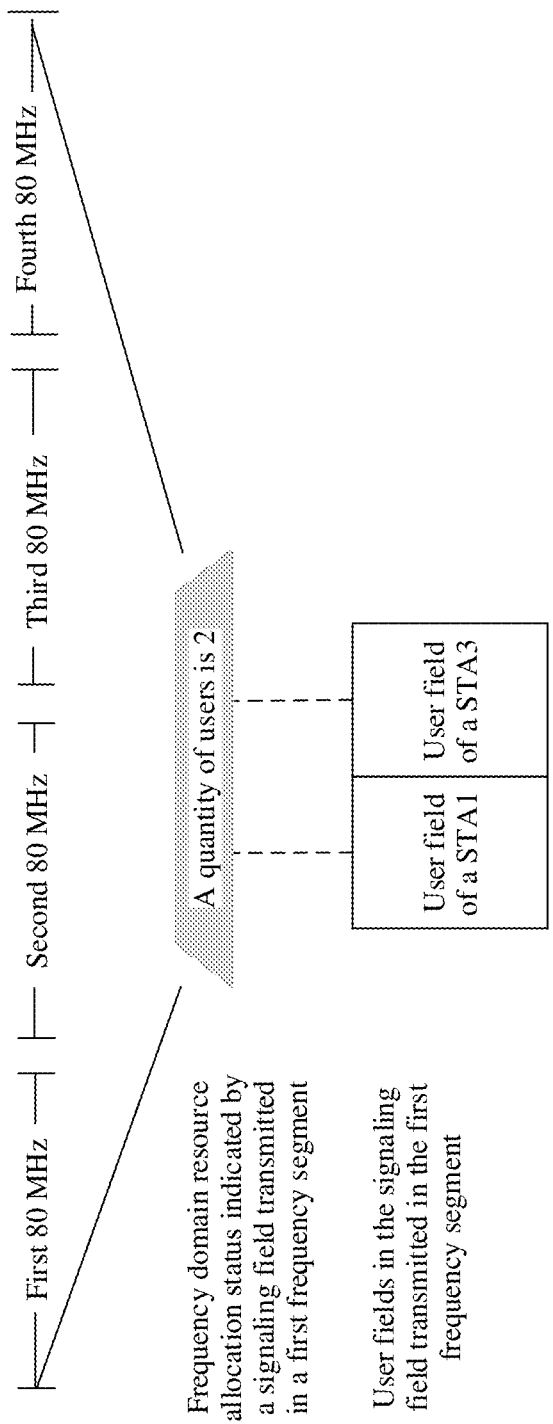

| Resource unit allocation subfield 1 | Resource unit allocation subfield 4 | Resource unit allocation subfield 9 | User field 1 | User field 2 | User field 3 | User field 6 | User field 8 |
|---|---|---|---|---|---|---|---|
| Resource unit allocation subfield indication field (1001000010000000) | | | | | | | |
| Resource unit allocation subfield 3 | Resource unit allocation subfield 7 | ⋮ | User field 4 | User field 5 | User field 7 | ⋮ | ⋮ |
| Resource unit allocation subfield indication field (0010001000000000) | | | | | | | |

Signaling field transmitted on a CC1

Signaling field transmitted on a CC2

FIG. 20C

| Signaling field transmitted on a CC1 ... | Resource unit allocation subfield indication field (1001000000000000) | Resource unit allocation subfield 1 | Resource unit allocation subfield 4 | ... | User field 1 | User field 2 | User field 3 | User field 6 ... |
|---|---|---|---|---|---|---|---|---|
| Signaling field transmitted on a CC2 ... | Resource unit allocation subfield indication field (0010001010000000) | Resource unit allocation subfield 3 | Resource unit allocation subfield 7 | Resource unit allocation subfield 9 | User field 4 | User field 5 | User field 7 | User field 8 ... |

FIG. 20D

DATA TRANSMISSION METHOD AND RELATED APPARATUS

CROSS-REFERENCE TO RELATED APPLICATIONS

This application is a continuation of International Application No. PCT/CN2021/091501, filed on Apr. 30, 2021, which claims priority to Chinese Patent Application No. 202010470338.9, filed on May 28, 2020 and Chinese Patent Application No. 202010710446.9, filed on Jul. 22, 2020. All of the aforementioned patent applications are hereby incorporated in entirety by reference.

BACKGROUND

With development of a wireless local area network (wireless local area network, WLAN), an orthogonal frequency division multiple access (orthogonal frequency division multiple access, OFDMA) technology is newly introduced, and an entire bandwidth is divided into a plurality of resource units (resource unit, RU). In other words, a frequency domain resource is allocated to a user in a unit of resource unit instead of channel. For example, a 20 MHz channel includes a plurality of RUs, which is a 26-tone RU, a 52-tone RU, or a 106-tone RU. Tone indicates a quantity of subcarriers. In addition, the RU further is a 242-tone RU, a 484-tone RU, a 996-tone RU, or the like.

In 802.11ax, a channel bandwidth of a physical layer protocol data unit (PHY protocol data unit, PPDU) sent by an access point is allocated to a plurality of stations to transmit data. A high efficiency signal field (High Efficient Signal Field, HE-SIG-B) of the PPDU includes a user-specific field, and the user-specific field includes user fields of the plurality of stations.

With development of WLAN technologies, to enable a PPDU transmitted by an access point to support more station users, more user fields need to be transmitted in a signaling field in the PPDU.

SUMMARY

Some embodiments provide a data transmission method and a related apparatus, to simplify a user field in a signaling field of a PPDU.

Some embodiments provide a data transmission method, including: generating a signaling field of a physical layer protocol data unit PPDU, where a channel bandwidth for transmitting the PPDU includes at least two frequency segments, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment; the signaling field includes a common field and a user-specific field, the user-specific field includes a user field corresponding to the RU, and the user field corresponding to the RU is a user field of the station that is of the plurality of stations and that parks on the first frequency segment; and the common field includes a resource unit allocation subfield corresponding to the RU, indicating the RU and a quantity of user fields corresponding to the RU; and sending the signaling field on the first frequency segment. The method is used, for example, in an OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, a quantity that is of user fields corresponding to the RU and that is indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an RU for MU-MIMO transmission.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a station identifier indication field and a spatial stream allocation indication field. The station identifier indication field indicates a station identifier corresponding to the user field, the spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the RU for MU-MIMO transmission is allocated, that is, determine a sequence number of the station among the stations to which the RU for MU-MIMO transmission is allocated. In some embodiments, an allocated spatial stream is determined based on an index that indicates a spatial stream and that is included in the user field.

In some embodiments, the common field includes one or more resource unit allocation subfields, and at least one RU indicated by any resource unit allocation subfield is allocated to the station parking on the first frequency segment. In some embodiments, the resource unit allocation subfield of the signaling field includes a resource unit allocation subfield indicating RU allocation to a station parking on the first frequency segment, and does not include a resource unit allocation subfield indicating RU allocation to a station not parking on the first frequency segment. In some embodiments, a quantity of resource unit allocation subfields in the signaling field is reduced, reducing overheads of the signaling field.

Some embodiments provide a data transmission method, including: generating a signaling field of a physical layer protocol data unit PPDU, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; the signaling field includes a user field of the station that is of the plurality of stations and that parks on the first frequency segment, and a field indicating an MU-MIMO user quantity, where the field indicating the MU-MIMO user quantity indicates a quantity of user fields of stations that are of the plurality of stations and that park on the first frequency segment; and sending the signaling field on the first frequency segment. The method is applied, for example, in a non-OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the MU-MIMO user quantity indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an MU-MIMO frequency domain resource for MU-MIMO transmission.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In some embodiments, the signaling field includes a common field and a user-specific field. The user-specific field includes the user field, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations.

The common field includes the field indicating the MU-MIMO user quantity, a total MU-MIMO user quantity indication field, and a field indicating a start location. The total MU-MIMO user quantity indication field indicates a quantity of the plurality of stations, and the field indicating the start location indicates a start location, in the station sequence, of the station parking on the first frequency segment.

In some embodiments, the user field includes a user field of a station parking on the frequency segment, and a station receiving the PPDU further determines, according to the total MU-MIMO user quantity indication field, the field indicating the MU-MIMO user quantity, and the subfield indicating the start location in the common field, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field. In addition, compared with indicating, in each user field, a location of a station corresponding to the user field in the station sequence, indicating, in the common field, the location of the station corresponding to the user field in the station sequence reduces overheads of the signaling field.

Some embodiments provide a data transmission method, including:
generating a signaling field of a PPDU, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment;
the signaling field includes a common field and a user-specific field, where the user-specific field includes a user field of the station parking on the first frequency segment, the user field includes a field indicating a station identifier of a station corresponding to the user field and a spatial stream allocation indication field, the spatial stream allocation indication field indicates a spatial stream allocated to each of the plurality of stations according to a station sequence corresponding to the spatial stream allocation, and the station sequence includes an arrangement order of the plurality of stations; and the common field includes a total MU-MIMO user quantity indication field and a bitmap, where the total MU-MIMO user quantity indication field indicates a quantity of the plurality of stations, and the bitmap indicates a start location, in the station sequence, of the station that is of the plurality of stations and that parks on the first frequency segment; and sending the signaling field on the first frequency segment. The method is applied, for example, in a non-OFDMA scenario.

In some embodiments, the user field includes a user field of a station parking on the frequency segment, and a station receiving the PPDU further determines, according to the total MU-MIMO user quantity indication field and the bitmap, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In addition, compared with indicating, in each user field, a location of a station corresponding to the user field in the station sequence, indicating, in the common field, the location of the station corresponding to the user field in the station sequence reduces overheads of the signaling field.

Some embodiments provide a data transmission method, including: generating a signaling field of a PPDU, where a channel bandwidth for transmitting the PPDU includes at least two frequency segments, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment; the signaling field includes a common field and a user-specific field, and the common field includes a resource unit allocation subfield corresponding to the RU, indicating the RU and a quantity of user fields corresponding to the RU; the user-specific field includes the user fields corresponding to the RU, and the user fields corresponding to the RU are user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and sending the signaling field on the first frequency segment. The method is used, for example, in an OFDMA scenario.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the user field of the STA not parking on the frequency segment is padded with a null user field. In some embodiments, the sequence location of the user field of the STA that participates in MU-MIMO transmission and that parks on the frequency segment does not change in user fields corresponding to stations receiving the PPDU, so that a signaling field transmitted on each frequency segment accurately indicates a user field corresponding to an RU for MU-MIMO transmission.

Some embodiments provide a data transmission method, including: generating a signaling field of a physical layer protocol data unit PPDU, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; the signaling field includes user fields of the plurality of stations and a field indicating an MU-MIMO user quantity, where the field indicating the MU-MIMO user quantity indicates a quantity of user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and sending the signaling field on the first frequency segment. The method is applied, for example, in a non-OFDMA scenario.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the user field of the STA not parking on the frequency segment is padded with a null user field. In some embodiments, the sequence location of the user field of the STA that participates in MU-MIMO transmission and that parks on the frequency segment does not change in user fields corresponding to stations receiving the PPDU, so that a signaling field transmitted on each frequency segment accurately indicates a user field corresponding to a frequency domain resource for MU-MIMO transmission.

Some embodiments provide a data transmission method, including: A first station parking on a first frequency segment receives a signaling field of a physical layer protocol data unit PPDU on the first frequency segment, where a channel bandwidth for transmitting the PPDU includes at least two frequency segments, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment; the signaling field includes a common field and a user-specific field, the user-specific field includes a user field corresponding to the RU, and the user field corresponding to the RU is a user field of the station that is of the plurality of stations and that parks on the first frequency segment; and the common field includes a resource unit allocation subfield corresponding to the RU, indicating the RU and a quantity of user fields corresponding to the RU; and the first station obtains, from the signaling field, a user field carrying an identifier of the first station, and obtains data transmitted on an RU corresponding to the user field carrying the identifier of the first station. The method is used, for example, in an OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, a quantity that is of user fields corresponding to the RU and that is indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an RU for MU-MIMO transmission. A station determines an RU allocated to the station based on a sequence location of a user field including a station identifier of the station in a plurality of user fields.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a station identifier indication field and a spatial stream allocation indication field. The station identifier indication field indicates a station identifier corresponding to the user field, the spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the RU for MU-MIMO transmission is allocated, that is, determine a sequence number of the station among the stations to which the RU for MU-MIMO transmission is allocated. In some embodiments, an allocated spatial stream is determined based on an index that indicates a spatial stream and that is included in the user field.

In some embodiments, the common field includes one or more resource unit allocation subfields, and at least one RU indicated by any resource unit allocation subfield is allocated to the station parking on the first frequency segment. In some embodiments, the resource unit allocation subfield of the signaling field includes a resource unit allocation subfield indicating RU allocation to a station parking on the first frequency segment, and does not include a resource unit allocation subfield indicating RU allocation to a station not parking on the first frequency segment. In some embodiments, a quantity of resource unit allocation subfields in the signaling field is reduced, reducing overheads of the signaling field.

Some embodiments provide a data transmission method, including: A first station parking on a first frequency segment receives a signaling field of a physical layer protocol data unit PPDU on the first frequency segment, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; and the signaling field includes a user field of the station that is of the plurality of stations and that parks on the first frequency segment, and a field indicating an MU-MIMO user quantity, where the field indicating the MU-MIMO user quantity indicates a quantity of user fields of stations that are of the plurality of stations and that park on the first frequency segment; and the first station obtains, from the signaling field, a user field carrying an identifier of the first station, and obtains data transmitted on an RU corresponding to the user field carrying the identifier of the first station. The method is applied, for example, in a non-OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the MU-MIMO user quantity indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an MU-MIMO frequency domain resource for MU-MIMO transmission.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In some embodiments, the signaling field includes a common field and a user-specific field. The user-specific field includes the user field, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations.

The common field includes the field indicating the MU-MIMO user quantity, a total MU-MIMO user quantity indication field, and a field indicating a start location. The total MU-MIMO user quantity indication field indicates a quantity of the plurality of stations, and the field indicating the start location indicates a start location, in the station sequence, of the station parking on the first frequency segment.

In some embodiments, the user field includes a user field of a station parking on the frequency segment, and a station receiving the PPDU further determines, according to the total MU-MIMO user quantity indication field, the field indicating the MU-MIMO user quantity, and the subfield indicating the start location in the common field, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field. In addition, compared with indicating, in each user field, a location of a station corresponding to the user field in the station sequence, indicating, in the common field, the location of the station corresponding to the user field in the station sequence reduces overheads of the signaling field.

Some embodiments provide a data transmission method, including:

A first station parking on a first frequency segment receives a signaling field of a PPDU on the first frequency segment, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment;

the signaling field includes a common field and a user-specific field, where the user-specific field includes a user field of the station parking on the first frequency segment, the user field includes a field indicating a station identifier of a station corresponding to the user field and a spatial stream allocation indication field, the spatial stream allocation indication field indicates a spatial stream allocated to each of the plurality of stations according to a station sequence corresponding to the spatial stream allocation, and the station sequence includes an arrangement order of the plurality of stations; and the common field includes a total MU-MIMO user quantity indication field and a bitmap, where the total MU-MIMO user quantity indication field indicates a quantity of the plurality of stations, and the bitmap indicates a start location, in the station sequence, of the station that is of the plurality of stations and that parks on the first frequency segment;

the first station obtains, from the signaling field, a user field carrying an identifier of the first station, and obtains data transmitted on an RU corresponding to the user field carrying the identifier of the first station. The method is applied, for example, in a non-OFDMA scenario.

In some embodiments, the user field includes a user field of a station parking on the frequency segment, and a station receiving the PPDU further determines, according to the total MU-MIMO user quantity indication field and the bitmap, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In addition, compared with indicating, in each user field, a location of a station corresponding to the user field in the station sequence, indicating, in the common field, the location of the station corresponding to the user field in the station sequence reduces overheads of the signaling field.

Some embodiments provide a data transmission method, including: A first station parking on a first frequency segment receives a signaling field of a physical layer protocol data unit PPDU on the first frequency segment, where a channel bandwidth for transmitting the PPDU includes at least two frequency segments, the at least two frequency segments include a first frequency segment, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment; the signaling field includes a common field and a user-specific field, and the common field includes a resource unit allocation subfield corresponding to the RU, indicating the RU and a quantity of user fields corresponding to the RU; the user-specific field includes the user fields corresponding to the RU, and the user fields corresponding to the RU are user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and the first station obtains, from the signaling field, a user field carrying an identifier of the first station, and obtains data transmitted on an RU corresponding to the user field carrying the identifier of the first station.

The method is used, for example, in an OFDMA scenario. In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the user field of the STA not parking on the frequency segment is padded with a null user field. In some embodiments, the sequence location of the user field corresponding to the STA that participates in MU-MIMO transmission and that parks on the frequency segment does not change in user fields corresponding to stations receiving the PPDU, so that a signaling field transmitted on each frequency segment accurately indicates a user field corresponding to an RU for MU-MIMO transmission. In some embodiments, a station determines an RU allocated to the station based on a sequence location of a user field including a station identifier of the station in a plurality of user fields.

Some embodiments provide a data transmission method, including: A first station parking on a first frequency segment receives a signaling field of a physical layer protocol data unit PPDU on the first frequency segment, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; the signaling field includes user fields of the plurality of stations and a field indicating an MU-MIMO user quantity, where the field indicating the MU-MIMO user quantity indicates a quantity of user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and the first station obtains, from the signaling field, a user field carrying an identifier of the first station, and obtains data transmitted on an RU corresponding to the user field carrying the identifier of the first station. The method is applied, for example, in a non-OFDMA scenario.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment.

Some embodiments provide a data transmission apparatus, including:
  a processing unit, configured to generate a signaling field of a physical layer protocol data unit PPDU, where a channel bandwidth for transmitting the PPDU includes at least two frequency segments, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment;
  the signaling field includes a common field and a user-specific field, the user-specific field includes a user field corresponding to the RU, and the user field corresponding to the RU is a user field of the station that is of the plurality of stations and that parks on the first frequency segment; and
  the common field includes a resource unit allocation subfield corresponding to the RU, indicating the RU and a quantity of user fields corresponding to the RU; and
  a sending unit, configured to send the signaling field on the first frequency segment.

The data transmission apparatus is, for example, a communication apparatus or an access point. Alternatively, the data transmission apparatus is deployed in a communication apparatus or an access point. The data transmission apparatus is used, for example, in an OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, a quantity that is of user fields corresponding to the RU and that is indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an RU for MU-MIMO transmission.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a station identifier indication field and a spatial stream allocation indication field. The station identifier indication field indicates a station identifier corresponding to the user field, the spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the RU for MU-MIMO transmission is allocated, that is, determine a sequence number of the station among the stations to which the RU for MU-MIMO transmission is allocated. In some embodiments, an allocated spatial stream is determined based on an index that indicates a spatial stream and that is included in the user field.

In some embodiments, the common field includes one or more resource unit allocation subfields, and at least one RU indicated by any resource unit allocation subfield is allocated to the station parking on the first frequency segment. In some embodiments, the resource unit allocation subfield of the signaling field includes a resource unit allocation subfield indicating RU allocation to a station parking on the first frequency segment, and does not include a resource unit allocation subfield indicating RU allocation to a station not parking on the first frequency segment. In some embodiments, a quantity of resource unit allocation subfields in the signaling field is reduced, reducing overheads of the signaling field.

Some embodiments provide a data transmission apparatus, including:
  a processing unit, configured to generate a signaling field of a physical layer protocol data unit PPDU, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; and the signaling field includes a user field of the station that is of the plurality of stations and that parks on the first frequency segment, and a field indicating an MU-MIMO user quantity, where the field indicating the MU-MIMO user quantity indicates a quantity of user fields of stations that are of the plurality of stations and that park on the first frequency segment; and
  a sending unit, configured to send the signaling field on the first frequency segment.

The data transmission apparatus is, for example, a communication apparatus or an access point. Alternatively, the data transmission apparatus is deployed in a communication apparatus or an access point. The data transmission apparatus is used, for example, in a non-OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the MU-MIMO user quantity indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an MU-MIMO frequency domain resource for MU-MIMO transmission.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In some embodiments, the signaling field includes a common field and a user-specific field. The user-specific field includes the user field, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations.

The common field includes the field indicating the MU-MIMO user quantity, a total MU-MIMO user quantity indication field, and a field indicating a start location. The total MU-MIMO user quantity indication field indicates a quantity of the plurality of stations, and the field indicating the start location indicates a start location, in the station sequence, of the station parking on the first frequency segment.

In some embodiments, the user field includes a user field of a station parking on the frequency segment, and a station receiving the PPDU further determines, according to the total MU-MIMO user quantity indication field, the field indicating the MU-MIMO user quantity, and the subfield indicating the start location in the common field, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field. In addition, compared with indicating, in each user field, a location of a station corresponding to the user field in the station sequence, indicating, in the common field, the location of the station corresponding to the user field in the station sequence reduces overheads of the signaling field.

Some embodiments provide a data transmission apparatus, including:
  a processing unit, configured to generate a signaling field of a PPDU, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment;
  the signaling field includes a common field and a user-specific field, where the user-specific field includes a user field of the station parking on the first frequency segment, the user field includes a field indicating a station identifier of a station corresponding to the user field and a spatial stream allocation indication field, the spatial stream allocation indication field indicates a spatial stream allocated to each of the plurality of stations according to a station sequence corresponding to the spatial stream allocation, and the station sequence includes an arrangement order of the plurality of stations; and
  the common field includes a total MU-MIMO user quantity indication field and a bitmap, where the total MU-MIMO user quantity indication field indicates a quantity of the plurality of stations, and the bitmap indicates a start location, in the station sequence, of the station that is of the plurality of stations and that parks on the first frequency segment; and
  a sending unit, configured to send the signaling field on the first frequency segment. The data transmission apparatus is used, for example, in a non-OFDMA scenario.

In some embodiments, the user field includes a user field of a station parking on the frequency segment, and a station receiving the PPDU further determines, according to the total MU-MIMO user quantity indication field and the bitmap, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In addition, compared with indicating, in each user field, a location of a station corresponding to the user field in the station sequence, indicating, in the common field, the location of the station corresponding to the user field in the station sequence reduces overheads of the signaling field.

Some embodiments provide a data transmission apparatus, including:
  a processing unit, configured to generate a signaling field of a PPDU, where a channel bandwidth for transmitting the PPDU includes at least two frequency segments, the at least two frequency segments include a first frequency segment, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment; the signaling field includes a common field and a user-specific field, and the common field includes a resource unit allocation subfield corresponding to the RU, indicating the RU and a quantity of user fields corresponding to the RU; the user-specific field includes the user fields corresponding to the RU, and the user fields corresponding to the RU are user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and
  a sending unit, configured to send the signaling field on the first frequency segment.

The data transmission apparatus is, for example, a communication apparatus or an access point. Alternatively, the data transmission apparatus is deployed in a communication apparatus or an access point. The data transmission apparatus is used, for example, in an OFDMA scenario.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the user field of the STA not parking on the frequency segment is padded with a null user field. In some embodiments, the sequence location of the user field corresponding to the STA that participates in MU-MIMO transmission and that parks on the frequency segment does not change in user fields corresponding to stations receiving the PPDU, so that a signaling field transmitted on each frequency segment accurately indicates a user field corresponding to an RU for MU-MIMO transmission.

Some embodiments provide a data transmission apparatus, including:

a processing unit, configured to generate a signaling field of a physical layer protocol data unit PPDU, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; the signaling field includes user fields of the plurality of stations and a field indicating an MU-MIMO user quantity, where the field indicating the MU-MIMO user quantity indicates a quantity of user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and a sending unit, configured to send the signaling field on the first frequency segment.

The data transmission apparatus is, for example, a communication apparatus or an access point. Alternatively, the data transmission apparatus is deployed in a communication apparatus or an access point. The data transmission apparatus is used, for example, in an OFDMA scenario. The method is applied, for example, in a non-OFDMA scenario.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the user field of the STA not parking on the frequency segment is padded with a null user field. In some embodiments, the sequence location of the user field of the STA that participates in MU-MIMO transmission and that parks on the frequency segment does not change in user fields corresponding to stations receiving the PPDU, so that a signaling field transmitted on each frequency segment accurately indicates a user field corresponding to a frequency domain resource for MU-MIMO transmission.

Some embodiments provide a data transmission apparatus, including:

a receiving unit, configured to receive a signaling field of a physical layer protocol data unit PPDU on a first frequency segment, where a channel bandwidth for transmitting the PPDU includes at least two frequency segments, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment; the signaling field includes a common field and a user-specific field, the user-specific field includes a user field corresponding to the RU, and the user field corresponding to the RU is a user field of the station that is of the plurality of stations and that parks on the first frequency segment; and the common field includes a resource unit allocation subfield corresponding to the RU, indicating the RU and a quantity of user fields corresponding to the RU; and a processing unit, configured to obtain, from the signaling field, a user field carrying an identifier of a current station, and obtain data transmitted on an RU corresponding to the user field carrying the identifier of the current station.

The data transmission apparatus is, for example, a communication apparatus or a station. Alternatively, the data transmission apparatus is deployed in a communication apparatus or a station. The data transmission apparatus is used, for example, in an OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, a quantity that is of user fields corresponding to the RU and that is indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an RU for MU-MIMO transmission. A station determines an RU allocated to the station based on a sequence location of a user field including a station identifier of the station in a plurality of user fields.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a station identifier indication field and a spatial stream allocation indication field. The station identifier indication field indicates a station identifier corresponding to the user field, the spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the RU for MU-MIMO transmission is allocated, that is, determine a sequence number of the station among the stations to which the RU for MU-MIMO transmission is allocated. In some embodiments, an allocated spatial stream is determined based on an index that indicates a spatial stream and that is included in the user field.

In some embodiments, the common field includes one or more resource unit allocation subfields, and at least one RU indicated by any resource unit allocation subfield is allocated to the station parking on the first frequency segment. In some embodiments, the resource unit allocation subfield of the signaling field includes a resource unit allocation subfield indicating RU allocation to a station parking on the first frequency segment, and does not include a resource unit allocation subfield indicating RU allocation to a station not parking on the first frequency segment. In some embodiments, a quantity of resource unit allocation subfields in the signaling field is reduced, reducing overheads of the signaling field.

Some embodiments provide a data transmission apparatus, including:
a receiving unit, configured to receive a signaling field of a physical layer protocol data unit PPDU on a first frequency segment, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; and the signaling field includes a user field of the station that is of the plurality of stations and that parks on the first frequency segment, and a field indicating an MU-MIMO user quantity, where the field indicating the MU-MIMO user quantity indicates a quantity of user fields of stations that are of the plurality of stations and that park on the first frequency segment; and
a processing unit, configured to obtain, from the signaling field, a user field carrying an identifier of a current station, and obtain data transmitted on an RU corresponding to the user field carrying the identifier of the current station.

The data transmission apparatus is, for example, a communication apparatus or a station. Alternatively, the data transmission apparatus is deployed in a communication apparatus or a station. The data transmission apparatus is used, for example, in a non-OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the MU-MIMO user quantity indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an MU-MIMO frequency domain resource for MU-MIMO transmission.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In some embodiments, the signaling field includes a common field and a user-specific field. The user-specific field includes the user field, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations.

The common field includes the field indicating the MU-MIMO user quantity, a total MU-MIMO user quantity indication field, and a field indicating a start location. The total MU-MIMO user quantity indication field indicates a quantity of the plurality of stations, and the field indicating the start location indicates a start location, in the station sequence, of the station parking on the first frequency segment.

In some embodiments, the user field includes a user field of a station parking on the frequency segment, and a station receiving the PPDU further determines, according to the total MU-MIMO user quantity indication field, the field indicating the MU-MIMO user quantity, and the subfield indicating the start location in the common field, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field. In addition, compared with indicating, in each user field, a location of a station corresponding to the user field in the station sequence, indicating, in the common field, the location of the station corresponding to the user field in the station sequence reduces overheads of the signaling field.

Some embodiments provide a data transmission apparatus, including:

a receiving unit, configured to receive a signaling field of a PPDU on a first frequency segment, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment;

the signaling field includes a common field and a user-specific field, where the user-specific field includes a user field of the station parking on the first frequency segment, the user field includes a field indicating a station identifier of a station corresponding to the user field and a spatial stream allocation indication field, the spatial stream allocation indication field indicates a spatial stream allocated to each of the plurality of stations according to a station sequence corresponding to the spatial stream allocation, and the station sequence includes an arrangement order of the plurality of stations; and the common field includes a total MU-MIMO user quantity indication field and a bitmap, where the total MU-MIMO user quantity indication field indicates a quantity of the plurality of stations, and the bitmap indicates a start location, in the station sequence, of the station that is of the plurality of stations and that parks on the first frequency segment; and a processing unit, configured to obtain, from the signaling field, a user field carrying an identifier of a current station, and obtain data transmitted on an RU corresponding to the user field carrying the identifier of the current station. The data transmission apparatus is used, for example, in a non-OFDMA scenario.

In some embodiments, the user field includes a user field of a station parking on the frequency segment, and a station receiving the PPDU further determines, according to the total MU-MIMO user quantity indication field and the bitmap, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In addition, compared with indicating, in each user field, a location of a station corresponding to the user field in the station sequence, indicating, in the common field, the location of the station corresponding to the user field in the station sequence reduces overheads of the signaling field.

Some embodiments provide a data transmission apparatus, including:

a receiving unit, configured to receive a signaling field of a physical layer protocol data unit PPDU on a first frequency segment, where a channel bandwidth for transmitting the PPDU includes at least two frequency segments, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment; the signaling field includes a common field and a user-specific field, and the common field includes a resource unit allocation subfield corresponding to the RU, indicating the RU and a quantity of user fields corresponding to the RU; the user-specific field includes the user fields corresponding to the RU, and the user fields corresponding to the RU are user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and a processing unit, configured to obtain, from the signaling field, a user field carrying an identifier of a current station, and obtain data transmitted on an RU corresponding to the user field carrying the identifier of the current station.

The data transmission apparatus is, for example, a communication apparatus or a station. Alternatively, the data transmission apparatus is deployed in a communication apparatus or a station. The data transmission apparatus is used, for example, in an OFDMA scenario.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the user field of the STA not parking on the frequency segment is padded with a null user field. In some embodiments, the sequence location of the user field corresponding to the STA that participates in MU-MIMO transmission and that parks on the frequency segment does not change in user fields corresponding to stations receiving the PPDU, so that a signaling field transmitted on each frequency segment accurately indicates a user field corresponding to an RU for MU-MIMO transmission. In some embodiments, a station determines an RU allocated to the station based on a sequence location of a user field including a station identifier of the station in a plurality of user fields.

Some embodiments provide a data transmission apparatus, including:

a receiving unit, configured to receive a signaling field of a physical layer protocol data unit PPDU on a first frequency segment, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; the signaling field includes user fields of the plurality of stations and a field indicating an MU-MIMO user quantity, where the field indicating the MU-MIMO user quantity indicates a quantity of user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and a processing unit, configured to obtain, from the signaling field, a user field carrying an identifier of a current station, and obtain data transmitted on an RU corresponding to the user field carrying the identifier of the current station.

The data transmission apparatus is, for example, a communication apparatus or a station. Alternatively, the data transmission apparatus is deployed in a communication apparatus or a station. The data transmission apparatus is used, for example, in a non-OFDMA scenario.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment.

Some embodiments provide a communication apparatus. The communication apparatus includes a processor and a transceiver, and optionally further includes a memory. In response to the processor executing a computer program or instructions in the memory, the method according to any one of the implementations is performed.

Some embodiments provide a computer-readable storage medium. The computer-readable storage medium stores instructions, and the instructions indicate a communication apparatus to perform the method according to any one of the implementations.

Some embodiments provide a computer program product. The computer program product includes a computer program. In response to the computer program running on a computer, the computer is enabled to perform the method according to any one of the implementations.

Some embodiments provide a processor, configured to perform the method according to any one of the implementations. In a process of performing these methods, a process of sending the information and a process of receiving the information in the methods are understood as a process of outputting the information by the processor and a process of receiving the input information by the processor. In response to outputting the information, the processor outputs the information to a transceiver, so that the transceiver transmits the information. Still further, after the information is output by the processor, other processing further calls to be performed before the information arrives at the transceiver. Similarly, in response to the processor receiving the input information, the transceiver receives the information and inputs the information into the processor. Still further, after the transceiver receives the information, other processing calls to be performed on the information before the information is input into the processor.

In this case, for operations such as transmission, sending, and receiving related to the processor, in response to there being no particular statement, or in response to the operations not contradicting a function or internal logic of the operations in related descriptions, the operations are more generally understood as operations such as output, receiving, and input of the processor, instead of operations such as transmission, sending, and receiving directly performed by a radio frequency circuit and an antenna.

In an implementation process, the processor is a processor specially configured to perform these methods, or a processor, for example, a general-purpose processor, that executes computer instructions in a memory to perform these methods. The memory is a non-transitory (non-transitory) memory such as a read-only memory (read only memory, ROM). The memory and the processor is integrated on a same chip, or is separately disposed on different chips. A type of the memory and a manner of disposing the memory and the processor are not limited in some embodiments.

Some embodiments provide a chip system. The chip system includes a processor and an interface, configured to support a communication transmission device in implementing a function in the method according to the embodiments, for example, determining or processing at least one of data and information involved in the foregoing method. In a possible design, the chip system further includes a memory, and the memory is configured to store information and data that are for the foregoing communication apparatus. The chip system includes a chip, or includes a chip and another discrete component.

Some embodiments provide a functional entity. The functional entity is configured to implement the method according to any embodiment.

BRIEF DESCRIPTION OF DRAWINGS

FIG. 6B is a schematic diagram depicting a structure of a PPDU according to some embodiments;

FIG. 11A is a schematic diagram of a scenario in which a signaling field indicates frequency domain resource allocation according to some embodiments;

FIG. 20C is schematic diagram depicting another structure of a signaling field according to some embodiments;

FIG. 20D is schematic diagram depicting still another structure of a signaling field according to some embodiments;

DESCRIPTION OF EMBODIMENTS

The following further describes the embodiments in detail with reference to accompanying drawings.

Figure 1:
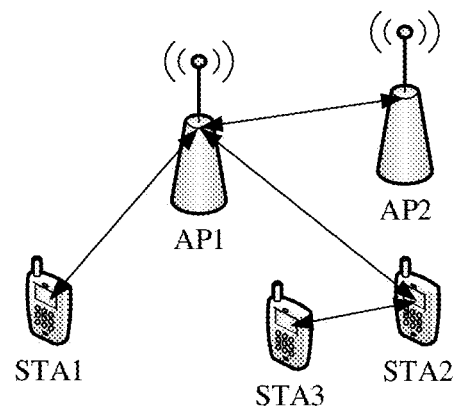
FIG. 1 is a schematic diagram depicting a network structure according to some embodiments.

For example, FIG. 1 shows a network structure to which a data transmission method in some embodiments are applicable. FIG. 1 is a schematic diagram depicting a network structure according to some embodiments. The network structure includes one or more access point (access point, AP) stations and one or more non-access point stations (non-access point station, non-AP STA). For ease of description, an access point station is referred to as an access point (AP), and a non-access point station is referred to as a station (STA) in the embodiments. The AP is, for example, an AP1 and an AP2 in FIG. 1, and the STA is, for example, a STA1, a STA2, and a STA3 in FIG. 1.

The access point is an access point used by a terminal device (such as a mobile phone) to access a wired (or wireless) network, and is mainly deployed at home, in a building, and in a park. A typical coverage radius is tens of meters to hundreds of meters. Certainly, the access point alternatively is deployed outdoors. The access point is equivalent to a bridge that connects the wired network and the wireless network. A main function of the access point is to connect various wireless network clients together and then connect the wireless network to the Ethernet. The access point is a terminal device (such as a mobile phone) or a network device (such as a router) with a wireless fidelity (wireless fidelity, Wi-Fi) chip. The access point is a device that supports the 802.11be standard. Alternatively, the access point is a device that supports a plurality of wireless local area network (wireless local area network, WLAN) standards of the 802.11 family such as 802.11be, 802.11ax, 802.11ac, 802.11n, 802.11g, 802.11b, and 802.11a. The access point in some embodiments are a high efficiency (high efficient, HE) AP or an extremely high throughput (extremely high throughput, EHT) AP, or is an access point applicable to a future Wi-Fi standard.

The access point includes a processor and a transceiver. The processor is configured to control and manage an action of the access point, and the transceiver is configured to receive or send information.

The station is a wireless communication chip, a wireless sensor, a wireless communication terminal, or the like, and further is referred to as a user. For example, the station is a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function. Optionally, the station supports the 802.11be standard. The station further supports a plurality of wireless local area network (wireless local area network, WLAN) standards of the 802.11 family such as 802.11be, 802.11ax, 802.11ac, 802.11n, 802.11g, 802.11b, and 802.11a.

The station includes a processor and a transceiver. The processor is configured to control and manage an action of the access point, and the transceiver is configured to receive or send information.

The station in some embodiments are a high efficiency (high efficiency, HE) STA or an extremely high throughput (extremely high throughput, EHT) STA, or is a STA applicable to a future Wi-Fi standard.

For example, the access point and the station is devices used in the Internet of vehicles, Internet of things nodes or sensors in the Internet of things (Internet of things, IoT), smart cameras, smart remote controls, and smart water meters in smart home, and sensors in smart city.

The access point and the station in some embodiments further is collectively referred to as a communication apparatus. The communication apparatus includes a hardware structure and a software module, and the foregoing functions are implemented in a form of a hardware structure, a software module, or a combination of the hardware structure and the software module. A function in the foregoing functions are performed in a form of a hardware structure, a software module, or a combination of the hardware structure and the software module.

Figure 2:
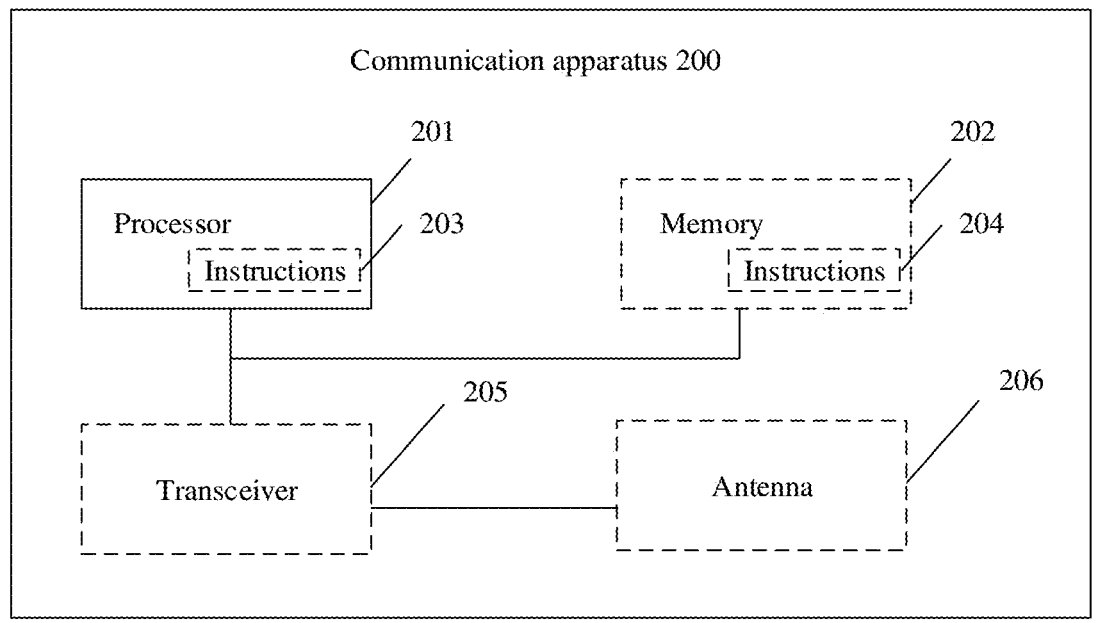
FIG. 2 is a schematic diagram depicting a structure of a communication apparatus according to some embodiments.

FIG. 2 is a schematic diagram depicting a structure of a communication apparatus according to some embodiments. As shown in FIG. 2, the communication apparatus 200 includes a processor 201 and a transceiver 205, and optionally further includes a memory 202.

The transceiver 205 is referred to as a transceiver unit, a transceiver machine, a transceiver circuit, or the like, and is configured to implement a transceiver function. The transceiver 205 includes a receiver and a transmitter. The receiver is referred to as a receiver machine, a receiver circuit, or the like, and is configured to implement a receiving function. The transmitter is referred to as a transmitter machine, a transmitter circuit, or the like, and is configured to implement a sending function.

The memory 202 stores a computer program, software code, or instructions 204, where the computer program, the software code, or the instructions 204 further is referred to as firmware. The processor 201 controls a MAC layer and a PHY layer by running a computer program, software code, or instructions 203 in the processor 201, or by invoking the computer program, the software code, or the instructions 204 stored in the memory 202, to implement a data transmission method provided in the following some embodiments. The processor 201 is a central processing unit (central processing unit, CPU), and the memory 202 is, for example, a read-only memory (read-only memory, ROM), or a random access memory (random access memory, RAM).

The processor 201 and the transceiver 205 described in some embodiments are implemented in an integrated circuit (integrated circuit, IC), an analog IC, a radio frequency integrated circuit RFIC, a mixed-signal IC, an application-specific integrated circuit (application specific integrated circuit, ASIC), a printed circuit board (printed circuit board, PCB), an electronic device, or the like.

The communication apparatus 200 further includes an antenna 206. The modules included in the communication apparatus 200 are examples for description, and are not limited in some embodiments.

As described above, the communication apparatus 200 described in the foregoing embodiment is an access point or a station. However, the scope of the communication apparatus described in some embodiments is not limited thereto, and the structure of the communication apparatus is unable to be limited to FIG. 2. The communication apparatus are an independent device or is a part of a larger device. For example, the communication apparatus is implemented in the following forms:

(1) an independent integrated circuit IC, a chip, a chip system, or a subsystem; (2) a set including one or more ICs, where optionally, the set of ICs further includes a storage component for storing data and instructions; (3) a module that is embedded in other devices; (4) a receiver, an intelligent terminal, a wireless device, a handheld device, a mobile unit, a vehicle-mounted device, a cloud device, an artificial intelligence device, or the like; or (5) others.

Figure 3:
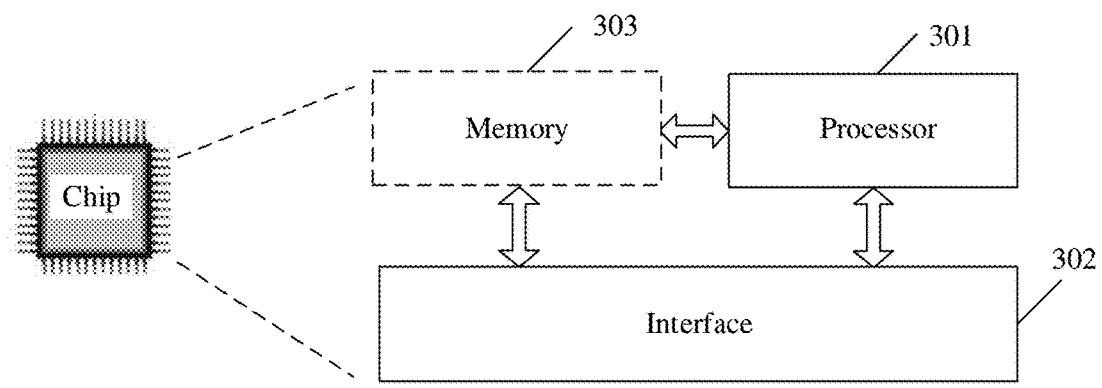
FIG. 3 is a schematic diagram depicting a structure of a chip or a chip system according to some embodiments.

For the communication apparatus implemented in the form of a chip or a chip system, refer to a schematic diagram depicting a structure of a chip or a chip system shown in FIG. 3. The chip or the chip system shown in FIG. 3 includes a processor 301 and an interface 302. There is one or more processors 301, and there is a plurality of interfaces 302. Optionally, the chip or the chip system includes a memory 303.

Some embodiments do not limit the protection scope and applicability of the claims. A person skilled in the art is able to adaptively change functions and deployments of elements in some embodiments, or omit, replace, or add various processes or components as appropriate without departing from the scope of some embodiments.

A bandwidth used by an AP for transmitting a PPDU is allocated to one or more STAs for data transmission. The PPDU includes a signaling field, the signaling field includes a user-specific field, and the user-specific field includes one or more user fields.

A structure of a user field corresponding to a STA participating in multi-user multiple input multiple output (multiple user multiple input multiple output, MU-MIMO) transmission is shown in the following Table 1. A user field includes a station identifier (STA ID) of a corresponding STA, a spatial stream allocation indication field, and a modulation and coding scheme indication field. The STA determines, according to the user field that includes the station identifier of the STA, a frequency domain resource allocated to the STA.

TABLE 1

| Bit | Subfield | Quantity of bits | Description |
| --- | --- | --- | --- |
| B0-B10 | Station identifier | 11 | Indicates identifier information of a station |
| B11-B14 | Spatial stream allocation | 4 | Indicates a quantity of spatial streams for a STA in an MU-MIMO resource |
| B15-B18 | Modulation and coding scheme | 4 | Indicates a modulation and coding scheme of a station |
| B19 | Reserved | 1 | Reserved and set to 0 |
| B20 | Coding | 1 | Indicates a coding scheme |

In some embodiments the user field carries a station identifier, to indicate that a frequency domain resource corresponding to the user field is allocated to a STA corresponding to the station identifier. The STA determines, according to a correspondence between the frequency domain resource and the user field carrying the station identifier of the STA, a frequency domain resource allocated to the STA.

In a non-OFDMA scenario, a plurality of stations occupy a same frequency domain resource in a channel bandwidth for transmitting a PPDU. This is referred to as MU-MIMO transmission in the non-OFDMA scenario. The same frequency domain resource is the entire channel bandwidth, or is a frequency domain resource other than a punctured part in the channel bandwidth.

In the non-OFDMA scenario, an AP notifies, by using a signaling field (signal field, SIG), a user of allocation of a channel bandwidth for transmitting a PPDU. For example, in response to a channel bandwidth for transmitting a PPDU being 20 MHz, and the 20 MHz channel bandwidth is allocated to six stations for data transmission, a signaling field of the PPDU includes user fields of the six stations. In some embodiments, in the non-OFDMA scenario, in response to MU-MIMO transmission being performed, a signaling field of a PPDU includes user fields of stations to which a frequency domain resource of a channel bandwidth is allocated.

In an OFDMA scenario, in terms of frequency domain resource allocation, a frequency domain resource is allocated to a user not in a unit of channel, but in a unit of resource unit (Resource Unit, RU). An RU is a 26-tone RU, a 52-tone RU, or a 106-tone RU in size, and these RUs are usually referred to as small RUs. Tone represents subcarrier. For example, a 26-tone RU represents an RU including 26 subcarriers, and the 26-tone RU is allocated to one user for use. In addition, an RU alternatively is 242-tone, 484-tone, 996-tone, or the like in size, and these RUs are usually referred to as large RUs. Generally, an RU with a size greater than or equal to 106-tone is allocated to one or more users. In 802.11be, a plurality of RUs is allocated to one user, and the user in some embodiments are understood as a STA.

Figure 4A:
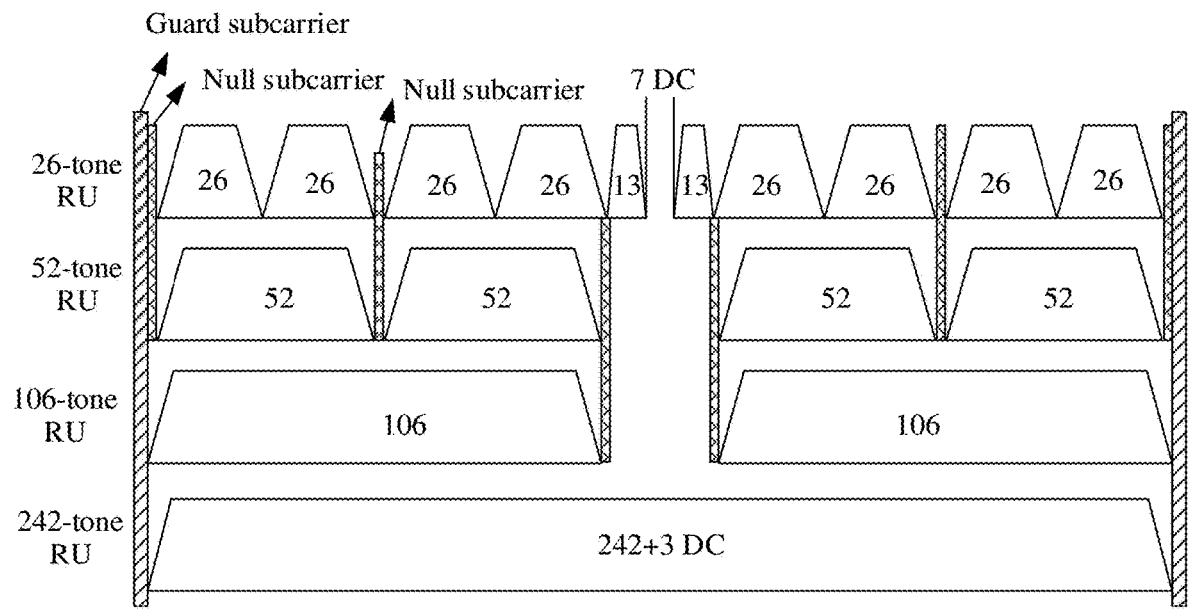
FIG. 4A is a schematic diagram of a possible manner of resource unit allocation.

In response to a channel bandwidth for transmitting a PPDU being 20 MHz, refer to FIG. 4A. FIG. 4A is a schematic diagram of a possible manner of resource unit allocation in response to a channel bandwidth for transmitting a PPDU being 20 MHz. The entire 20 MHz channel bandwidth includes an entire resource unit including 242 subcarriers (242-tone RU), or includes various combinations of resource units including 26 subcarriers (26-tone RU), resource units including 52 subcarriers (52-tone RU), or resource units including 106 subcarriers (106-tone RU). In addition to the RUs for data transmission, some guard (Guard) subcarriers, null subcarriers, or direct current (direct current, DC) subcarriers are further included.

Figure 4B:
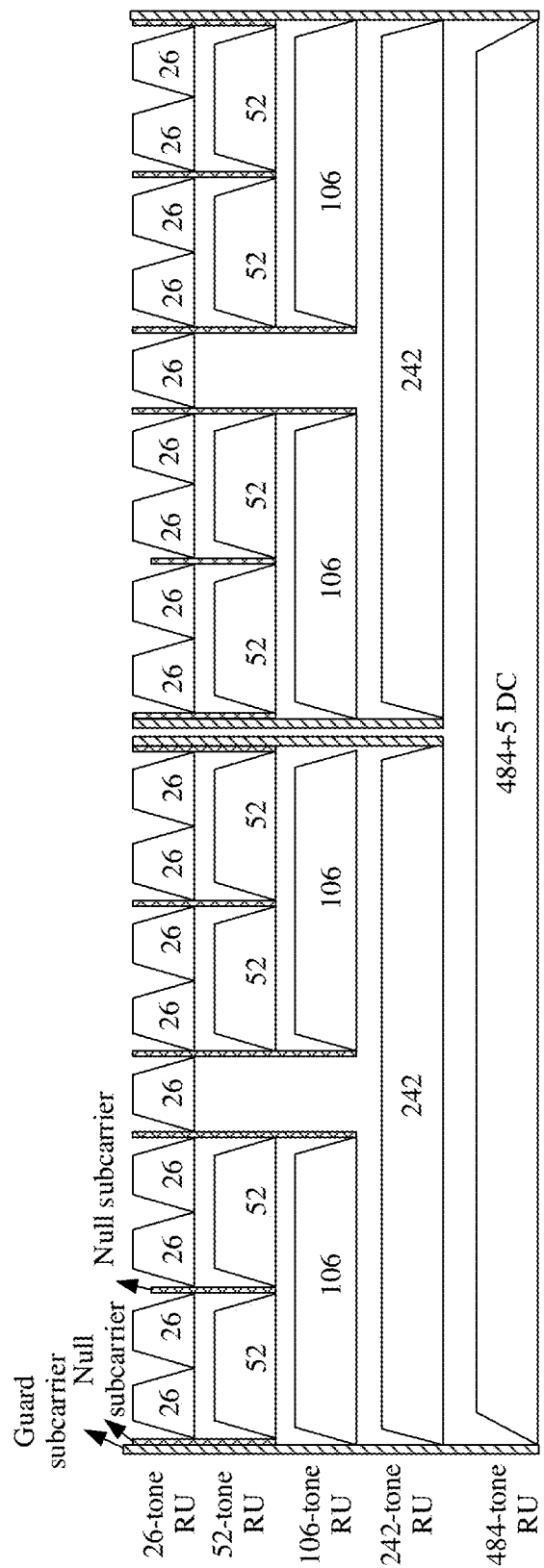
FIG. 4B is a schematic diagram of another possible manner of resource unit allocation, in accordance with some embodiments.

In response to a channel bandwidth for transmitting a PPDU being 40 MHz, refer to FIG. 4B. FIG. 4B is a schematic diagram of a possible manner of resource unit allocation in response to a channel bandwidth for transmitting a PPDU being 40 MHz. The entire channel bandwidth is approximately equivalent to replication of subcarrier distribution of a 20 MHz channel bandwidth. The entire 40 MHz channel bandwidth includes an entire resource unit including 484 subcarriers (484-tone RU), or includes various combinations of 26-tone RUs, 52-tone RUs, 106-tone RUs, or 242-tone RUs.

In response to a channel bandwidth for transmitting a PPDU being 80 MHz, the entire channel bandwidth is approximately equivalent to replication of subcarrier distribution of a 20 MHz channel bandwidth. The entire 80 MHz channel bandwidth includes an entire resource unit including 996 subcarriers (996-tone RU), or includes various combinations of 484-tone RUs, 242-tone RUs, 106-tone RUs, 52-tone RUs, or 26-tone RUs. In addition, a center 26-tone RU (Center 26-Tone RU) including two 13-tone subunits exists in the middle of the entire 80 MHz channel bandwidth.

Figure 5A:
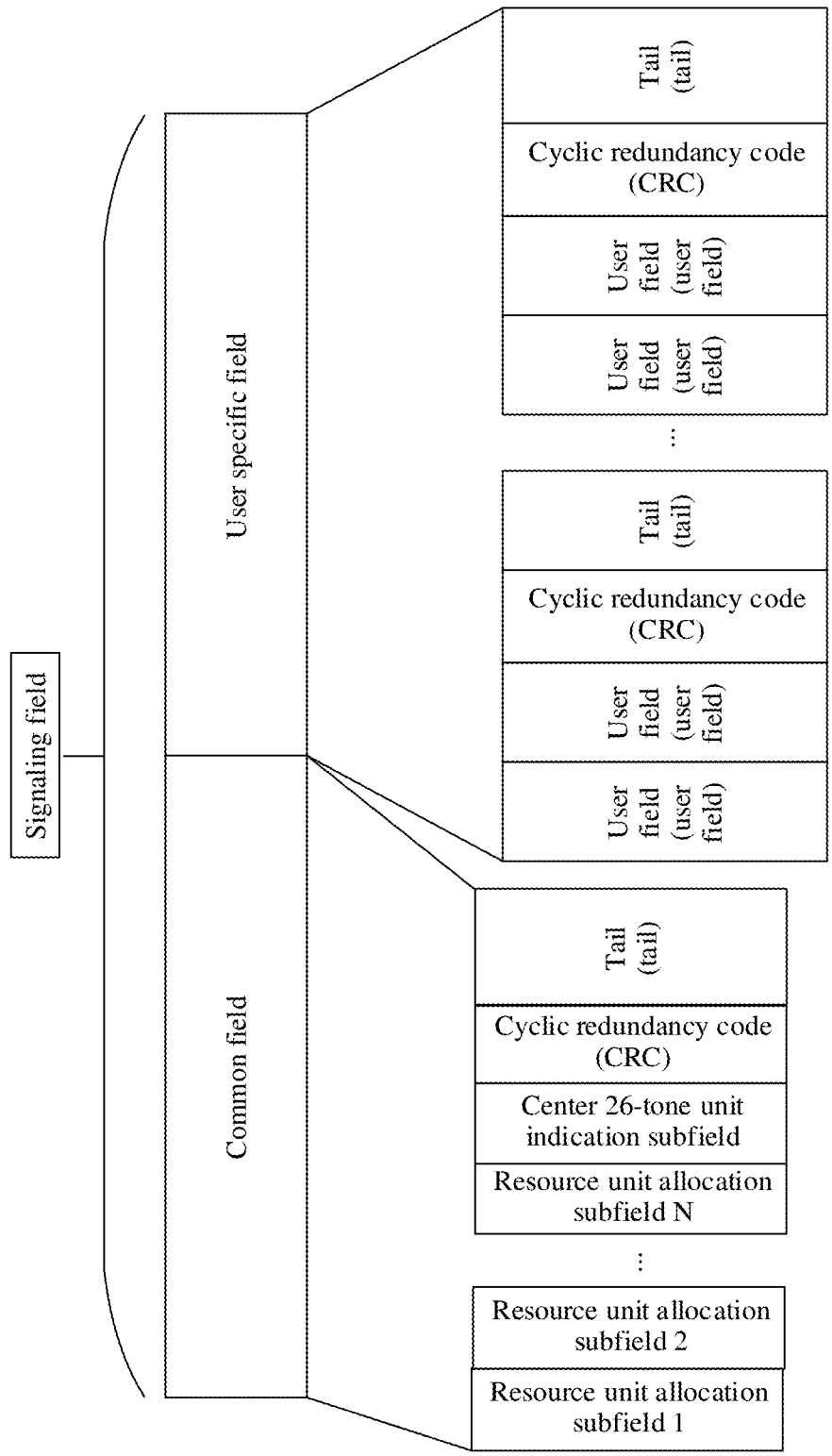
FIG. 5A is a schematic diagram depicting a structure of a signaling field, in accordance with some embodiments.

In the OFDMA scenario, in 802.11ax, an AP notifies a user of RU allocation by using a signaling field (signal field, SIG). Refer to FIG. 5A. FIG. 5A is a schematic diagram depicting a structure of a signaling field. As shown in FIG. 5A, an HE-SIG includes a common field (common field) and a user-specific field (user-specific field).

The common field includes 1 to N resource unit allocation subfields (RU allocation subfield), a cyclic redundancy code (cyclic redundancy code, CRC) subfield for checking, and a tail (Tail) subfield for cyclic decoding. A resource unit allocation subfield corresponds to allocation of a resource unit of a 20 MHz frequency band, and a resource unit allocation subfield indicates sizes and locations of one or more resource units corresponding to a 20 MHz frequency band.

A resource unit allocation subfield is an index, and the index indicates sizes and locations of one or more resource units corresponding to a 20 MHz frequency band.

As shown in Table 2, according to 802.11ax, a resource unit allocation subfield is an index in the first column of Table 2, for example, 00000000, 00000001, or 00000010. A row in which each index is located represents a size and a location of a resource unit corresponding to a 20 MHz frequency band.

TABLE 2

| Resource unit allocation subfield (B7, B6, B5, B4, B3, B2, B1, B0) | #1 | #2 | #3 | #4 | #5 | #6 | #7 | #8 | #9 | Entry quantity |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 | 26 | 26 |  | 1 |
| 00000011 | 26 | 26 | 26 | 26 | 26 | 52 | 52 |  |  | 1 |
| 00000100 | 26 | 26 | 52 | 26 | 26 | 26 | 26 | 26 |  | 1 |
| 00000101 | 26 | 26 | 52 | 26 | 26 | 26 | 52 |  |  | 1 |
| 00000110 | 26 | 26 | 52 | 26 | 52 | 26 | 26 |  |  | 1 |
| 00000111 | 26 | 26 | 52 | 26 | 52 | 52 |  |  |  | 1 |
| 00001000 | 52 | 26 | 26 | 26 | 26 | 26 | 26 | 26 |  | 1 |
| 00001001 | 52 | 26 | 26 | 26 | 26 | 26 | 52 |  |  | 1 |
| 00001010 | 52 | 26 | 26 | 26 | 52 | 26 | 26 |  |  | 1 |
| 00001011 | 52 | 26 | 26 | 26 | 52 | 52 |  |  |  | 1 |
| 00001100 | 52 | 52 | 26 | 26 | 26 | 26 | 26 |  |  | 1 |
| 00001101 | 52 | 52 | 26 | 26 | 26 | 52 |  |  |  | 1 |
| 00001110 | 52 | 52 | 26 | 52 | 26 | 26 |  |  |  | 1 |
| 00001111 | 52 | 52 | 26 | 52 | 52 |  |  |  |  | 1 |
| 00010$y_2y_1y_0$ | 52 |  | 52 | — |  | 106 |  |  |  | 8 |
| 00011$y_2y_1y_0$ |  | 106 |  | — | 52 |  | 52 |  |  | 8 |
| 00100$y_2y_1y_0$ | 26 | 26 | 26 | 26 | 26 |  | 106 |  |  | 8 |
| 00101$y_2y_1y_0$ | 26 | 26 | 52 | 26 |  | 106 |  |  |  | 8 |
| 00110$y_2y_1y_0$ | 52 |  | 26 | 26 | 26 |  | 106 |  |  | 8 |
| 00111$y_2y_1y_0$ | 52 |  | 52 | 26 |  | 106 |  |  |  | 8 |
| 01000$y_2y_1y_0$ |  | 106 |  | 26 | 26 | 26 | 26 | 26 |  | 8 |
| 01001$y_2y_1y_0$ |  | 106 |  | 26 | 26 | 26 | 52 |  |  | 8 |
| 01010$y_2y_1y_0$ |  | 106 |  | 26 | 52 | 26 | 26 |  |  | 8 |
| 01011$y_2y_1y_0$ |  | 106 |  | 26 | 52 | 52 |  |  |  | 8 |
| 0110$y_1y_0z_1z_0$ |  | 106 |  | — |  | 106 |  |  |  | 16 |
| 01110000 | 52 |  | 52 | — | 52 |  | 52 |  |  | 1 |
| 01110001 | 242-tone RU: null (zero users) | | | | | | | | | 1 |
| 01110010 | 48-tone RU; contributes zero user fields to the user-specific field in the same HE-SIG-B content channel as this RU allocation subfield (contributes zero user fields to the user-specific field in the same HE-SIG-B content channel as this RU allocation subfield) | | | | | | | | | 1 |
| 01110011 | 996-tone RU; contributes zero user fields to the user-specific field in the same HE-SIG-B content channel as this RU allocation subfield (contributes zero user fields to the user-specific field in the same HE-SIG-B content channel as this RU allocation subfield) | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ |  | 106 |  | 26 |  | 106 |  |  |  | 64 |
| 11000$y_2y_1y_0$ |  |  | 242 |  |  |  |  |  |  | 8 |
| 11001$y_2y_1y_0$ |  |  | 484 |  |  |  |  |  |  | 8 |
| 11010$y_2y_1y_0$ |  |  | 996 |  |  |  |  |  |  | 8 |
| 11011$y_2y_1y_0$ |  |  | Reserved |  |  |  |  |  |  | 8 |
| 111$x_4x_3x_2x_1x_0$ |  |  | Reserved |  |  |  |  |  |  | 32 |

The user-specific field of the signaling field (HE-SIG) includes 1 to M user fields (User Field) according to a resource unit allocation sequence. The M user fields are usually grouped in two, and each two user field are followed by a CRC field and a tail field. In response to a quantity of user fields being an odd number, the last user field is separately in a group, and the last user field is followed by a CRC field and a tail field.

Figure 5B:
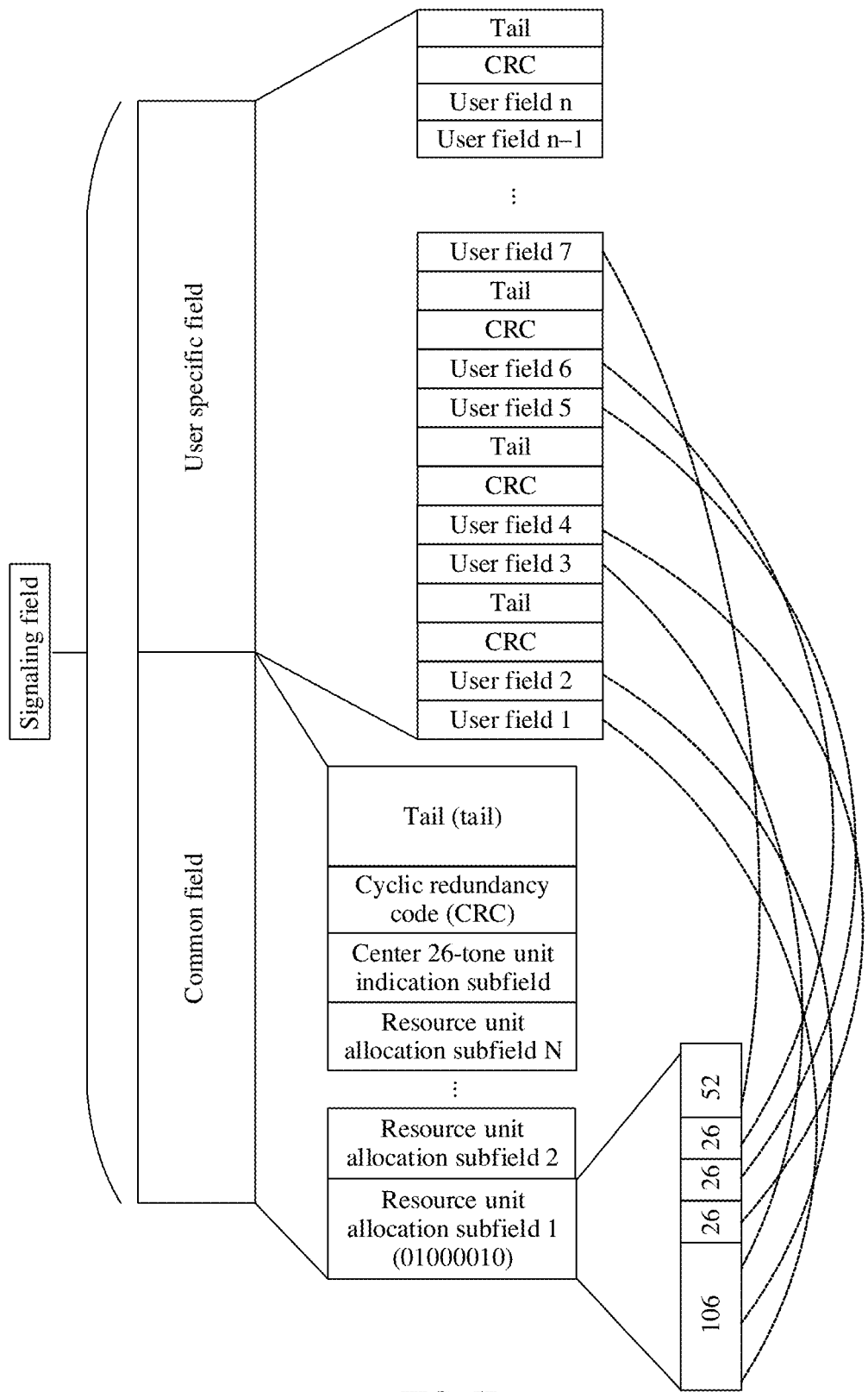
FIG. 5B is a schematic diagram depicting another possible structure of a signaling field, in accordance with some embodiments.

In response to an RU indicated by a resource unit allocation subfield including an RU including more than or equal to 106 subcarriers, the index further indicates a quantity of MU-MIMO users supported by the RU including more than or equal to 106 subcarriers. For example, the index is 01000$y_2y_1y_0$. In response to $y_2y_1y_0$ being 010, the 106-tone RU is allocated to three users. As shown in FIG. 5B, FIG. 5B is a schematic diagram depicting another possible structure of a signaling field. A resource unit allocation subfield 1 is 01000010. With reference to a row in which 01000$y_2y_1y_0$ is located in Table 2, a determination is made 01000010 indicates that resource units indicated by the transmission resource unit allocation subfield 1 are a 106-tone RU, a 26-tone RU, a 26-tone RU, a 26-tone RU, and a 52-tone RU, and the 106-tone RU is allocated to three users. The user-specific field part includes n user fields. A user field 1, a used field 2, and a user field 3 correspond to the 106-tone RU. A user field 4, a user field 5, and a user field 6 correspond to the three 26-tone RUs in sequence. A user field 7 corresponds to the 52-tone RU.

The user field carries a station identifier, to indicate that an RU corresponding to the station identifier is allocated to a STA. The STA determines an RU allocated to the STA according to the RU corresponding to the user field carrying the station identifier of the STA. In some embodiments, from the foregoing Table 1 that, in the foregoing OFDMA scenario, in an allocation manner of an RU corresponding to a channel bandwidth, a resource unit corresponding to each user field is determined based on a correspondence between an RU sequence indicated by a resource unit allocation subfield and an arrangement sequence of user fields in a user-specific field. In this case, an HE-SIG-B sent to each station includes user fields corresponding to each resource unit allocation subfield. In some embodiments, ensuring that a STA determines, with reference to a location at which a user field appears and a corresponding resource unit allocation subfield, a resource unit allocated to the STA.

With development of WLAN technologies, to enable a PPDU to support more STAs, more users are to be supported by MU-MIMO transmission in a non-OFDMA scenario and an OFDMA scenario. In some embodiments, increasingly more user fields call to be transmitted in a signaling field of the PPDU, and signaling overheads increase.

Figure 6A:
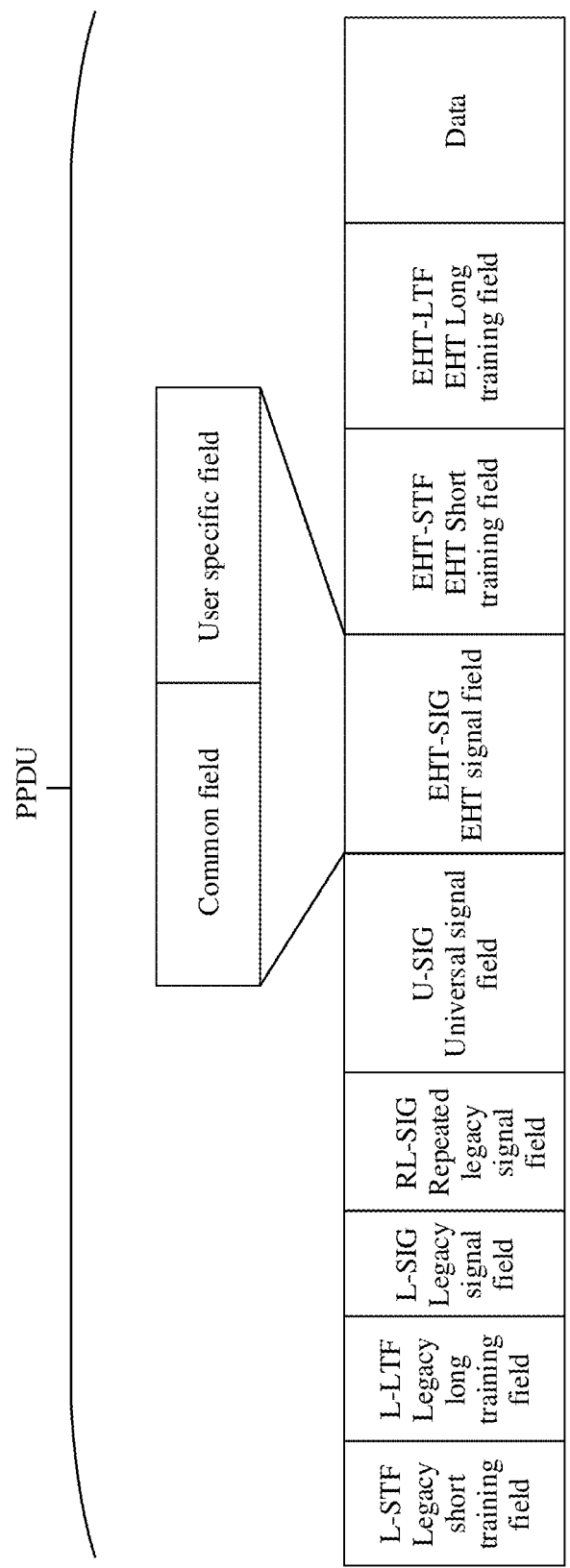
FIG. 6A is a schematic diagram depicting a structure of a PPDU, in accordance with some embodiments.

Refer to FIG. 6A. FIG. 6A is a schematic diagram depicting a structure of a PPDU. The PPDU includes a legacy short training field (Legacy Short Training Field, L-STF), a legacy long training field (Legacy Long Training Field, L-LTF), a legacy signal field (Legacy Signal Field, L-SIG), a repeated legacy signal field (RL-SIG), a universal signal field U-SIG (universal SIG, U-SIG), an ultra-high throughput signal field or extremely high throughput signal field (extremely high throughput, EHT-SIG), an EHT short training field (EHT-STF), an EHT long training field (EHT-LTF), and data (data). The L-STF, the L-LTF, the L-SIG, the RL-SIG, the U-SIG, the EHT-SIG, the EHT-STF, and the EHT-LTF are a part of structures in a physical layer header (or referred to as a preamble part) of the PPDU.

The L-STF, the L-LTF, and the L-SIG is understood as legacy preamble fields, and are used to ensure coexistence of a new device and a legacy device. The RL-SIG is used to enhance reliability of a legacy signal field.

The U-SIG and the EHT-SIG are signaling fields. The U-SIG is used to carry some common information, for example, information indicating a PPDU version, information indicating an uplink/downlink, information indicating a frequency domain bandwidth of the PPDU, and puncturing indication information. The EHT-SIG includes information indicating resource allocation, information indicating data demodulation, and the like.

In some embodiments, a field in a PPDU in an 802.11be scenario is used as an example for description. Fields in the PPDU mentioned in some embodiments are not limited to fields related to 802.11be, and the fields in the PPDU mentioned in some embodiments alternatively is fields related to a standard version after 802.11be.

Refer to FIG. 6B. FIG. 6B is a schematic diagram depicting a structure of a PPDU according to some embodiments. To reduce overheads, a structure of frequency segments (segment) shown in FIG. 6B is provided in an embodiment. A channel bandwidth for transmitting a PPDU is divided into a plurality of frequency segments, several stations park on each frequency segment, and an AP sends PPDUs to STAs parking on the plurality of frequency segments. The parking is a correspondence determined or known by a system, and is semi-static. In other words, a correspondence between a frequency segment and one or more stations parking on the frequency segment is configured, and remains unchanged within an period of time. In an example, each frequency segment is 80 MHz. Certainly, each frequency segment is at another bandwidth granularity, for example, 40 MHz or 160 MHz. A process of configuring a correspondence for parking is not involved in the embodiments, and therefore details are not described again.

In some embodiments, a station park (parking) on a frequency segment as described in some embodiments further is referred to as a station camping on a frequency segment, or a station located in or belonging to a frequency segment.

In some embodiments, the frequency segment further is referred to as a frequency segment or the like.

Based on a structure of a frequency segment, fields in a preamble part of the PPDU are separately carried on each frequency segment, that is, the preamble part of the PPDU includes content of one or more frequency segments. For example, content of a first frequency segment includes a first legacy preamble field, a first U-SIG, and a first EHT-SIG; and content of a second frequency segment includes a second legacy preamble field, a second U-SIG, and a second EHT-SIG. In another implementation, the legacy preamble field of the PPDU further is transmitted in an entire channel bandwidth.

In some embodiments, a U-SIG transmitted on each frequency segment includes puncturing indication information, for example, a puncturing indication field that is set to 1 bit, of the frequency segment of the U-SIG. In some embodiments, overheads for transmitting a U-SIG on each frequency segment is reduced.

However, in a related technology, there is no solution about how to set a user field corresponding to an MU-MIMO frequency domain resource for MU-MIMO transmission in response to a signaling field being transmitted based on segments, to implement MU-MIMO transmission on a same MU-MIMO frequency domain resource by STAs parking on at least two frequency segments.

Some embodiments provide some manners of signaling field setting, to set a signaling field of a PPDU. In some embodiments, a user field in a signaling field transmitted on each frequency segment is simplified. A user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment.

In a first possible manner of signaling field setting, an MU-MIMO user quantity indicated in the signaling field is set to a quantity of stations that participate in MU-MIMO transmission and that park on a frequency segment, instead of a total quantity of stations that participate in MU-MIMO transmission. In some embodiments, ensuring that a signaling field transmitted on each frequency segment accurately indicates a user field corresponding to an MU-MIMO frequency domain resource for MU-MIMO transmission.

In a second possible manner of signaling field setting, a null user field is padded in a location of a user field of a STA not parking on the frequency segment. In some embodiments, a sequence location of a user field of a STA that participates in MU-MIMO transmission and that parks on a frequency segment does not change in user fields corresponding to stations receiving the PPDU, so that a signaling field transmitted on each frequency segment accurately indicates a user field corresponding to an MU-MIMO frequency domain resource for MU-MIMO transmission.

In either of the foregoing manners of signaling field setting, in response to a signaling field transmitted on each frequency segment not including a user field corresponding to a STA that participates in MU-MIMO transmission and that does not park on the frequency segment, the signaling field transmitted on each frequency segment accurately indicates a user field corresponding to an MU-MIMO frequency domain resource for MU-MIMO transmission. In this case, a STA parking on each frequency segment accurately determines an allocated MU-MIMO frequency domain resource based on a sequence location of a user field including a station identifier of the STA in a plurality of user fields, and receive data on the MU-MIMO frequency domain resource allocated to the STA, so that STAs parking on at least two frequency segments performs MU-MIMO transmission on a same MU-MIMO frequency domain resource.

Based on the foregoing manners of signaling field setting, some embodiments provides a data transmission method. The data transmission method is for transmitting a signaling field of a PPDU, and the foregoing manner of signaling field setting is used to simplify a user field in a signaling field in an MU-MIMO scenario, and ensure that a signaling field transmitted on each frequency segment accurately indicates a user field corresponding to a frequency domain resource for MU-MIMO transmission, and STAs parking on at least two frequency segments performs MU-MIMO transmission on a same MU-MIMO frequency domain resource.

Figure 7:
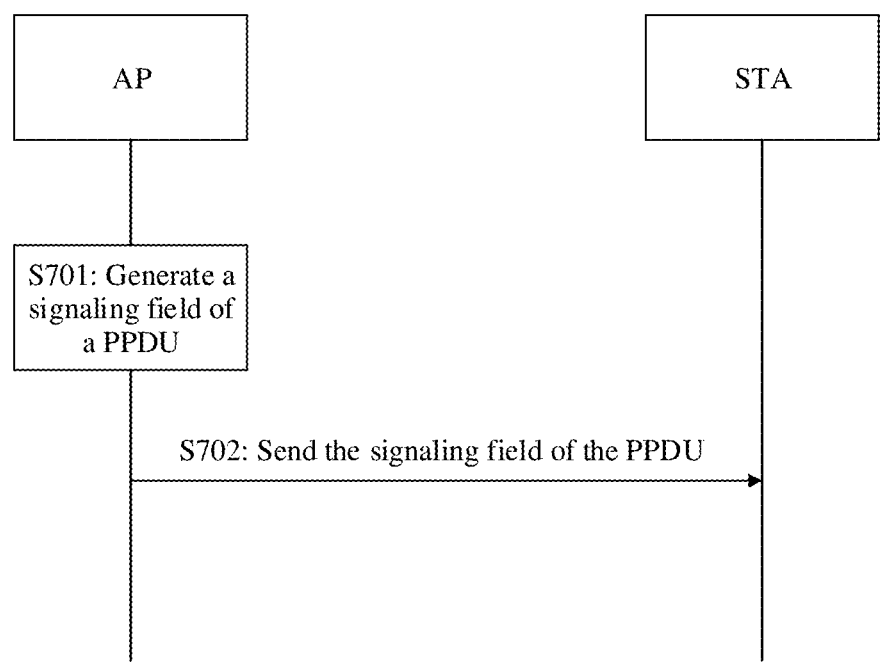
FIG. 7 is a schematic flowchart of a data transmission method according to some embodiments.

Refer to FIG. 7. FIG. 7 is a schematic flowchart of a data transmission method according to some embodiments. In some embodiments, an embodiment in which an AP sends a PPDU to a STA is used for description. The data transmission method in some embodiments is further applicable to a scenario in which an AP sends a PPDU to another AP, and a scenario in which a STA sends a PPDU to another STA. In different scenarios, names of transmitted PPDUs and signaling fields in the PPDUs are different, but functions and roles thereof are similar. Details are not described in some embodiments.

In a scenario of this embodiment, a channel bandwidth used by an AP to transmit a PPDU to a STA includes at least two frequency segments, the at least two frequency segments include a first frequency segment, the first frequency segment is any one of the at least two frequency segments, and several STAs park on each frequency segment. For example, a quantity of stations parking on one frequency segment is any quantity greater than or equal to 0.

The data transmission method in some embodiments includes the following steps.

701: An AP generates a signaling field of a PPDU.

Step 701 is implemented by a processor of the AP. In other words, the processor of the AP generates the signaling field of the PPDU.

The signaling field is a signaling field transmitted on a first frequency segment. The signaling field indicates allocation of channel bandwidth for transmitting the PPDU. The signaling field is set in the foregoing manner of signaling field setting.

In 802.11be, the signaling field is an EHT-SIG, or is a U-SIG and an EHT-SIG. The signaling field in some embodiments is not limited to a SIG field in 802.11be. The signaling field in some embodiments alternatively is a SIG field related to a standard version after 802.11be.

702: The AP sends the signaling field on the first frequency segment.

Step 702 is implemented by a transceiver of the AP. In other words, the transceiver of the AP sends the signaling field on the first frequency segment.

Correspondingly, a STA parking on the first frequency segment receives the signaling field that is of the PPDU and that is sent by the AP, obtains a user field carrying an identifier of the STA from the signaling field, and further obtains data transmitted on a frequency domain resource corresponding to the user field. A transceiver of the STA receives the signaling field that is of the PPDU and that is sent by the AP. A processor of the STA obtains the user field carrying the identifier of the STA from the signaling field, and further obtains the data transmitted on the frequency domain resource corresponding to the user field.

Based on the foregoing data transmission method, the following separately describes a content structure of the signaling field in response to the foregoing two manners of signaling field setting being used.

In the foregoing first possible manner of signaling field setting, the signaling field includes a user field of a STA that parks on the first frequency segment and to which an MU-MIMO frequency domain resource is allocated, and a field indicating a quantity of user fields of STAs that park on the first frequency segment and to which an MU-MIMO frequency domain resource is allocated, where the MU-MIMO frequency domain resource is a frequency domain resource that is in the channel bandwidth and that is used for MU-MIMO transmission. Each user field includes a station identifier of a STA corresponding to the user field.

In response to the MU-MIMO frequency domain resource being allocated to five STAs, including three STAs parking on the first frequency segment, and two STAs parking on a frequency segment other than the first frequency segment, the quantity of user fields corresponding to the MU-MIMO frequency domain resource indicated in the signaling field is 3.

In this embodiment, the signaling field is a signaling field transmitted on the first frequency segment. A station parking on the first frequency segment is understood as a station parking on a current frequency segment.

The following describes how to set signaling fields in OFDMA and non-OFDMA scenarios.

In an OFDMA scenario, an MU-MIMO frequency domain resource for MU-MIMO transmission in the foregoing channel bandwidth is understood as an RU for MU-MIMO transmission.

The signaling field includes a resource unit allocation subfield, and the resource unit allocation subfield indicates the RU for MU-MIMO transmission and a quantity of user fields corresponding to the RU. The quantity that is of user fields corresponding to the RU for MU-MIMO transmission and that is indicated by the resource unit allocation subfield is a quantity of STAs that park on the first frequency segment and to which the RU is allocated, instead of a total quantity of STAs to which the RU is allocated. The signaling field further includes several user fields corresponding to the RU. The several user fields are user fields corresponding to several STAs that park on the first frequency segment and to which the RU is allocated. In some embodiments, the quantity of STAs that park on the first frequency segment and to which the RU is allocated is greater than or equal to 0, and is less than or equal to a maximum quantity of users that is supported by one RU during MU-MIMO transmission. For example, in the 802.11be standard, a maximum quantity of users that is supported by one RU during MU-MIMO transmission is 8. In this case, the quantity of STAs that park on the first frequency segment and to which the RU is allocated is a value greater than or equal to 0 and less than or equal to 8, and the quantity of user fields corresponding to the RU is a quantity greater than or equal to 0 and less than or equal to 8.

The following provides explanation and description with reference to examples. In some embodiments, an example in which each resource unit allocation subfield uses 20 MHz as a granularity to indicate RU allocation corresponding to a 20 MHz frequency band is used for description. In another embodiment, a granularity of each resource unit allocation subfield is not limited to 20 MHz.

The following exemplifies a scenario in which the channel bandwidth for transmitting the PPDU is 320 MHz and the channel bandwidth for transmitting the PPDU is divided into four frequency segments.

In an ascending order of frequencies, a first frequency segment is a first 80 MHz frequency band, a second frequency segment is a second 80 MHz frequency band, a third frequency segment is a third 80 MHz frequency band, and a fourth frequency segment is a fourth 80 MHz frequency band. In this embodiment, a part of frequency domain in the 320 MHz channel bandwidth is used as an example, and other parts are not listed one by one in some embodiments. Examples in some embodiments are based on the frequency segment architecture. Details are not described in the following examples.

Figure 8A:
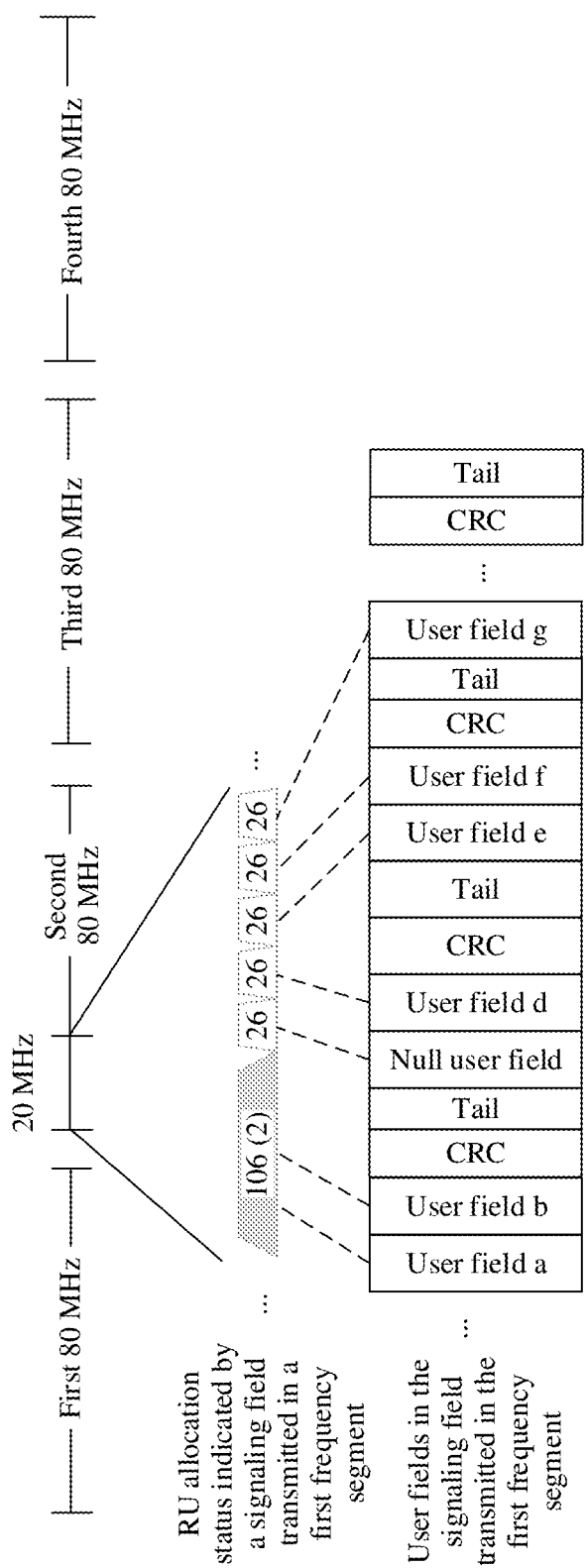
FIG. 8A is a schematic diagram of a scenario in which a signaling field indicates RU allocation according to some embodiments.
Figure 8B:
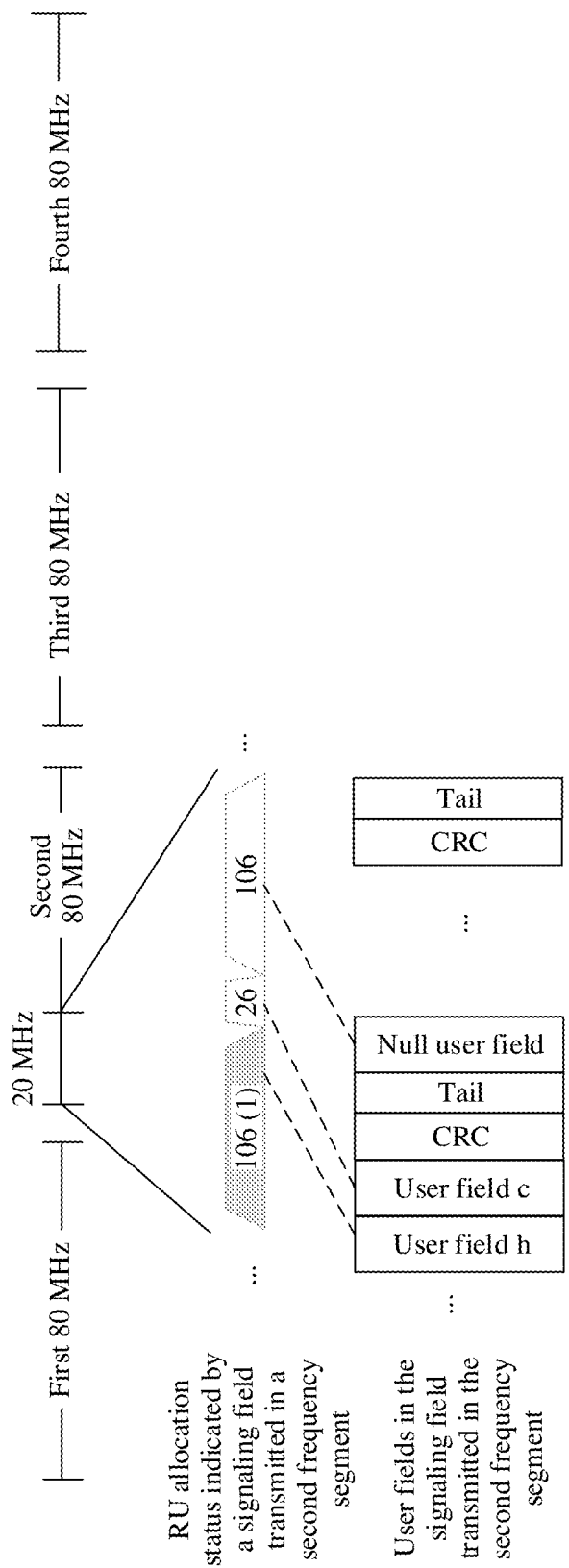
FIG. 8B is a schematic diagram of another scenario in which a signaling field indicates RU allocation according to some embodiments.

In an example, each of FIG. 8A and FIG. 8B is a schematic diagram of a scenario in which a signaling field indicates RU allocation. In an ascending order of frequencies, RUs corresponding to a lowest frequency 20 MHz frequency band in a second 80 MHz frequency band for transmitting a PPDU include a 106-tone RU, a 26-tone RU, a 26-tone RU, a 26-tone RU, a 26-tone RU, and a 26-tone RU. The 106-tone RU is allocated to three STAs: a STA a corresponding to a user field a, a STA b corresponding to a user field b, and a STA h corresponding to a user field h. In some embodiments, MU-MIMO involving three stations is formed. In the five 26-tone RUs, the first 26-tone RU is an RU allocated to a STA parking on the second frequency segment, and the second to fifth 26-tone RUs are respectively allocated to four STAs parking on the first frequency segment. In the three STAs to which the 106-tone RU is allocated, two STAs (the STA a and the STA b) park on the first frequency segment, and one STA (the STA h) parks on the second frequency segment. In response to the 106-tone RU being allocated to three STAs, the 106-tone RU is an RU for MU-MIMO transmission.

As shown in FIG. 8A, in a signaling field transmitted on a first frequency segment, a resource unit allocation subfield corresponding to the 20 MHz frequency band indicates that RUs corresponding to the 20 MHz frequency band are a 106-tone RU, a 26-tone RU, a 26-tone RU, a 26-tone RU, a 26-tone RU, and a 26-tone RU, and indicates that a quantity of user fields corresponding to the 106-tone RU is 2. The signaling field transmitted on the first frequency segment includes two user fields corresponding to the 106-tone RU: the user field a and the user field b. In the signaling field transmitted on the first frequency segment, user fields following the user field b sequentially include a null user field, a user field d, a user field e, a user field f, and a user field g, and one to one correspond to the five 26-tone RUs. The null user field indicates that a user field corresponding to the first 26-tone RU is null.

In some embodiments, in response to receiving the signaling field, a STA parking on the first frequency segment determines, based on the resource unit allocation subfield that is in the signaling field transmitted on the first frequency segment and that corresponds to the 20 MHz frequency band, that a sequence of the RUs corresponding to the 20 MHz frequency band is the 106-tone RU, the 26-tone RU, the 26-tone RU, the 26-tone RU, the 26-tone RU, and the 26-tone RU, and the quantity of user fields corresponding to the 106-tone RU is 2. The STA a determines, according to the user field a including a station identifier of the STA a, that the 106-tone RU is the RU allocated to the STA a; and the STA b determines, according to the user field b including a station identifier of the STA b, that the 106-tone RU is the RU allocated to the STA b. The STA d determines, according to the user field d including a station identifier of the STA d, that the second 26-tone RU following the 106-tone RU is the RU allocated to the STA d.

As shown in FIG. 8B, in a signaling field transmitted on a second frequency segment, a resource unit allocation subfield corresponding to the 20 MHz frequency band indicates that RUs corresponding to the 20 MHz frequency band are a 106-tone RU, a 26-tone RU, and a 106-tone RU, indicates that a quantity of user fields corresponding to the first 106-tone RU is 1, and indicates that a quantity of user fields corresponding to the second 106-tone RU is 1. The signaling field transmitted on the second frequency segment includes one user field corresponding to the first 106-tone RU, where the user field is the user field h. In the signaling field transmitted on the second frequency segment, a user field following the user field h sequentially includes a user field c and a null user field, which respectively correspond to the 26-tone RU and the second 106-tone RU.

In some embodiments, a STA receiving the signaling field determines, based on the resource unit allocation subfield corresponding to the 20 MHz frequency band, that a sequence of the RUs corresponding to the 20 MHz frequency band is a 106-tone RU, a 26-tone RU, a 106-tone RU, and the quantity of user fields corresponding to the first 106-tone RU is 1. The STA h determines, according to the user field h including a station identifier of the STA h, that the 106-tone RU is an RU allocated to the STA h. In this case, a STA c determines the user field c including a station identifier of the STA c, and determine that the first 26-tone RU after the 106-tone RU is an RU allocated to the STA c.

In some embodiments, in this solution, the user field of the STA h not parking on the first frequency segment is not transmitted in the signaling field transmitted on the first frequency segment, and in the signaling field, the STA h not parking on the first frequency segment is not counted in the quantity of users of the 106-tone RU indicated by the resource unit allocation subfield corresponding to the 106-tone RU. In the signaling field transmitted on the first frequency segment, a quantity of STAs (the STA a and the STA b) that park on the first frequency segment and to which the 106-tone RU is allocated is counted in the quantity of users of the 106-tone RU indicated by the resource unit allocation subfield corresponding to the 106-tone RU. Similarly, in the signaling field transmitted on the second frequency segment, a quantity of STAs (the STA h) that park on the second frequency segment and to which the 106-tone RU is allocated is counted in the quantity of users of the 106-tone RU indicated by the resource unit allocation subfield corresponding to the 106-tone RU. In some embodiments, according to the technical solution in some embodiments, a sequence of user fields in a signaling field transmitted on each frequency segment matches an RU indicated by a resource unit allocation subfield in the signaling field and a quantity of users corresponding to the RU, so that an RU corresponding to a user field is accurately indicated. This avoids misplacement between a sequence of user fields and a sequence of RUs caused by omission of a user field.

In addition, in the signaling field transmitted on the first frequency segment, for a user field corresponding to an RU (the first 26-tone RU) of a STA (the STA c) not parking on the first frequency segment, the user field c of the STA c is not indicated according to a situation, and a null user field is used for simplification. In the signaling field transmitted on the second frequency segment, an RU allocated to a STA not parking on the second frequency segment is not indicated based on RU allocation. Instead, RUs (the second to fifth 26-tone RUs) of the STAs not parking on the second frequency segment are combined and simplified into one RU (106-tone RU), and the RU corresponds to one user field. In some embodiments, the signaling field includes one user field corresponding to one RU (corresponding to a plurality of RUs) indicated in a combined and simplified manner. Each RU of a STA not parking on the first frequency segment is not separately indicated based on RU allocation, and a user field corresponding to each RU of each STA not parking on the first frequency segment is not separately set. In some embodiments, a quantity of user fields is reduced. For example, in response to indication being performed based on a situation, four user fields corresponding to the second to fifth 26-tone RUs call to be separately set. However, in the example shown in FIG. 8B, one null user field corresponding to the second 106-tone RU (corresponding to the second to fifth 26-tone RUs) indicated in a combined and simplified manner is set. Three user fields are saved, reducing signaling field overheads.

Certainly, the manner of indicating the first to fifth 26-tone RUs and the manner of user field setting are not limited to the foregoing manners in the examples. In another embodiment, the first to fifth 26-tone RUs further is indicated in another manner, or a corresponding user field is set in another manner.

Figure 9A:
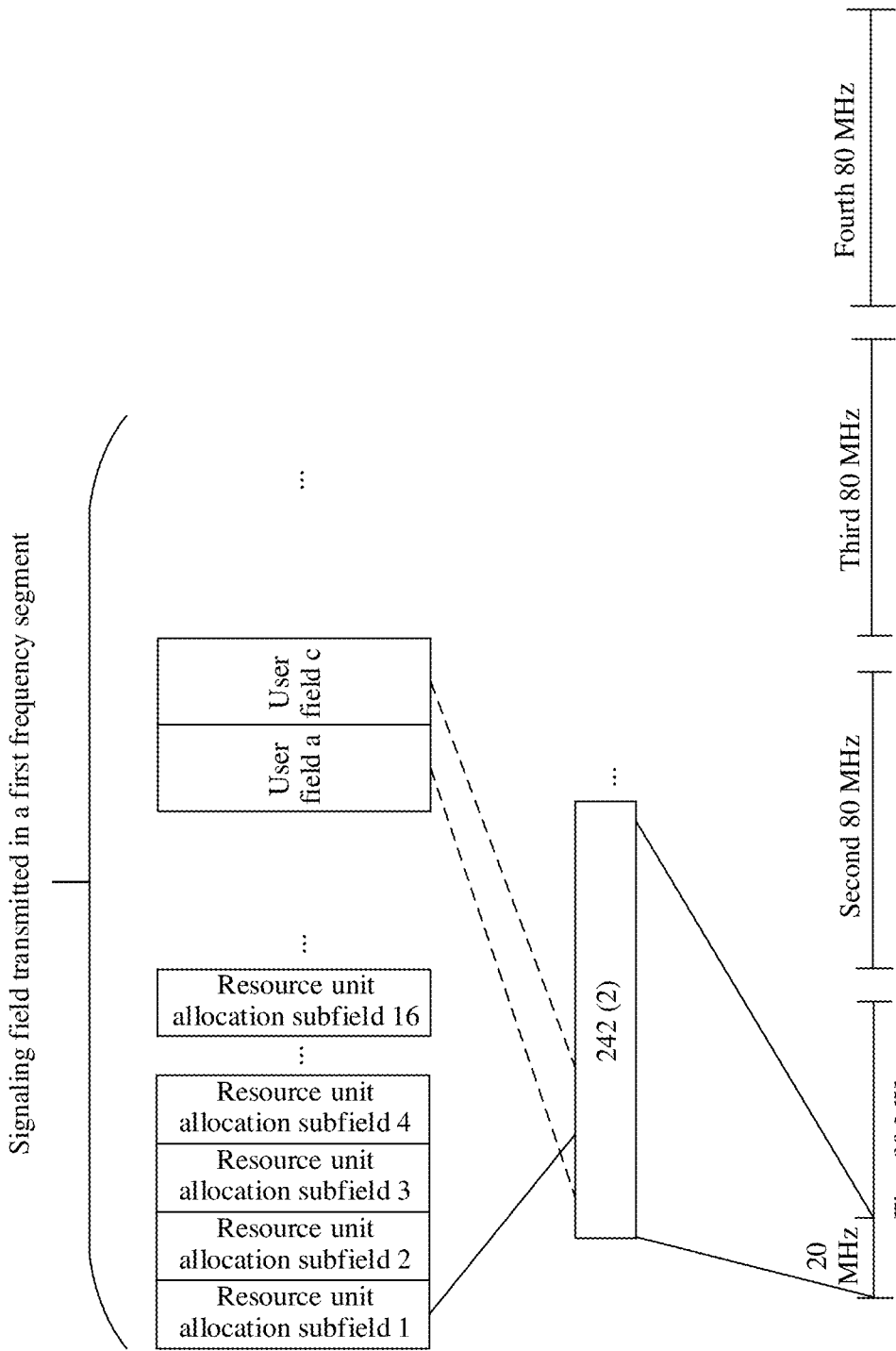
FIG. 9A is a schematic diagram of another scenario in which a signaling field indicates RU allocation according to some embodiments.
Figure 9B:
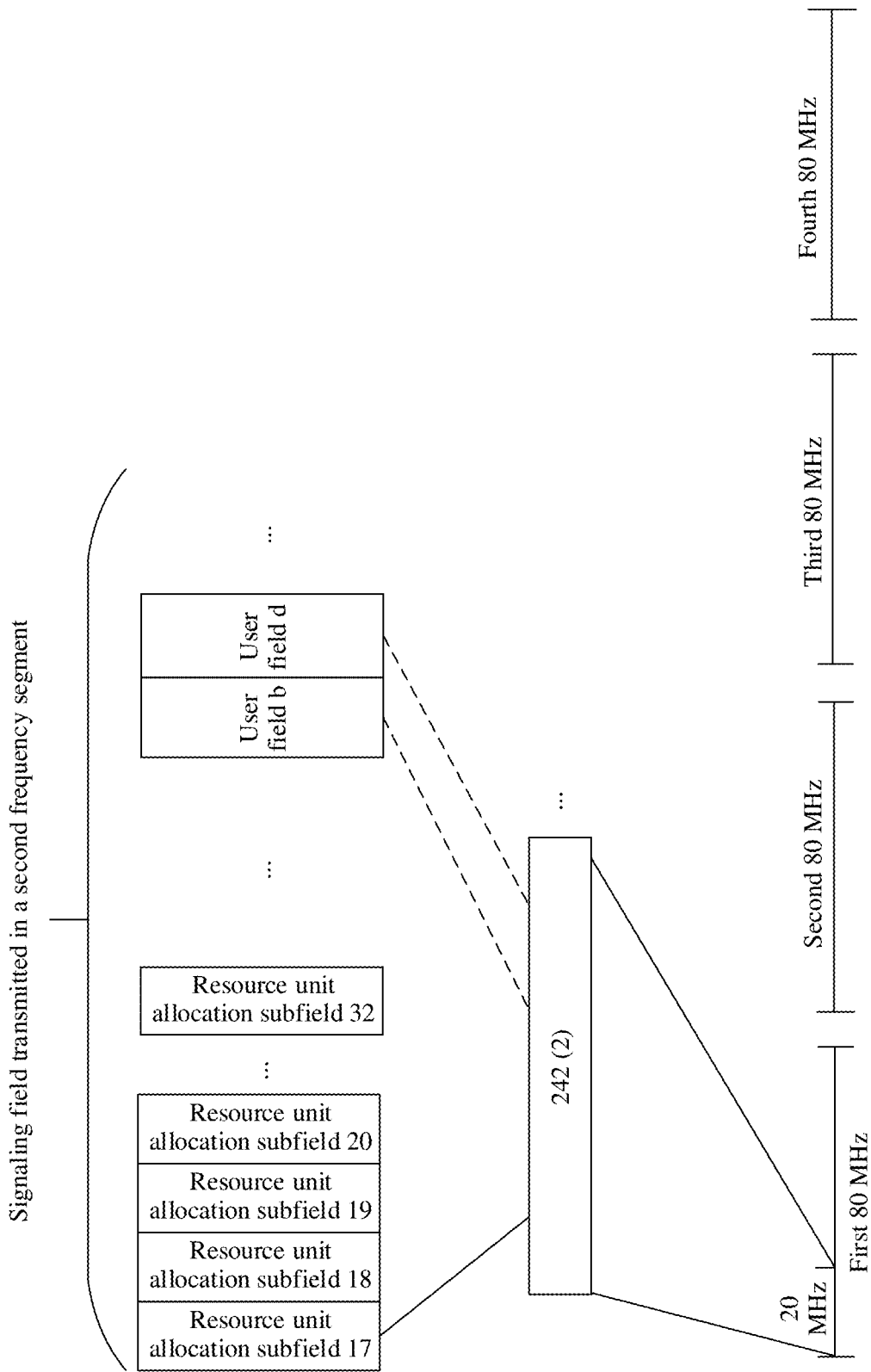
FIG. 9B is a schematic diagram of another scenario in which a signaling field indicates RU allocation according to some embodiments.

In another example, each of FIG. 9A and FIG. 9B is a schematic diagram of a scenario in which a signaling field indicates RU allocation. In an ascending order of frequencies, an RU corresponding to a lowest frequency 20 MHz frequency band in a first 80 MHz frequency band for transmitting a PPDU includes one 242-tone RU. The 242-tone RU is an RU for MU-MIMO transmission. The 242-tone RU is allocated to four STAs: a STA a, a STA b, a STA c and a STA d. The STA a and the STA c park on the first frequency segment, and the STA b and the STA d park on the second frequency segment.

As shown in FIG. 9A, in a signaling field transmitted on a first frequency segment, a resource unit allocation subfield 1 corresponding to the 20 MHz frequency band indicates that an RU corresponding to the 20 MHz frequency band is a 242-tone RU, and indicates that a quantity of user fields corresponding to the 242-tone RU is 2. The signaling field transmitted on the first frequency segment includes two user fields corresponding to the 242-tone RU: a user field a of the STA a and a user field c of the STA c.

As shown in FIG. 9B, in a signaling field transmitted on a second frequency segment, a resource unit allocation subfield 17 corresponding to the 20 MHz frequency band indicates that an RU corresponding to the 20 MHz frequency band is a 242-tone RU, and indicates that a quantity of user fields corresponding to the 242-tone RU is 2. The signaling field transmitted on the second frequency segment includes two user fields corresponding to the 242-tone RU: a user field b of the STA b and a user field d of the STA d.

In some embodiments, in response to receiving the signaling field, a STA parking on the first frequency segment determines, based on the resource unit allocation subfield 1 corresponding to the 20 MHz frequency band in the signaling field transmitted on the first frequency segment, that an RU corresponding to the 20 MHz frequency band is a 242-tone RU. The STA a determines, based on the user field a including a station identifier of the STA a and the resource unit allocation subfield 1, that the user field a is the first user field that is in the signaling field transmitted on the first frequency segment and that corresponds to the 242-tone RU indicated by the resource unit allocation subfield, to determine that the 242-tone RU is an RU allocated to the STA a.

The STA c determines, based on the user field c including a station identifier of the STA c and the resource unit allocation subfield, that the user field c is the second user field that is in the signaling field transmitted on the first frequency segment and that corresponds to the 242-tone RU indicated by the resource unit allocation subfield, to determine that the 242-tone RU is an RU allocated to the STA c.

Similarly, in response to receiving the signaling field, a STA parking on the second frequency segment determines, based on the resource unit allocation subfield 17 corresponding to the 20 MHz frequency band in the signaling field transmitted on the second frequency segment, that an RU corresponding to the 20 MHz frequency band is a 242-tone RU. The STA b determines, based on the user field b including a station identifier of the STA b and the resource unit allocation subfield 17, that the user field b is the first user field that is in the signaling field transmitted on the second frequency segment and that corresponds to the 242-tone RU indicated by the resource unit allocation subfield, to determine that the 242-tone RU is an RU allocated to the STA b. The STA d determines, based on the user field d including a station identifier of the STA d and the resource unit allocation subfield, that the user field d is the second user field that is in the signaling field transmitted on the second frequency segment and that corresponds to the 242-tone RU indicated by the resource unit allocation subfield, to determine that the 242-tone RU is an RU allocated to the STA d.

Figure 10A:
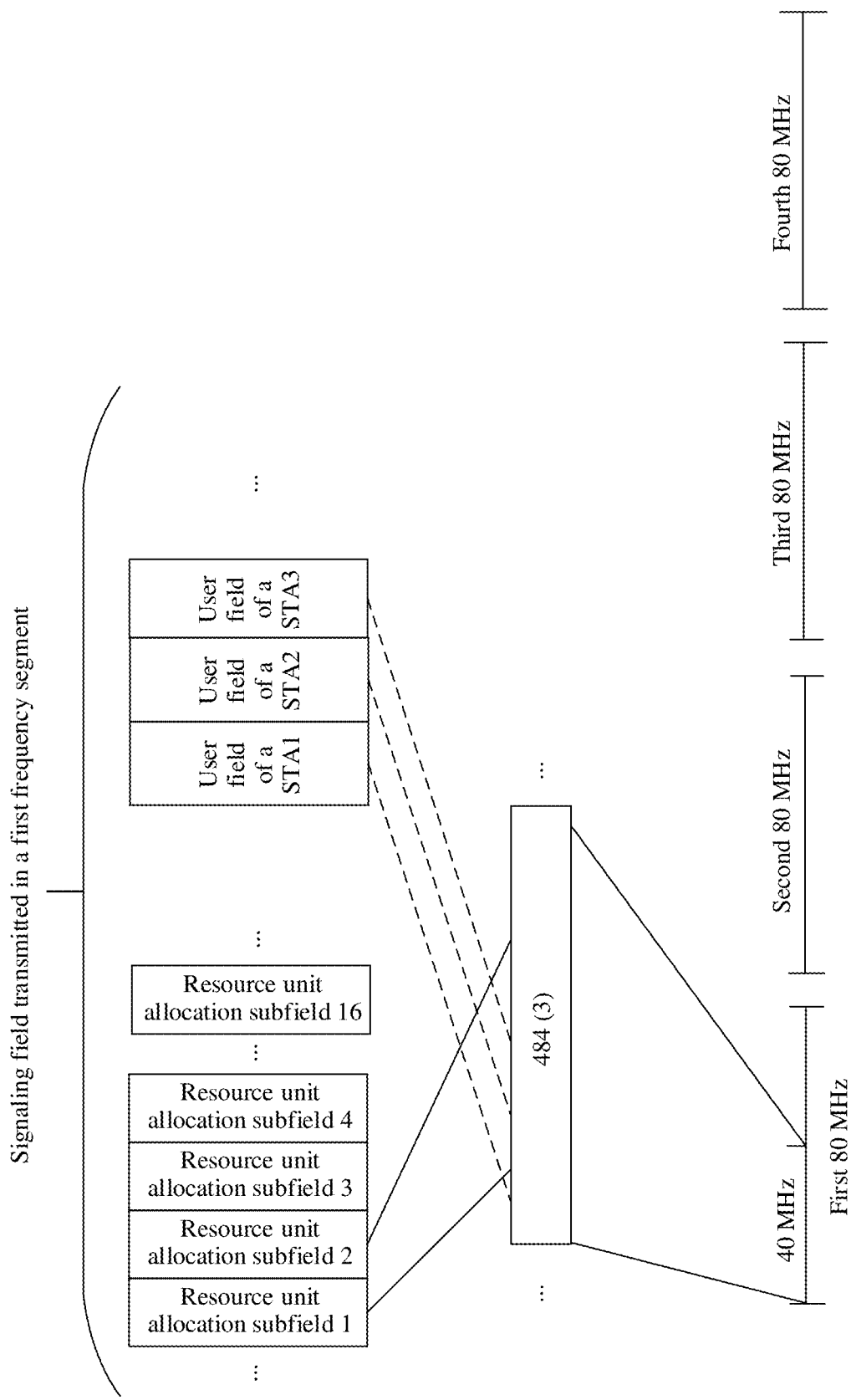
FIG. 10A is a schematic diagram of another scenario in which a signaling field indicates RU allocation according to some embodiments.
Figure 10B:
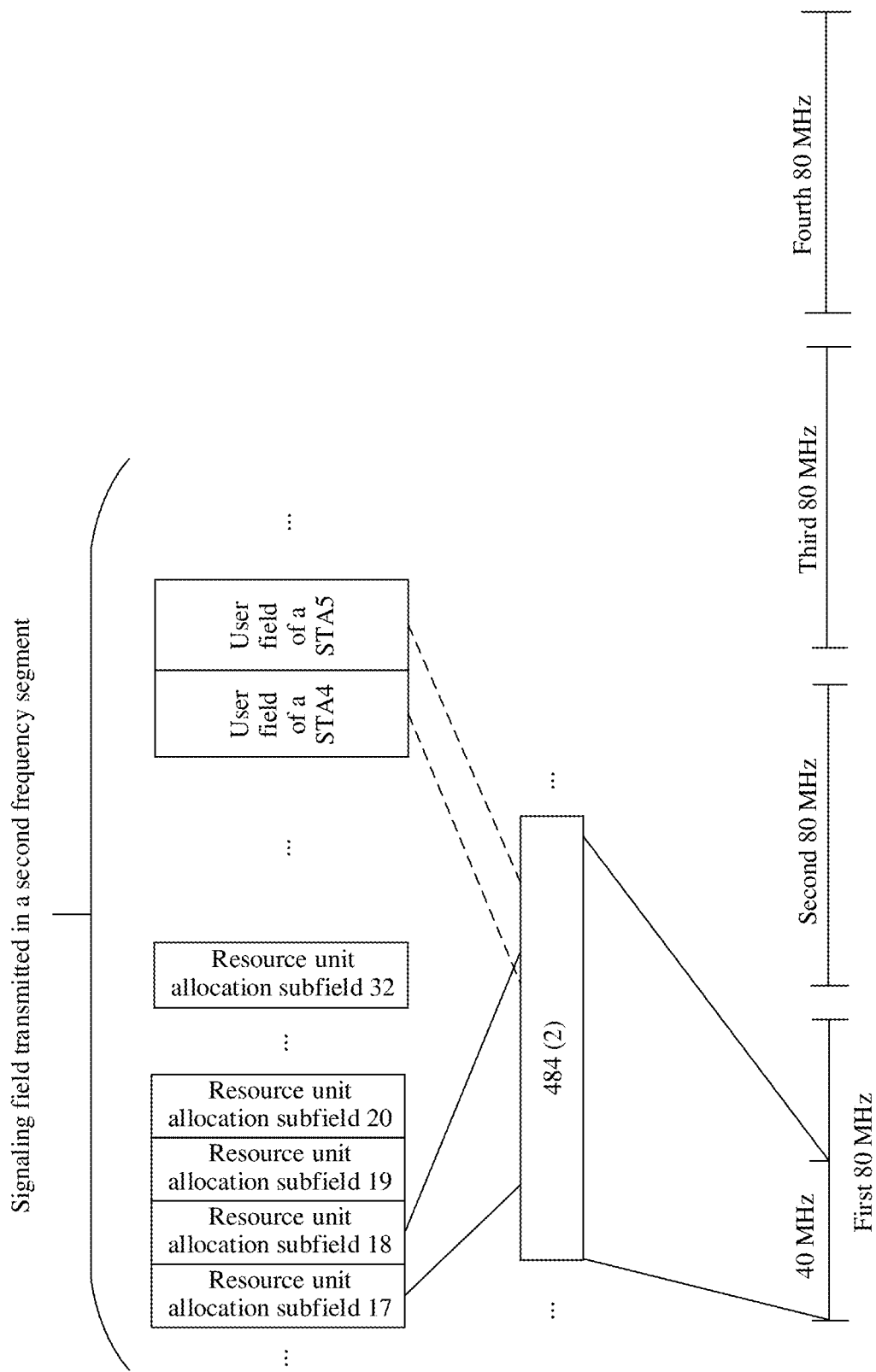
FIG. 10B is a schematic diagram of another scenario in which a signaling field indicates RU allocation according to some embodiments.

In still another example, each of FIG. 10A and FIG. 10B is a schematic diagram of a scenario in which a signaling field indicates RU allocation. An RU corresponding to a lowest frequency 40 MHz frequency band in a first 80 MHz frequency band is a 484-tone RU. The 484-tone RU is allocated to five STAs: a STA1, a STA2, a STA3, and a STA5. In the four STAs, the STA1, the STA2, and the STA3 are STAs parking on the first frequency segment, and the STA 4 and the STA 5 are STAs parking on the second frequency segment.

Refer to FIG. 10A. In response to a resource unit allocation subfield being at a granularity of 20 MHz, a signaling field transmitted on a first frequency segment includes a resource unit allocation subfield 1 and a resource unit allocation subfield 2 that correspond to the 40 MHz frequency band. In other words, the 40 MHz frequency band is indicated by the resource unit allocation subfield 1 and the resource unit allocation subfield 2.

The resource unit allocation subfield 1 indicates the 484-tone RU, and a quantity of user fields corresponding to the 484-tone RU is 2. The resource unit allocation subfield 2 indicates the 484-tone RU, and a quantity of user fields corresponding to the 484-tone RU is 1. In some embodiments, a sum of quantities of user fields indicated by the resource unit allocation subfield 1 and the resource unit allocation subfield 2 is 3.

The signaling field transmitted on the first frequency segment further includes a user field of the STA1, a user field of the STA2, and a user field of the STA3. The user field of the STA1 includes a station identifier of the STA1, the user field of the STA2 includes a station identifier of the STA2, and the user field of the STA3 includes a station identifier of the STA3.

Refer to FIG. 10B. A signaling field transmitted on a second frequency segment includes a resource unit allocation subfield 17 and a resource unit allocation subfield 18 that correspond to the 40 MHz frequency band. In other words, the 40 MHz frequency band is indicated by a resource unit allocation subfield 17 and a resource unit allocation subfield 18.

The resource unit allocation subfield 17 indicates the 484-tone RU, and a quantity of user fields corresponding to the 484-tone RU is 1. The resource unit allocation subfield 18 indicates the 484-tone RU, and a quantity of user fields corresponding to the 484-tone RU is 1. In some embodiments, a sum of quantities of user fields indicated by the resource unit allocation subfield 17 and the resource unit allocation subfield 18 is 2.

The signaling field transmitted on the second frequency segment further includes a user field of the STA4 and a user field of the STA5. The user field of the STA4 includes a station identifier of the STA4, and the user field of the STA5 includes a station identifier of the STA5.

In some embodiments, in response to receiving the signaling field, a STA parking on the first frequency segment determines, based on the resource unit allocation subfield 1 and the resource unit allocation subfield 2 that are in the signaling field transmitted on the first frequency segment and that correspond to the 40 MHz frequency band, that an RU corresponding to the 40 MHz frequency band is a 484-tone RU. The STA1 determines, based on the user field of the STA1 and the resource unit allocation subfield 1 corresponding to the 40 MHz frequency band, that the user field of the STA1 is the first user field that is in the signaling field transmitted on the first frequency segment and that corresponds to the 484-tone RU indicated by the resource unit allocation subfield 1, to determine that the 484-tone RU is an RU allocated to the STA1. The STA2 determines, based on the user field of the STA2 and the resource unit allocation subfield 1, that the user field of the STA2 is the second user field that is in the signaling field transmitted on the first frequency segment and that corresponds to the 484-tone RU indicated by the resource unit allocation subfield 1, to determine that the 484-tone RU is an RU allocated to the STA2. The STA3 determines, based on the user field 3 of the STA3 and the resource unit allocation subfield 2 corresponding to the 40 MHz frequency band, that the user field of the STA3 is a user field that is in the signaling field transmitted on the first frequency segment and that corresponds to the 484-tone RU indicated by the resource unit allocation subfield 2, to determine that the 484-tone RU is an RU allocated to the STA3.

Similarly, in response to receiving the signaling field, a STA parking on the second frequency segment determines, based on the resource unit allocation subfield 17 and the resource unit allocation subfield 18 that are in the signaling field transmitted on the second frequency segment and that correspond to the 40 MHz frequency band, that an RU corresponding to the 40 MHz frequency band is a 484-tone RU. The STA4 determines, based on the user field of the STA4 and the resource unit allocation subfield 17 corresponding to the 40 MHz frequency band, that the user field of the STA4 is a user field that is in the signaling field transmitted on the second frequency segment and that corresponds to the 484-tone RU indicated by the resource unit allocation subfield 17, to determine that the 484-tone RU is an RU allocated to the STA4. The STA5 determines, based on the user field of the STA5 and the resource unit allocation subfield 18 corresponding to the 40 MHz frequency band, that the user field of the STA5 is a user field that is in the signaling field transmitted on the second frequency segment and that corresponds to the 484-tone RU indicated by the resource unit allocation subfield 18, to determine that the 484-tone RU is an RU allocated to the STA5.

In a signaling field transmitted on the first frequency segment, in response to an RU for MU-MIMO transmission being indicated by one resource unit allocation subfield, a quantity of user fields indicated by the one resource unit allocation subfield is a quantity of stations that park on the first frequency segment and that participate in MU-MIMO transmission on the RU, instead of a total quantity of STAs participating in MU-MIMO transmission on the RU. Refer to the example corresponding to FIG. 8A. A 20 MHz frequency band in FIG. 8A corresponds to one resource unit allocation subfield, and the resource unit allocation subfield indicates one 106-tone RU and five 26-tone RUs. The 106-tone RU corresponds to one resource unit allocation subfield.

In a signaling field transmitted on the first frequency segment, in response to an RU for MU-MIMO transmission being indicated by two or more resource unit allocation subfields, a sum of quantities of user fields indicated by the two or more resource unit allocation subfields is a quantity of stations that park on the first frequency segment and that participate in MU-MIMO transmission on the RU. Refer to the example corresponding to FIG. 10A. A highest frequency 40 MHz frequency band of the second 80 MHz frequency band corresponds to two resource unit allocation subfields, and a sum of quantities of user fields indicated by the two resource unit allocation subfields is a quantity of stations that park on the first frequency segment and that participate in MU-MIMO transmission on the 484-tone RU. In some embodiments, in response to a frequency domain resource corresponding to an MU-MIMO RU being greater than a granularity of one resource unit allocation subfield, the RU for MU-MIMO transmission is indicated by two or more resource unit allocation subfields in the signaling field.

Further, the signaling field of each frequency segment is transmitted on two content channels (Content Channel, CC). Resource unit allocation subfields in the signaling field are divided into a first part and a second part. A resource unit allocation subfield of the first part is transmitted on a CC1, and a resource unit allocation subfield of the second part is transmitted on a CC2. Correspondingly, a user field corresponding to the resource unit allocation subfield of the first part is transmitted on the CC1, and a user field corresponding to the resource unit allocation subfield of the second part is transmitted on the CC2.

For example, an odd-numbered resource unit allocation subfield in the signaling field is transmitted on the CC1, and a user field corresponding to the odd-numbered resource unit allocation subfield is further transmitted on the CC1. An even-numbered resource unit allocation subfield in the signaling field is transmitted on the CC2, and a user field corresponding to the even-numbered resource unit allocation subfield is further transmitted on the CC2.

In this case, in a signaling field transmitted on each CC, a quantity of user fields corresponding to an RU that is indicated by a resource unit allocation subfield and that is used for MU-MIMO transmission is a quantity of user fields contributed by the RU to a CC on which the corresponding resource unit allocation subfield is located.

With reference to the example corresponding to FIG. 10A, the resource unit allocation subfield 1 is transmitted on a CC1, and the resource unit allocation subfield 2 is transmitted on a CC2. The resource unit allocation subfield 1 indicates a 484-tone RU, and user fields that are on the CC1 and that correspond to the 484-tone RU are the user field of the STA1 and the user field of the STA2. The resource unit allocation subfield 2 indicates a 484-tone RU, and a user field that is on the CC2 and that corresponds to the 484-tone RU is the user field of the STA3.

In some embodiments, overheads of the signaling field is allocated to the two CCs for transmission, and a quantity of resource unit allocation subfields and a quantity of user fields that are transmitted on each CC are reduced, reducing overheads of the signaling field.

In a non-OFDMA scenario, an MU-MIMO frequency domain resource that is in channel bandwidth for transmitting a PPDU and that is used for MU-MIMO transmission is allocated to a plurality of STAs for MU-MIMO transmission.

The MU-MIMO frequency domain resource is the channel bandwidth for transmitting the PPDU, that is, the channel bandwidth for transmitting the PPDU is allocated to the plurality of STAs for MU-MIMO transmission. In response to a part of frequency domain resources in the channel bandwidth being punctured, a frequency domain resource that is not punctured in the channel bandwidth for transmitting the PPDU is used as the MU-MIMO frequency domain resource and allocated to the plurality of STAs for MU-MIMO transmission.

In some embodiments, in non-OFDMA, a segment of frequency domain resources is allocated to a plurality of STAs for data transmission, the plurality of STAs share the segment of frequency domain resources, and the segment of frequency domain resources is not divided into a plurality of RUs and separately allocated to different STAs. In the non-OFDMA scenario, there is no resource unit allocation subfield in the PPDU, and allocation of a frequency domain resource is unable to be indicated by using the resource unit allocation subfield.

In the non-OFDMA scenario, the signaling field includes a field indicating an MU-MIMO user quantity (MU-MIMO users) and a user field. The field indicating the MU-MIMO user quantity indicates a quantity of user fields of stations that park on the first frequency segment and to which an MU-MIMO frequency domain resource is allocated. The field indicating the MU-MIMO user quantity is similar to, for example, a field indicating an MU-MIMO user quantity or an EHT-SIG symbol quantity in 802.11ax. The field indicating the MU-MIMO user quantity or the EHT-SIG symbol quantity is set before the EHT-SIG, for example, is a field in a U-SIG. This field indicates a quantity of MU-MIMO users, or indicate a quantity of EHT-SIG symbols.

A user field that is in the signaling field transmitted on the first frequency segment and that relates to the MU-MIMO frequency domain resource includes a user field of a STA parking on the first frequency segment. The user quantity indicated by the field indicating the MU-MIMO user quantity is a quantity of STAs to which the MU-MIMO frequency domain resource is allocated and that park on the first frequency segment, instead of a total quantity of users to which the MU-MIMO frequency domain resource is allocated.

For example, a channel bandwidth for transmitting a PPDU is 320 MHz, the 320 MHz channel bandwidth is not punctured, and an MU-MIMO frequency domain resource is the channel bandwidth for transmitting the PPDU. The 320 MHz channel bandwidth is allocated to five STAs: a STA1, a STA2, a STA3, a STA4, and a STA5. The STA1 and the STA3 park on a first frequency segment, and the STA2, the STA4, and the STA5 park on a second frequency segment.

Figure 11B:
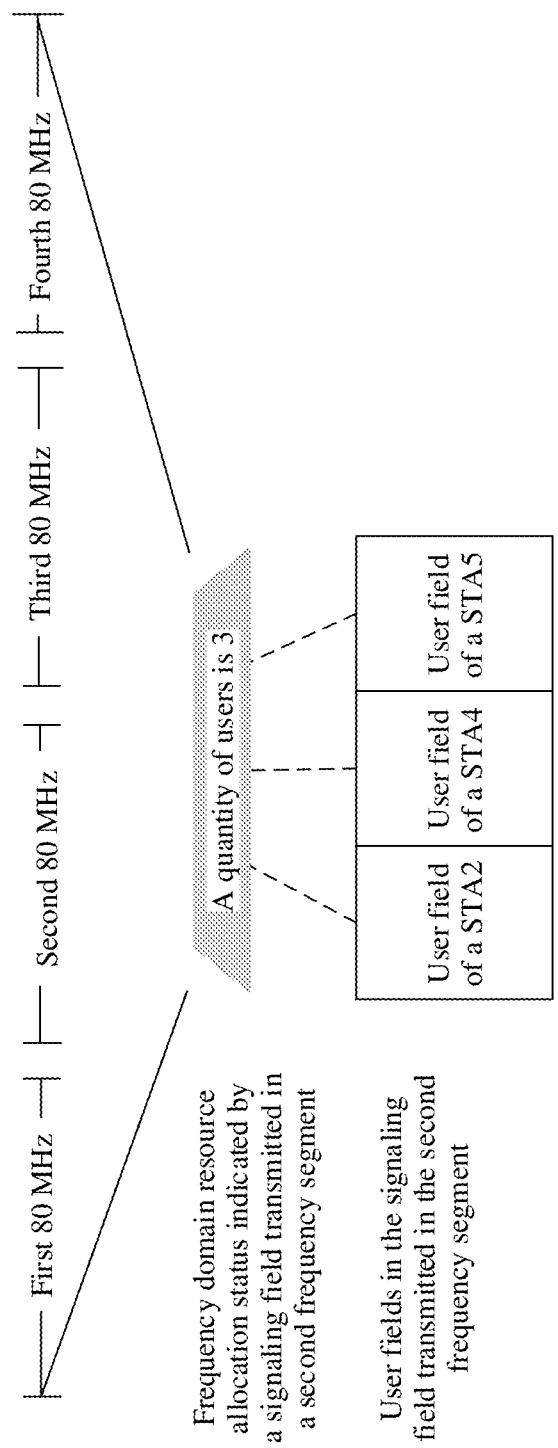
FIG. 11B is a schematic diagram of another scenario in which a signaling field indicates frequency domain resource allocation according to some embodiments.

Each of FIG. 11A and FIG. 11B is a schematic diagram of a scenario in which a signaling field indicates frequency domain resource allocation according to some embodiments. As shown in FIG. 11A and FIG. 11B, in a signaling field transmitted on a first frequency segment, a field indicating a user quantity in MU-MIMO transmission indicates two users. The signaling field transmitted on the first frequency segment further includes: a user field of the STA1 and a user field of the STA3.

A signaling field transmitted on a second frequency segment indicates that a field of user quantity transmitted in MU-MIMO transmission indicates three users. The signaling field transmitted on the second frequency segment further includes a user field of the STA2, a user field of the STA4, and a user field of the STA5.

In a related technology, a spatial stream allocation indication field in a user field is indicated according to the following Table 3-1. As shown in Table 3-1, the first column of Table 3-1 is a quantity of users (stations) participating in MU-MIMO transmission. For example, in an OFDMA scenario or a non-OFDMA scenario, the quantity of users is a quantity of users corresponding to an MU-MIMO frequency domain resource for MU-MIMO transmission. In some embodiments, the quantity of users is not a quantity of users to which the MU-MIMO frequency domain resource is allocated and that park on the frequency segment, but a total quantity of users to which the MU-MIMO frequency domain resource is allocated.

TABLE 3-1

| Quantity of users (Number of users) | Index for spatial stream indication | $N_{sts}$ [1] | $N_{sts}$ [2] | $N_{sts}$ [3] | $N_{sts}$ [4] | $N_{sts}$ [5] | $N_{sts}$ [6] | $N_{sts}$ [7] | $N_{sts}$ [8] | Total Nsts | Quantity of entries (Number of entries) |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
|   | 1010-1111 | | | | Reserved | | | | | | 6 |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
|   | 1101-1111 | | | | Reserved | | | | | | 3 |

TABLE 3-1-continued

| Quantity of users (Number of users) | Index for spatial stream indication | $N_{sts}$ [1] | $N_{sts}$ [2] | $N_{sts}$ [3] | $N_{sts}$ [4] | $N_{sts}$ [5] | $N_{sts}$ [6] | $N_{sts}$ [7] | $N_{sts}$ [8] | Total Nsts | Quantity of entries (Number of entries) |
|---|---|---|---|---|---|---|---|---|---|---|---|
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |
|   | 1011-1111 | | | | | Reserved | | | | | 5 |
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
|   | 0111-1111 | | | | | Reserved | | | | | 10 |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
|   | 0100-1111 | | | | | Reserved | | | | | 12 |
| 7 | 0000-0001 | 1-2 | 1 | 1 | 1 | 1 | 1 | 1 | | 7-8 | 2 |
|   | 0010-1111 | | | | | Reserved | | | | | 14 |
| 8 | 0000 | 1 | 1 | 1 | 1 | 1 | 1 | 1 | 1 | 8 | 1 |
|   | 0001-1111 | | | | | Reserved | | | | | 15 |

The second column of Table 3-1 is an index for spatial stream indication. A field for spatial stream indication or a spatial stream allocation indication field indicates, according to an index for spatial stream indication in the second column of Table 3-1, a spatial stream allocated to each of a plurality of stations to which the MU-MIMO frequency domain resource is allocated. In a row in which each index for spatial stream indication is located and that is in the second column of Table 3-1, a quantity of spatial streams allocated to a station corresponding to each user field is sequentially indicated in an arrangement order of the user fields. Each of the plurality of user fields corresponding to the MU-MIMO frequency domain resource corresponds to one of columns 3 to 10 according to an arrangement order.

For example, in an OFDMA scenario, in response to a quantity of stations (quantity of users) corresponding to an RU used for MU-MIMO transmission being 2, in response to a field for spatial stream indication in a user field corresponding to the RU being 0000, a determination is made, according to a row in which 0000 is located in response to the quantity of users being 2 in Table 3-1, that 0000 indicates that one stream is allocated to a STA corresponding to a first user field corresponding to the RU, one stream is allocated to a STA corresponding to a second user field corresponding to the RU. In response to a quantity of stations (quantity of users) corresponding to MU-MIMO transmission being 2, in response to a field for spatial stream indication being 0001, a determination is made, according to a row in which 0001 is located in response to the quantity of users being 3 in Table 3-1, that 0001 indicates that two streams are allocated to a STA corresponding to a first user field corresponding to the RU, one stream is allocated to a STA corresponding to a second user field corresponding to the RU, and one stream is allocated to a STA corresponding to a third user field corresponding to the RU.

Similarly, in a non-OFDMA scenario, in a user field corresponding to an MU-MIMO frequency domain resource for MU-MIMO transmission, the index for spatial stream indication in Table 3-1 further is used to indicate spatial stream allocation of a plurality of STAs to which the MU-MIMO frequency domain resource is allocated.

Alternatively, the spatial stream allocation indication field in the user field is indicated according to an index in the following Table 3-2. As shown in Table 3-2, the first column of Table 3-2 is a total quantity of users (stations) participating in MU-MIMO transmission. For example, in an OFDMA scenario or a non-OFDMA scenario, the quantity of users is a total quantity of users corresponding to an MU-MIMO frequency domain resource for MU-MIMO transmission. In some embodiments, the quantity of users is not a quantity of users to which the MU-MIMO frequency domain resource is allocated and that park on the frequency segment, but a total quantity of users to which the MU-MIMO frequency domain resource is allocated.

TABLE 3-2

| Nuser | B5...B0 | Nsts [1] | Nsts [2] | Nsts [3] | Nsts [4] | Nsts [5] | Nsts [6] | Nsts [7] | Nsts [8] | Total Nsts | Total entries |
|---|---|---|---|---|---|---|---|---|---|---|---|
| 2 | 000000-000011 | 1-4 | 1 | | | | | | | 2-5 | 10 |
|   | 000100-000110 | 2-4 | 2 | | | | | | | 4-6 | |
|   | 000111-001000 | 3-4 | 3 | | | | | | | 6-7 | |
|   | 001001 | 4 | 4 | | | | | | | 8 | |
| 3 | 000000-000011 | 1-4 | 1 | 1 | | | | | | 3-6 | 20 |
|   | 000100-000110 | 2-4 | 2 | 1 | | | | | | 5-7 | |
|   | 000111-001000 | 3-4 | 3 | 1 | | | | | | 7-8 | |
|   | 001001 | 4 | 4 | 1 | | | | | | 9 | |
|   | 001010-001100 | 2-4 | 2 | 2 | | | | | | 6-8 | |

TABLE 3-2-continued

| Nuser | B5...B0 | Nsts [1] | Nsts [2] | Nsts [3] | Nsts [4] | Nsts [5] | Nsts [6] | Nsts [7] | Nsts [8] | Total Nsts | Total entries |
|---|---|---|---|---|---|---|---|---|---|---|---|
| | 001101-001110 | 3-4 | 3 | 2 | | | | | | 8-9 | |
| | 001111 | 4 | 4 | 2 | | | | | | 10 | |
| | 010000-010001 | 3-4 | 3 | 3 | | | | | | 9-10 | |
| | 010010 | 4 | 4 | 3 | | | | | | 11 | |
| | 010011 | 4 | 4 | 4 | | | | | | 12 | |
| 4 | 000000-000011 | 1-4 | 1 | 1 | 1 | | | | | 4-7 | 35 |
| | 000100-000110 | 2-4 | 2 | 1 | 1 | | | | | 6-8 | |
| | 000111-001000 | 3-4 | 3 | 1 | 1 | | | | | 8-9 | |
| | 001001 | 4 | 4 | 1 | 1 | | | | | 10 | |
| | 001010-001100 | 2-4 | 2 | 2 | 1 | | | | | 7-9 | |
| | 001101-001110 | 3-4 | 3 | 2 | 1 | | | | | 9-10 | |
| | 001111 | 4 | 4 | 2 | 1 | | | | | 11 | |
| | 010000-010001 | 3-4 | 3 | 3 | 1 | | | | | 10-11 | |
| | 010010 | 4 | 4 | 3 | 1 | | | | | 12 | |
| | 010011 | 4 | 4 | 4 | 1 | | | | | 13 | |
| | 010100-010110 | 2-4 | 2 | 2 | 2 | | | | | 8-10 | |
| | 010111-011000 | 3-4 | 3 | 2 | 2 | | | | | 10-11 | |
| | 011001 | 4 | 4 | 2 | 2 | | | | | 12 | |
| | 011010-011011 | 3-4 | 3 | 3 | 2 | | | | | 11-12 | |
| | 011100 | 4 | 4 | 3 | 2 | | | | | 13 | |
| | 011101 | 4 | 4 | 4 | 2 | | | | | 14 | |
| | 011110-011111 | 3-4 | 3 | 3 | 3 | | | | | 12-13 | |
| | 100000 | 4 | 4 | 3 | 3 | | | | | 14 | |
| | 100001 | 4 | 4 | 4 | 3 | | | | | 15 | |
| | 100010 | 4 | 4 | 4 | 4 | | | | | 16 | |
| 5 | 000000-000011 | 1-4 | 1 | 1 | 1 | 1 | | | | 5-8 | 49 |
| | 000100-000110 | 2-4 | 2 | 1 | 1 | 1 | | | | 7-9 | |
| | 000111-001000 | 3-4 | 3 | 1 | 1 | 1 | | | | 9-10 | |
| | 001001 | 4 | 4 | 1 | 1 | 1 | | | | 11 | |
| | 001010-001100 | 2-4 | 2 | 2 | 1 | 1 | | | | 8-10 | |
| | 001101-001110 | 3-4 | 3 | 2 | 1 | 1 | | | | 10-11 | |
| | 001111 | 4 | 4 | 2 | 1 | 1 | | | | 12 | |
| | 010000-010001 | 3-4 | 3 | 3 | 1 | 1 | | | | 11-12 | |
| | 010010 | 4 | 4 | 3 | 1 | 1 | | | | 13 | |
| | 010011 | 4 | 4 | 4 | 1 | 1 | | | | 14 | |
| | 010100-010110 | 2-4 | 2 | 2 | 2 | 1 | | | | 9-11 | |
| | 010111-011000 | 3-4 | 3 | 2 | 2 | 1 | | | | 11-12 | |
| | 011001 | 4 | 4 | 2 | 2 | 1 | | | | 13 | |
| | 011010-011011 | 3-4 | 3 | 3 | 2 | 1 | | | | 12-13 | |
| | 011100 | 4 | 4 | 3 | 2 | 1 | | | | 14 | |
| | 011101 | 4 | 4 | 4 | 2 | 1 | | | | 15 | |
| | 011110-011111 | 3-4 | 3 | 3 | 3 | 1 | | | | 13-14 | |
| | 100000 | 4 | 4 | 3 | 3 | 1 | | | | 15 | |
| | 100001 | 4 | 4 | 4 | 3 | 1 | | | | 16 | |
| | 100010-100100 | 2-4 | 2 | 2 | 2 | 2 | | | | 10-12 | |
| | 100101-100110 | 3-4 | 3 | 2 | 2 | 2 | | | | 12-13 | |
| | 100111 | 4 | 4 | 2 | 2 | 2 | | | | 14 | |
| | 101000-101001 | 3-4 | 3 | 3 | 2 | 2 | | | | 13-14 | |
| | 101010 | 4 | 4 | 3 | 2 | 2 | | | | 15 | |
| | 101011 | 4 | 4 | 4 | 2 | 2 | | | | 16 | |
| | 101100-101101 | 3-4 | 3 | 3 | 3 | 2 | | | | 14-15 | |

TABLE 3-2-continued

| Nuser | B5 ... B0 | Nsts [1] | Nsts [2] | Nsts [3] | Nsts [4] | Nsts [5] | Nsts [6] | Nsts [7] | Nsts [8] | Total Nsts | Total entries |
|---|---|---|---|---|---|---|---|---|---|---|---|
| | 101110 | 4 | 4 | 3 | 3 | 2 | | | | 16 | |
| | 101111-110000 | 3-4 | 3 | 3 | 3 | 3 | | | | 15-16 | |
| 6 | 000000-000011 | 1-4 | 1 | 1 | 1 | 1 | 1 | | | 6-9 | 54 |
| | 000100-000110 | 2-4 | 2 | 1 | 1 | 1 | 1 | | | 8-10 | |
| | 000111-001000 | 3-4 | 3 | 1 | 1 | 1 | 1 | | | 10-11 | |
| | 001001 | 4 | 4 | 1 | 1 | 1 | 1 | | | 12 | |
| | 001010-001100 | 2-4 | 2 | 2 | 1 | 1 | 1 | | | 9-11 | |
| | 001101-001110 | 3-4 | 3 | 2 | 1 | 1 | 1 | | | 11-12 | |
| | 001111 | 4 | 4 | 2 | 1 | 1 | 1 | | | 13 | |
| | 010000-010001 | 3-4 | 3 | 3 | 1 | 1 | 1 | | | 12-13 | |
| | 010010 | 4 | 4 | 3 | 1 | 1 | 1 | | | 14 | |
| | 010011 | 4 | 4 | 4 | 1 | 1 | 1 | | | 15 | |
| | 010100-010110 | 2-4 | 2 | 2 | 2 | 1 | 1 | | | 10-12 | |
| | 010111-011000 | 3-4 | 3 | 2 | 2 | 1 | 1 | | | 12-13 | |
| | 011001 | 4 | 4 | 2 | 2 | 1 | 1 | | | 14 | |
| | 011010-011011 | 3-4 | 3 | 3 | 2 | 1 | 1 | | | 13-14 | |
| | 011100 | 4 | 4 | 3 | 2 | 1 | 1 | | | 15 | |
| | 011101 | 4 | 4 | 4 | 2 | 1 | 1 | | | 16 | |
| | 011110-011111 | 3-4 | 3 | 3 | 3 | 1 | 1 | | | 14-15 | |
| | 100000 | 4 | 4 | 3 | 3 | 1 | 1 | | | 16 | |
| | 100001-100011 | 2-4 | 2 | 2 | 2 | 2 | 1 | | | 11-13 | |
| | 100100-100101 | 3-4 | 3 | 2 | 2 | 2 | 1 | | | 13-14 | |
| | 100110 | 4 | 4 | 2 | 2 | 2 | 1 | | | 15 | |
| | 100111-101000 | 3-4 | 3 | 3 | 2 | 2 | 1 | | | 14-15 | |
| | 101001 | 4 | 4 | 3 | 2 | 2 | 1 | | | 16 | |
| | 101010-101011 | 3-4 | 3 | 3 | 3 | 2 | 1 | | | 15-16 | |
| | 101100 | 3 | 3 | 3 | 3 | 3 | 1 | | | 16 | |
| | 101101-101111 | 2-4 | 2 | 2 | 2 | 2 | 2 | | | 12-14 | |
| | 110000-110001 | 3-4 | 3 | 2 | 2 | 2 | 2 | | | 14-15 | |
| | 110010 | 4 | 4 | 2 | 2 | 2 | 2 | | | 16 | |
| | 110011-110100 | 3-4 | 3 | 3 | 2 | 2 | 2 | | | 15-16 | |
| 7 | 000000-000011 | 1-4 | 1 | 1 | 1 | 1 | 1 | 1 | | 7-10 | 50 |
| | 000100-000110 | 2-4 | 2 | 1 | 1 | 1 | 1 | 1 | | 9-11 | |
| | 000111-001000 | 3-4 | 3 | 1 | 1 | 1 | 1 | 1 | | 11-12 | |
| | 001001 | 4 | 4 | 1 | 1 | 1 | 1 | 1 | | 13 | |
| | 001010-001100 | 2-4 | 2 | 2 | 1 | 1 | 1 | 1 | | 10-12 | |
| | 001101-001110 | 3-4 | 3 | 2 | 1 | 1 | 1 | 1 | | 12-13 | |
| | 001111 | 4 | 4 | 2 | 1 | 1 | 1 | 1 | | 14 | |
| | 010000-010001 | 3-4 | 3 | 3 | 1 | 1 | 1 | 1 | | 13-14 | |
| | 010010 | 4 | 4 | 3 | 1 | 1 | 1 | 1 | | 15 | |
| | 010011 | 4 | 4 | 4 | 1 | 1 | 1 | 1 | | 16 | |
| | 010100-010110 | 2-4 | 2 | 2 | 2 | 1 | 1 | 1 | | 11-13 | |
| | 010111-011000 | 3-4 | 3 | 2 | 2 | 1 | 1 | 1 | | 13-14 | |
| | 011001 | 4 | 4 | 2 | 2 | 1 | 1 | 1 | | 15 | |
| | 011010-011011 | 3-4 | 3 | 3 | 2 | 1 | 1 | 1 | | 14-15 | |
| | 011100 | 4 | 4 | 3 | 2 | 1 | 1 | 1 | | 16 | |
| | 011101-011110 | 3-4 | 3 | 3 | 3 | 1 | 1 | 1 | | 15-16 | |
| | 011111-100001 | 2-4 | 2 | 2 | 2 | 2 | 1 | 1 | | 12-14 | |

TABLE 3-2-continued

| Nuser | B5 ... B0 | Nsts [1] | Nsts [2] | Nsts [3] | Nsts [4] | Nsts [5] | Nsts [6] | Nsts [7] | Nsts [8] | Total Nsts | Total entries |
|---|---|---|---|---|---|---|---|---|---|---|---|
| | 100010-100011 | 3-4 | 3 | 2 | 2 | 2 | 1 | 1 | | 14-15 | |
| | 100100 | 4 | 4 | 2 | 2 | 2 | 1 | 1 | | 16 | |
| | 100101-100110 | 3-4 | 3 | 3 | 2 | 2 | 1 | 1 | | 15-16 | |
| | 100111 | 3 | 3 | 3 | 3 | 2 | 1 | 1 | | 16 | |
| | 101000-101010 | 2-4 | 2 | 2 | 2 | 2 | 2 | 1 | | 13-15 | |
| | 101011-101100 | 3-4 | 3 | 2 | 2 | 2 | 2 | 1 | | 15-16 | |
| | 101101 | 3 | 3 | 3 | 2 | 2 | 2 | 1 | | 16 | |
| | 101110-101111 | 2-4 | 2 | 2 | 2 | 2 | 2 | 2 | | 14-16 | |
| | 110000 | 3 | 3 | 2 | 2 | 2 | 2 | 2 | | 16 | |
| 8 | 000000-000011 | 1-4 | 1 | 1 | 1 | 1 | 1 | 1 | 1 | 8-12 | 41 |
| | 000100-000110 | 2-4 | 2 | 1 | 1 | 1 | 1 | 1 | 1 | 10-12 | |
| | 000111-001000 | 3-4 | 3 | 1 | 1 | 1 | 1 | 1 | 1 | 12-13 | |
| | 001001 | 4 | 4 | 1 | 1 | 1 | 1 | 1 | 1 | 14 | |
| | 001010-001100 | 2-4 | 2 | 2 | 1 | 1 | 1 | 1 | 1 | 11-13 | |
| | 001101-001110 | 3-4 | 3 | 2 | 1 | 1 | 1 | 1 | 1 | 13-14 | |
| | 001111 | 4 | 4 | 2 | 1 | 1 | 1 | 1 | 1 | 15 | |
| | 010000-010001 | 3-4 | 3 | 3 | 1 | 1 | 1 | 1 | 1 | 13-14 | |
| | 010010 | 4 | 4 | 3 | 1 | 1 | 1 | 1 | 1 | 16 | |
| | 010011-010101 | 2-4 | 2 | 2 | 2 | 1 | 1 | 1 | 1 | 12-14 | |
| | 010110-010111 | 3-4 | 3 | 2 | 2 | 1 | 1 | 1 | 1 | 14-15 | |
| | 011000 | 4 | 4 | 2 | 2 | 1 | 1 | 1 | 1 | 16 | |
| | 011001-011010 | 3-4 | 3 | 3 | 2 | 1 | 1 | 1 | 1 | 15-16 | |
| | 011011 | 3 | 3 | 3 | 3 | 1 | 1 | 1 | 1 | 16 | |
| | 011100-011110 | 2-4 | 2 | 2 | 2 | 2 | 1 | 1 | 1 | 13-15 | |
| | 011111-100000 | 3-4 | 3 | 2 | 2 | 2 | 1 | 1 | 1 | 15-16 | |
| | 100001 | 3 | 3 | 3 | 2 | 2 | 1 | 1 | 1 | 16 | |
| | 100010-100100 | 2-4 | 2 | 2 | 2 | 2 | 2 | 1 | 1 | 14-16 | |
| | 100101 | 3 | 3 | 2 | 2 | 2 | 2 | 1 | 1 | 16 | |
| | 100110-100111 | 2-3 | 2 | 2 | 2 | 2 | 2 | 2 | 1 | 15-16 | |
| | 101000 | 2 | 2 | 2 | 2 | 2 | 2 | 2 | 2 | 16 | |

The second column of Table 3-2 is an index for spatial stream indication. A field for spatial stream indication or a spatial stream allocation indication field indicates, according to an index for spatial stream indication in the second column of Table 3-2, a spatial stream allocated to each of a plurality of stations to which the MU-MIMO frequency domain resource is allocated. In a row in which each index for spatial stream indication is located and that is in the second column of Table 3-2, a quantity of spatial streams allocated to a station corresponding to each user field is sequentially indicated according to an arrangement order of the user fields. Each of the plurality of user fields corresponding to the MU-MIMO frequency domain resource corresponds to one of columns 3 to 10.

According to a station sequence, each of the first N columns of columns 3 to 10 corresponds to one station to which the MU-MIMO frequency domain resource is allocated, and N is a total quantity of stations to which the MU-MIMO frequency domain resource is allocated.

A value in "[ ]" in columns 3 to 10 of the first row in Table 3-1 and Table 3-2 is understood as a sequence number, in the station sequence, of a station corresponding to a quantity of spatial streams indicated by the column.

In such a solution, user fields in a signaling field that are of stations participating in MU-MIMO transmission are arranged according to indexes indicating spatial stream allocation and sequentially indicate a quantity of spatial streams allocated to each station. For example, a MU-MIMO frequency domain resource is allocated to a STA a, a STA b, and a STA c (a quantity of users is 3). Two streams are allocated to the STA a, one stream is allocated to the STA b, and three streams are allocated to the STA c. In some embodiments, from Table 3-1 that 0101 is used to indicate a case in which three streams, two streams, and one stream are respectively allocated to three stations. In this case, in a signaling field, in user fields corresponding to the MU-MIMO frequency domain resource, a user field of the STA c calls to be arranged in the first place, a user field of the STA a calls to be arranged in the second place, and a user field of the STA b calls to be arranged in the third place.

In other words, a spatial stream allocation indication field indicates, according to a station sequence corresponding to the spatial stream allocation, a spatial stream allocated to each of a plurality of stations to which the MU-MIMO frequency domain resource is allocated. The station sequence includes an arrangement order of the plurality of stations to which the MU-MIMO frequency domain resource is allocated. The plurality of stations include a station parking on a first frequency segment and a station not parking on the first frequency segment.

In some embodiments, in such a manner of spatial stream allocation indication, a quantity of user fields and an arrangement order call to correspond to a station sequence, so that a spatial stream allocated to each station is accurately indicated. In response to the first possible manner of signaling field setting being used, a user field of a STA not parking on a frequency segment is omitted from a signaling field transmitted on the frequency segment. In some embodiments, in the signaling field transmitted on the frequency segment, a quantity of user fields corresponding to an MU-MIMO frequency domain resource is less than a total quantity of users corresponding to the MU-MIMO RU. In some embodiments, a quantity of user fields is unable to match spatial stream allocation indicated by a spatial stream allocation indication field according to a station sequence, an index for spatial stream indication in Table 3-1 is unable to accurately indicate a spatial stream corresponding to each STA, and a spatial stream allocation indicated in a signaling field is unable to match the user fields.

Based on the problem that the spatial stream allocation indicated by the spatial stream allocation indication field in the signaling field is unable to correspond to the user fields, some embodiments provide a solution of adding a special user field to the signaling field based on the content structure of the signaling field corresponding to the foregoing first possible manner of signaling field setting, so as to resolve the problem that the spatial stream allocation indicated by the spatial stream allocation indication field is unable to correspond to the user fields due to reduction of a quantity of user fields.

The signaling field includes a user field of a station that park on the first frequency segment and to which an MU-MIMO frequency domain resource is allocated, a field indicating a quantity of user fields, and a special user field. For the MU-MIMO frequency domain resource, the user field, and the field indicating the quantity of user fields of stations that park on the first frequency segment and to which the MU-MIMO frequency domain resource is allocated, refer to the foregoing related descriptions. The spatial stream allocation indication field in the user field is indicated in an indication manner corresponding to Table 3-1.

The special user field indicates a total quantity of stations (quantity of users) to which an MU-MIMO frequency domain resource is allocated, and indicates a sequence location, in a station sequence of a plurality of stations to which the MU-MIMO frequency domain resource is allocated, of the station that park on the first frequency segment and to which the MU-MIMO frequency domain resource is allocated.

In some embodiments, a STA determines, according to the special user field, a sequence location of the STA in the plurality of stations to which the MU-MIMO frequency domain resource is allocated, that is, determine a sequence number of the STA among the stations to which the MU-MIMO frequency domain resource is allocated. In some embodiments, an allocated spatial stream is determined based on Table 3-1 and an index that indicates a spatial stream and that is included in the user field.

Refer to Table 4. Table 4 shows a content structure of the special user field. The special user field includes a first subfield indicating an identifier of the special user field, a second subfield indicating a total quantity of stations to which an MU-MIMO frequency domain resource is allocated, and a third subfield indicating a station sequence, in a plurality of stations to which the MU-MIMO frequency domain resource is allocated, of a station that is of the plurality of stations and that parks on a current frequency segment. In some embodiments, in some embodiments, names of subfields included in the special field are not limited to the first subfield, the second subfield, and the third subfield. In another embodiment, these subfields further have other names.

TABLE 4

| Quantity of bits (number of bits) | Field (subfield) |
|---|---|
| 11 | STA ID (a special STA ID indicates a special user field) |
| Greater than or equal to 3 bits | Total quantity of MU-MIMO stations |
| Greater than or equal to 8 bits | A bitmap indicates an arrangement order of stations parking on a current segment |
| ... | ... |

The first subfield indicates that the field is a special user field, and a quantity of bits of the identifier is, for example, but is not limited to, 11 bits.

The second subfield is a binary character string. The total quantity of stations is a value of the binary character string plus 1. A quantity of bits of the second subfield is a quantity of bits occupied by a binary character string corresponding to a maximum quantity of stations that is supported by MU-MIMO. For example, in 802.11be, the maximum quantity of stations that is supported by MU-MIMO is 8, and the quantity of bits of the second subfield is 3. The quantity of bits of the second subfield is not limited to 3, for example, further is a positive integer such as 4, 5, or 6. In response to the maximum quantity of stations that is supported by MU-MIMO being another value, the quantity of bits of the second subfield is adjusted accordingly. For example, in response to the maximum quantity of stations that is supported by MU-MIMO being N, the quantity of bits of the second subfield is $\log_2 N$.

The third subfield is a bitmap. A quantity of bits of the bitmap is the same as a quantity of the plurality of stations. Each of the plurality of stations sequentially corresponds to a value of one bit in the bitmap. In some embodiments, a sequence location, in the plurality of stations, of a station corresponding to each user field in the signaling field is indicated based on the bitmap.

A value of each bit in the bitmap indicates whether a signaling field transmitted in a current frequency segment includes a user field corresponding to the bit. For example, "1" in the bitmap indicates that the signaling field transmitted in the current frequency segment includes a user field corresponding to the bit, and "0" indicates that the signaling field transmitted in the current frequency segment does not include a user field corresponding to the bit. A quantity of bits of the bitmap is a maximum quantity of stations that is supported by MU-MIMO. For example, in 802.11be, the maximum quantity of stations that is supported by MU-MIMO is 8, and the quantity of bits of the field is 8. In response to the maximum quantity of stations that is supported by MU-MIMO being another value, the quantity of bits of the third subfield is adjusted accordingly. In response to the maximum quantity of stations that is supported by MU-MIMO being N, the quantity of bits of the third subfield is N.

Certainly, in another embodiment, "0" in the bitmap alternatively indicates that the signaling field transmitted in the current frequency segment includes a user field corresponding to the bit, and "1" indicates that the signaling field transmitted in the current frequency segment does not include a user field corresponding to the bit.

An indication manner of the third subfield is not limited to indication by using a bitmap. In another embodiment, another indication manner further is used for indication.

In an optional embodiment, the special user field is set before the first user field. In some embodiments, a STA receiving a signaling field first reads the special user field, and determine a total quantity of stations (quantity of users) of an MU-MIMO frequency domain resource, and a sequence location, in a plurality of stations to which the MU-MIMO frequency domain resource is allocated, of a station that is of the plurality of stations and that parks on a current frequency segment, so that the STA reads a subsequent user field.

Based on the foregoing content structure of the special user field, a manner of special user field setting in an OFDMA scenario and a manner special user field setting in a non-OFDMA scenario are separately described with reference to examples.

Figure 12A:
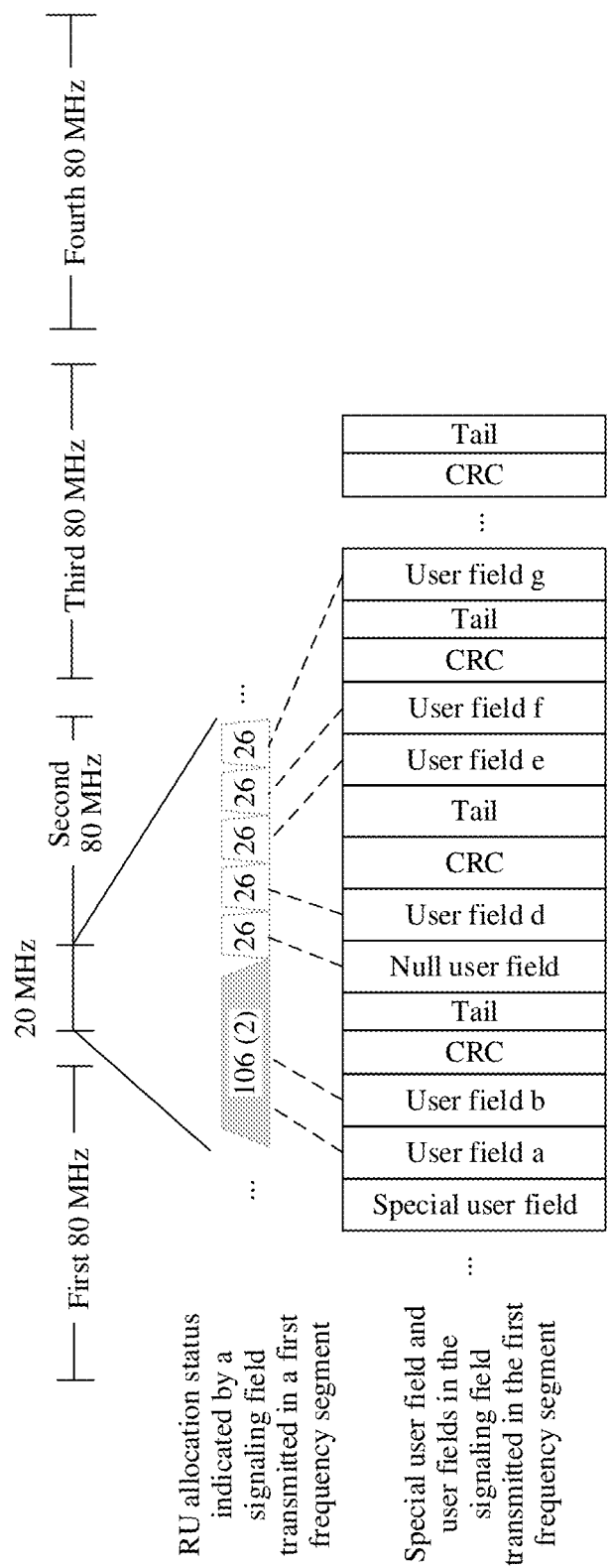
FIG. 12A is a schematic diagram of another scenario in which a signaling field indicates RU allocation according to some embodiments.

In an OFDMA scenario, in an example, refer to a schematic diagram of another scenario in which a signaling field indicates RU allocation shown in FIG. 12A. Based on the example in FIG. 8A, the signaling field transmitted on the first frequency segment further includes a special user field. 802.11be is used as an example. A content structure of the special user field in the signaling field transmitted on the first frequency segment is shown in Table 5. In the special user field, a field indicating a total quantity of stations to which the MU-MIMO frequency domain resources allocated is 010, indicating that a total quantity of users corresponding to the RU used for MU-MIMO transmission is 3. A bitmap indicating a sequence location is 11000000, indicating that user fields that are transmitted on the first frequency segment and that correspond to the RU are the user field of the first STA corresponding to the RU and the user field of the second STA corresponding to the RU, which are the user field a and the user field b respectively.

TABLE 5

| Quantity of bits (number of bits) | Field (subfield) |
|---|---|
| 11 | STA ID (a special STA ID, indicating that the field is a special user field) |
| 3 | 010 |
| 8 | 11000000 |
| . . . | . . . |

Figure 12B:
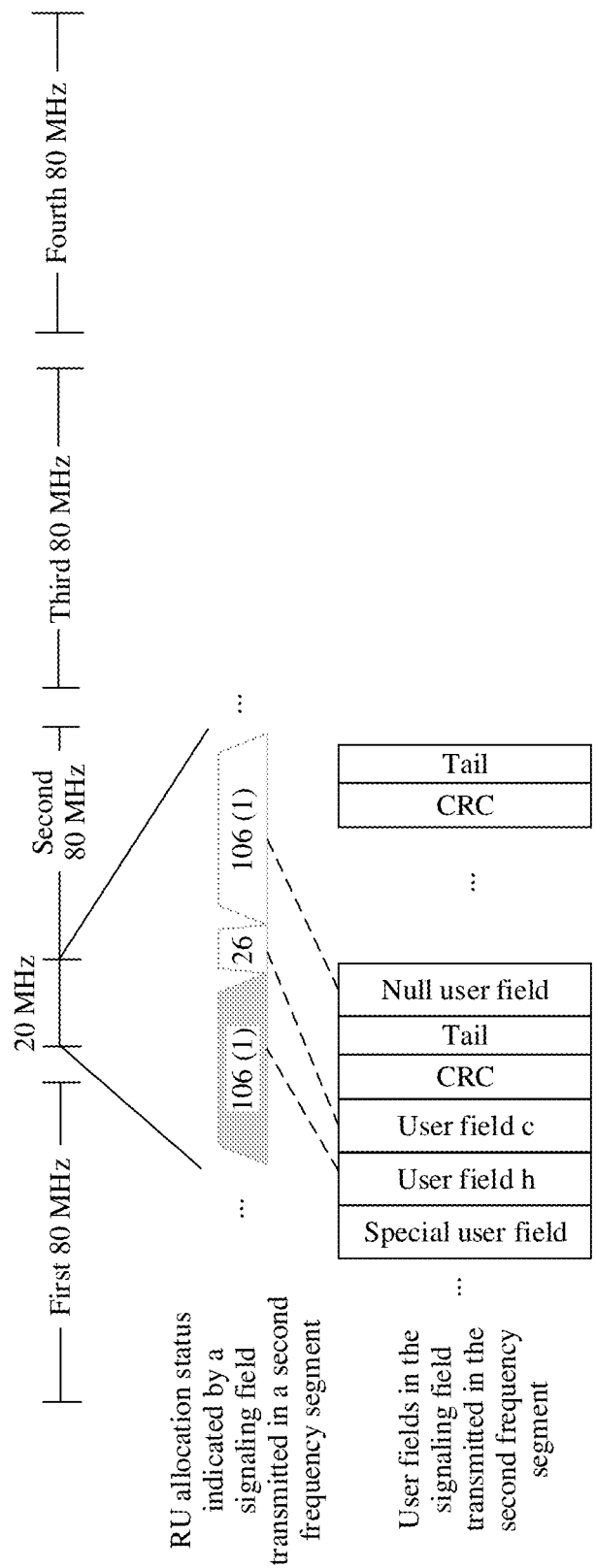
FIG. 12B is a schematic diagram of another scenario in which a signaling field indicates RU allocation according to some embodiments.

Refer to FIG. 12B. Based on the example in FIG. 8B, the signaling field transmitted on the second frequency segment further includes a special user field. 802.11be is used as an example. A content structure of the special user field in the signaling field transmitted on the second frequency segment is shown in Table 6. In the special user field, a field indicating a total quantity of stations to which the MU-MIMO frequency domain resources allocated is 010, indicating that a total quantity of users corresponding to the RU used for MU-MIMO transmission is 3. A bitmap indicating a sequence location is 00100000, indicating that user fields that are transmitted on the second frequency segment and that correspond to the RU are the user field of the third STA corresponding to the RU, which is the user field h. The content structure of the special user field in the signaling field transmitted on the second frequency segment is shown in Table 6.

TABLE 6

| Quantity of bits (number of bits) | Field (subfield) |
|---|---|
| 11 | STA ID (a special STA ID indicates a special user field) |
| 3 | 010 |
| 16 | 00100000 |
| . . . | . . . |

Figure 13A:
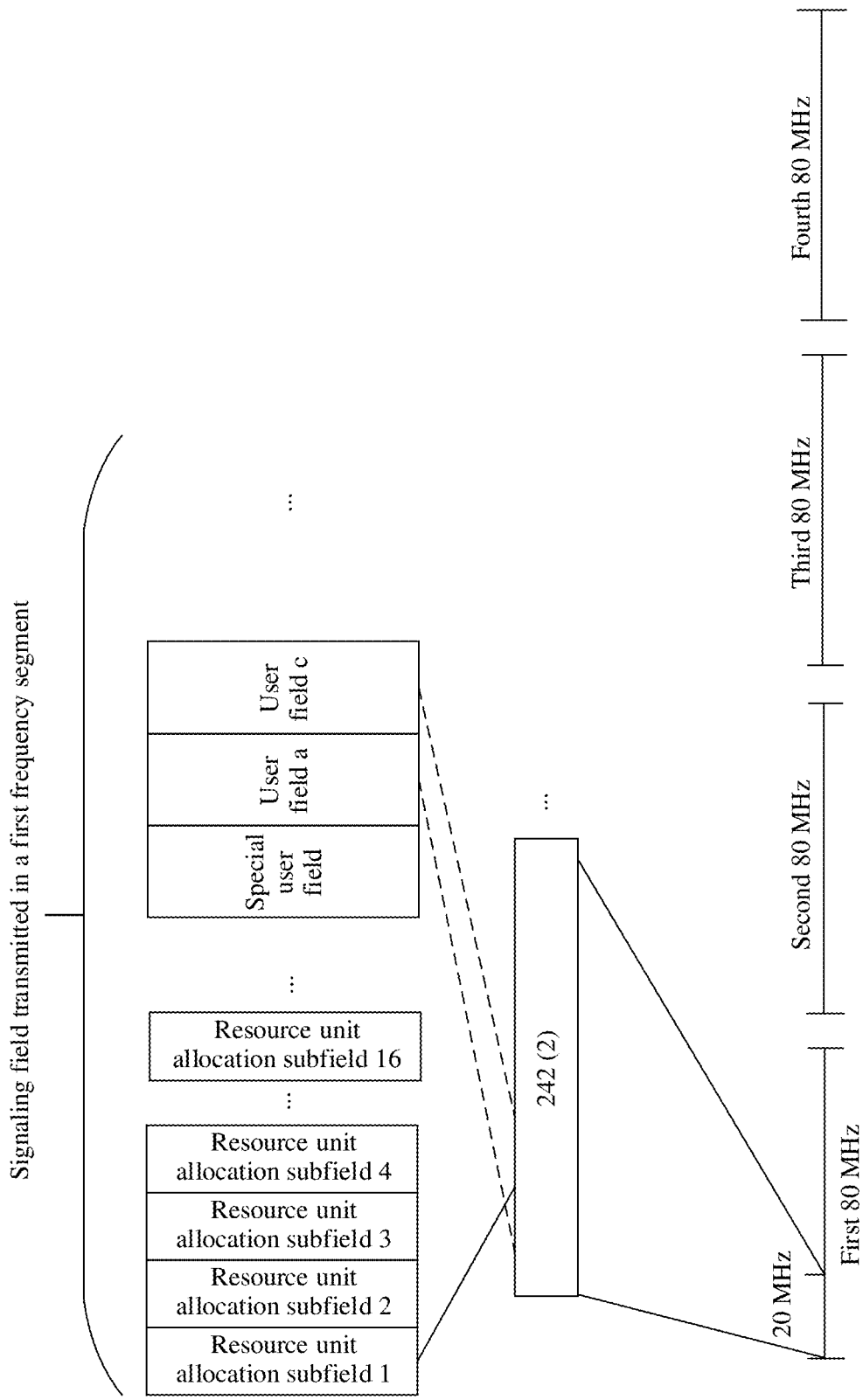
FIG. 13A is a schematic diagram of another scenario in which a signaling field indicates RU allocation according to some embodiments.

In an OFDMA scenario, in another example, refer to a schematic diagram of another scenario in which a signaling field indicates RU allocation shown in FIG. 13A. Based on the example in FIG. 9A, the signaling field transmitted on the first frequency segment further includes a special user field. 802.11be is used as an example. A content structure of the special user field in the signaling field transmitted on the first frequency segment is shown in Table 7. In the special user field, a field indicating a total quantity of stations to which the MU-MIMO frequency domain resources allocated is 011, indicating that a total quantity of users corresponding to the RU used for MU-MIMO transmission is 4. A bitmap indicating a sequence location is 10100000, indicating that user fields that are transmitted on the first frequency segment and that correspond to the RU are the user field of the first STA corresponding to the RU and the user field of the third STA corresponding to the RU, which are the user field a and the user field c.

TABLE 7

| Quantity of bits (number of bits) | Field (subfield) |
|---|---|
| 11 | STA ID (a special STA ID, indicating that the field is a special user field) |
| 3 | 011 |
| 8 | 10100000 |
| . . . | . . . |

Figure 13B:
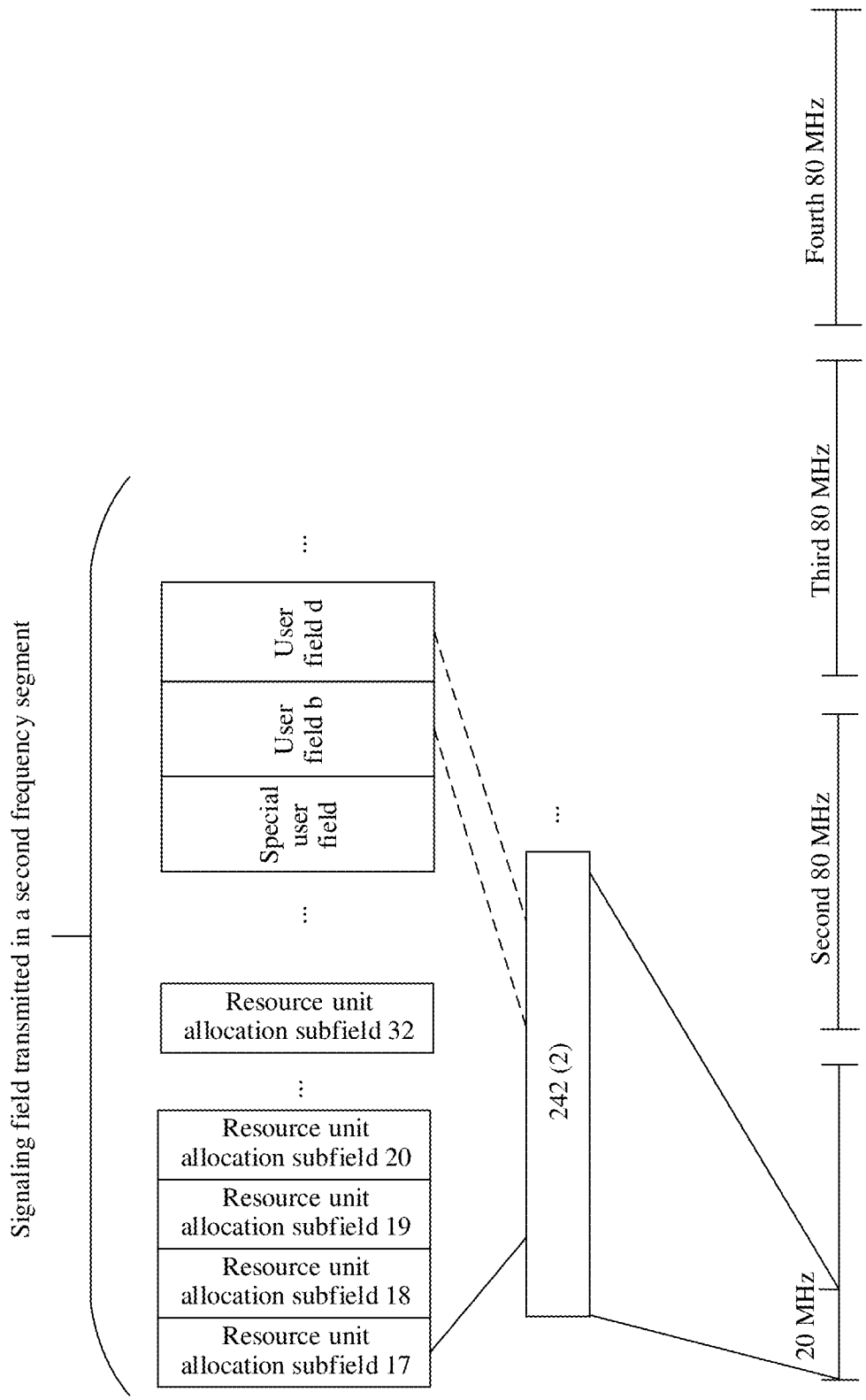
FIG. 13B is a schematic diagram of another scenario in which a signaling field indicates RU allocation according to some embodiments.

Refer to FIG. 13B. Based on the example in FIG. 9B, the signaling field transmitted on the second frequency segment further includes a special user field. 802.11be is used as an example. A content structure of the special user field in the signaling field transmitted on the second frequency segment is shown in Table 8. In the special user field, a field indicating a total quantity of stations to which the MU-MIMO frequency domain resources allocated is 011, indicating that a total quantity of users corresponding to the RU used for MU-MIMO transmission is 4. A bitmap indicating a sequence location is 01010000, indicating that user fields that are transmitted on the second frequency segment and that correspond to the RU are the user field of the second STA corresponding to the RU and the user field of the fourth STA corresponding to the RU, which are the user field b and the user field d.

TABLE 8

| Quantity of bits (number of bits) | Field (subfield) |
| --- | --- |
| 11 | STA ID (a special STA ID indicates a special user field) |
| 3 | 011 |
| 8 | 01010000 |
| ... | ... |

Figure 14A:
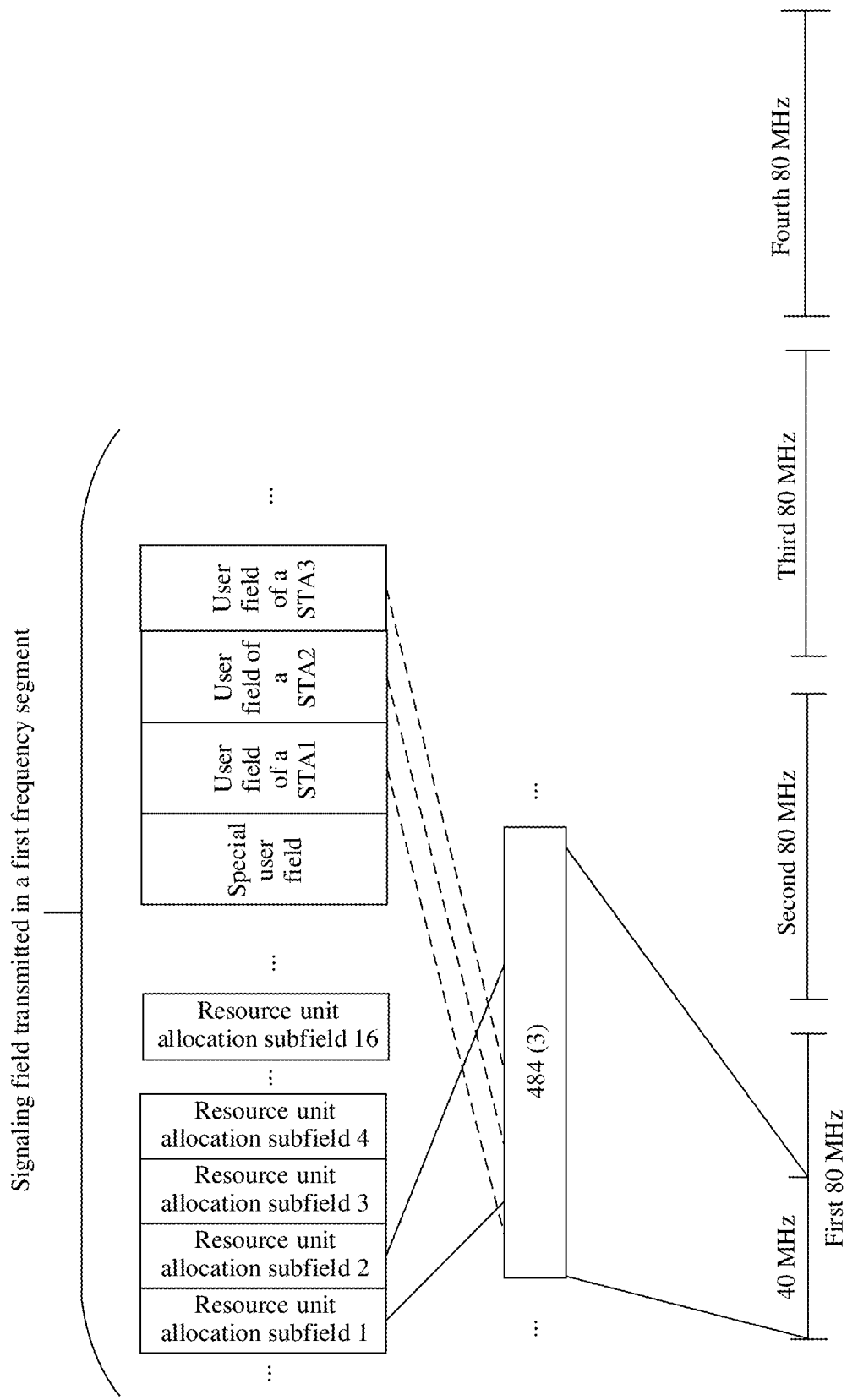
FIG. 14A is a schematic diagram of another scenario in which a signaling field indicates RU allocation according to some embodiments.

In an OFDMA scenario, in still another example, refer to a schematic diagram of another scenario in which a signaling field indicates RU allocation shown in FIG. 14A. Based on the example in FIG. 10A, the signaling field transmitted on the first frequency segment further includes a special user field. 802.11be is used as an example. A content structure of the special user field in the signaling field transmitted on the first frequency segment is shown in Table 9. In the special user field, a field indicating a total quantity of stations to which the MU-MIMO frequency domain resources allocated is 100, indicating that a total quantity of users corresponding to the RU used for MU-MIMO transmission is 5. A bitmap indicating a sequence location is 10101000, indicating that user fields that are transmitted on the first frequency segment and that correspond to the RU are the user field of the first STA corresponding to the RU, the user field of the third STA corresponding to the RU, and the user field of the fifth STA, which are the user field of the STA1, the user field of the STA3, and the user field of the STA5.

TABLE 9

| Quantity of bits (number of bits) | Field (subfield) |
| --- | --- |
| 11 | STA ID (a special STA ID, indicating that the field is a special user field) |
| 3 | 100 |
| 8 | 10101000 |
| ... | ... |

Figure 14B:
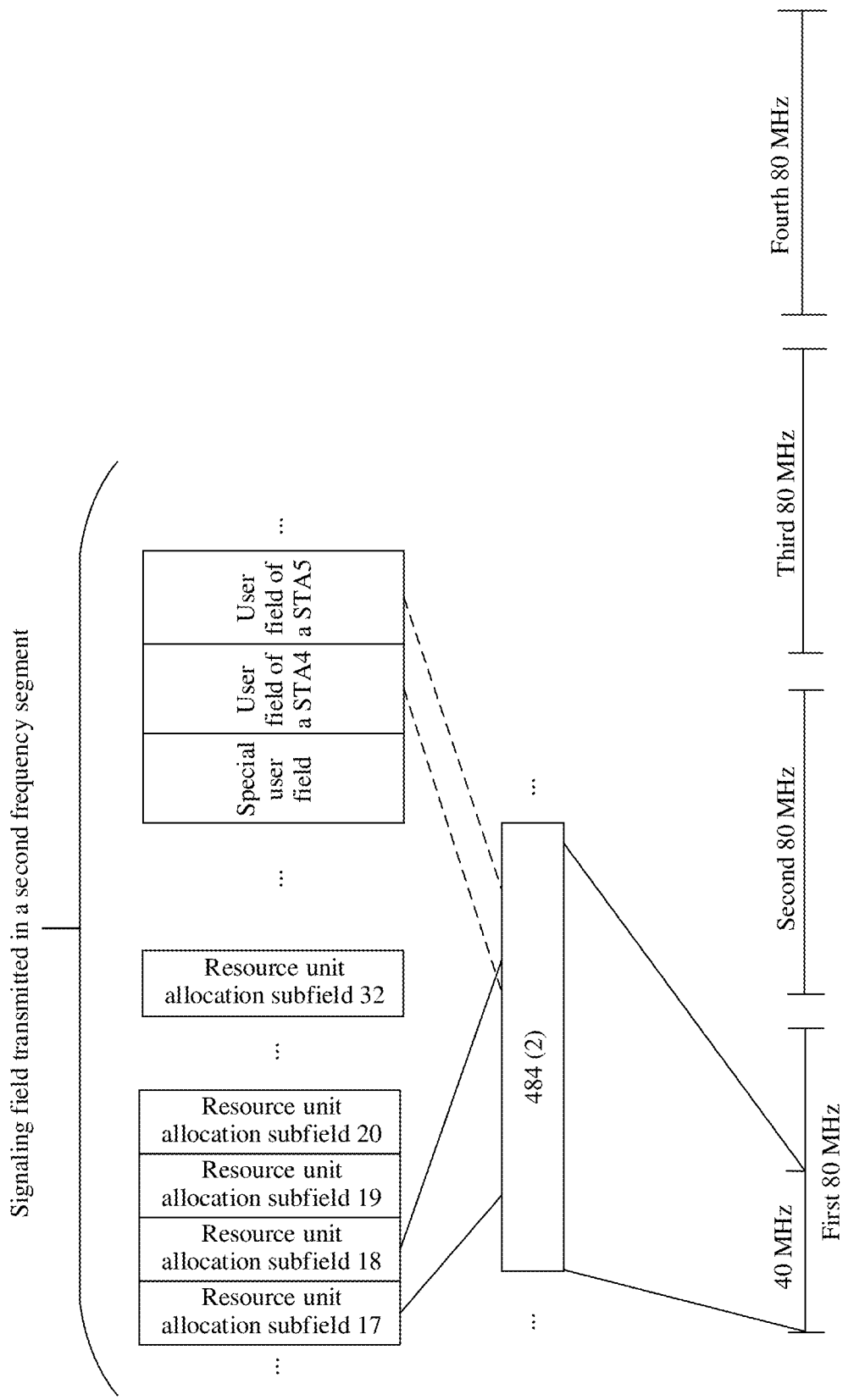
FIG. 14B is a schematic diagram of another scenario in which a signaling field indicates RU allocation according to some embodiments.

Refer to FIG. 14B. Based on the example in FIG. 10B, the signaling field transmitted on the second frequency segment further includes a special user field. 802.11be is used as an example. A content structure of the special user field in the signaling field transmitted on the second frequency segment is shown in Table 10. In the special user field, a field indicating a total quantity of stations to which the MU-MIMO frequency domain resources allocated is 100, indicating that a total quantity of users corresponding to the RU used for MU-MIMO transmission is 5. A bitmap indicating a sequence location is 01010000, indicating that user fields that are transmitted on the first frequency segment and that correspond to the RU are the user field of the second STA corresponding to the RU and the user field of the fourth STA corresponding to the RU, which are the user field of the STA2 and the user field of the STA4.

TABLE 10

| Quantity of bits (number of bits) | Field (subfield) |
| --- | --- |
| 11 | STA ID (a special STA ID indicates a special user field) |
| 3 | 100 |
| 8 | 01010000 |
| ... | ... |

Figure 15A:
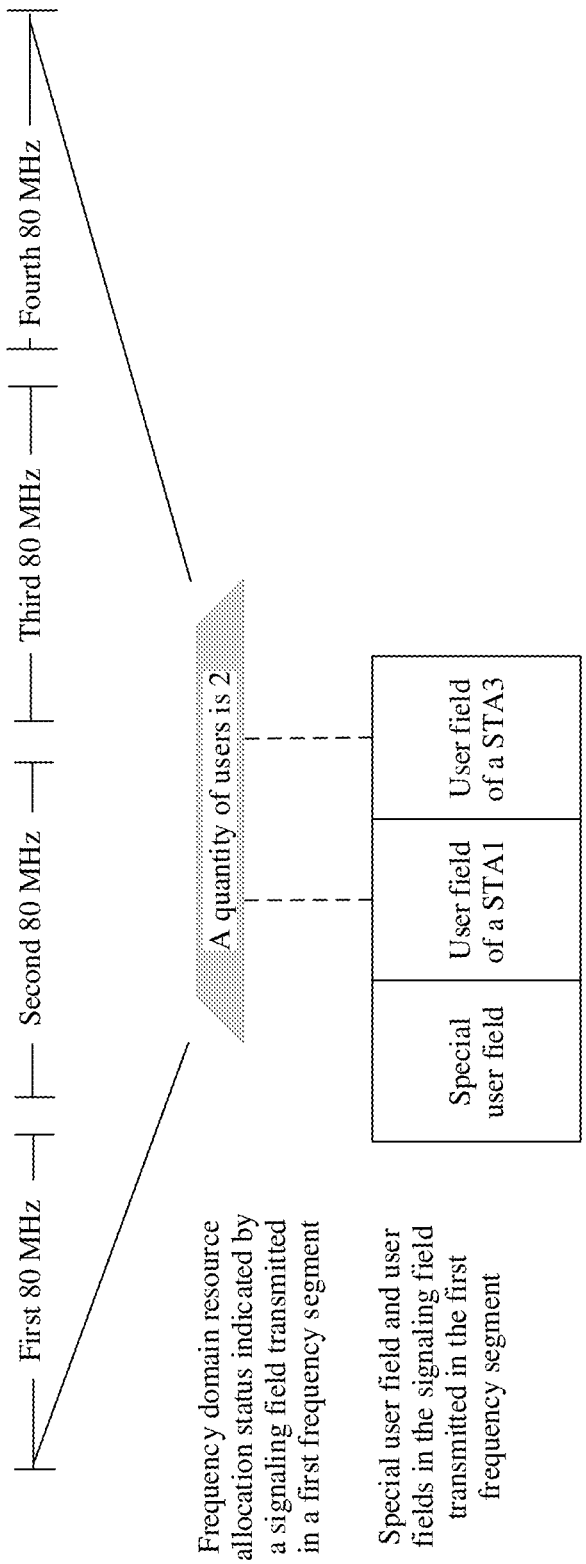
FIG. 15A is a schematic diagram of another scenario in which a signaling field indicates frequency domain resource allocation according to some embodiments.

FIG. 15A is a schematic diagram of a scenario in which a signaling field indicates frequency domain resource allocation according to some embodiments. In a non-OFDMA scenario, based on the example in FIG. 11A, as shown in FIG. 15A, the signaling field transmitted on the first frequency segment further includes a special user field. 802.11be is used as an example. A content structure of the special user field in the signaling field transmitted on the first frequency segment is shown in Table 11. In the special user field, a field indicating a total quantity of stations to which the MU-MIMO frequency domain resource is allocated is 100, indicating that a total quantity of users corresponding to a complete frequency domain bandwidth for transmitting the PPDU is 5. A bitmap indicating a sequence location in the special user field is 10100000, indicating user fields that are transmitted on the first frequency segment and that correspond to the RU are the user field of the first STA (STA1) corresponding to the RU and the user field of the third STA (STA3) corresponding to the RU.

TABLE 11

| Quantity of bits (number of bits) | Field (subfield) |
| --- | --- |
| 11 | STA ID (a special STA ID indicates a special user field) |
| 3 | 100 |
| 8 | 10100000 |
| ... | ... |

Figure 15B:
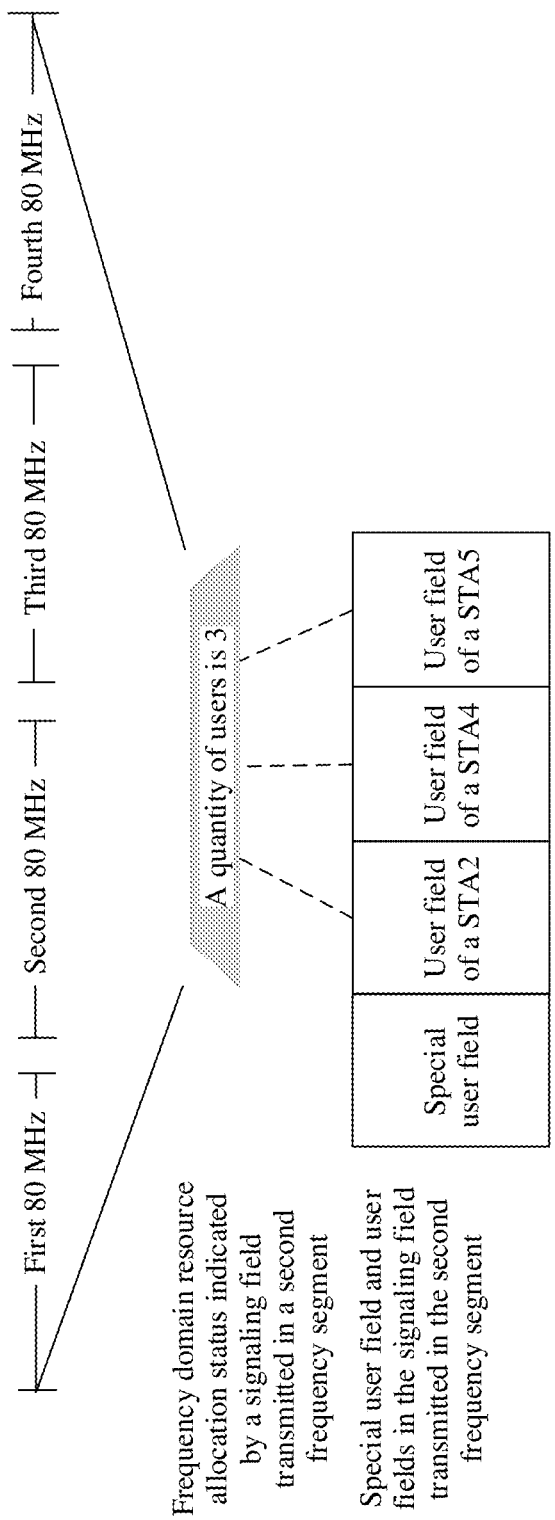
FIG. 15B is a schematic diagram of another scenario in which a signaling field indicates frequency domain resource allocation according to some embodiments.

FIG. 15B is a schematic diagram of a scenario in which a signaling field indicates frequency domain resource allocation according to some embodiments. Based on the example in FIG. 11B, as shown in FIG. 15B, the signaling field transmitted on the second frequency segment further includes a special user field. 802.11be is used as an example. A content structure of the special user field in the signaling field transmitted on the first frequency segment is shown in Table 12. In the special user field, a quantity of bits of a field indicating a total quantity of stations to which the MU-MIMO frequency domain resource is allocated is 100, indicating that a total quantity of users corresponding to a complete frequency domain bandwidth for transmitting the PPDU is 5. A bitmap indicating a sequence location in the special user field is 01011000, indicating user fields that are transmitted on the second frequency segment and that correspond to the RU are the user field of the second STA (STA2) corresponding to the RU, the user field of the fourth STA (STA4) corresponding to the RU, and the user field of the fifth STA (STA5) corresponding to the RU.

TABLE 12

| Quantity of bits (number of bits) | Field (subfield) |
| --- | --- |
| 11 | STA ID (a special STA ID indicates a special user field) |
| 3 | 100 |
| 8 | 01011000 |
| ... | ... |

In some embodiments, the special user field is set in a common field before the user field. Optionally, in response to the special user field being set in the common field before the user field, the special user field is unable to include the STA ID.

Some embodiments further provides some solutions in which the common field indicates a location, in a location sequence, of a station corresponding to each user field. In some embodiments, a location, in a sequence location, of a station corresponding to each user field does not call to be indicated in each user field, and overheads of a signaling field is reduced. These embodiments are used in a scenario of non-OFDMA transmission.

In a non-OFDMA scenario, a signaling field of a PPDU transmitted on a first frequency segment includes a common field and a user-specific field. A bandwidth for transmitting the PPDU includes an MU-MIMO frequency domain resource. The MU-MIMO frequency domain resource is allocated to a plurality of stations. The user-specific field includes a user field of a station to which the MU-MIMO frequency domain resource is allocation and that parks on the first frequency segment. The user field includes a field indicating a station identifier of a station corresponding to the user field and a spatial stream allocation indication field. The spatial stream allocation indication field indicates, according to a station sequence of a plurality of stations, a spatial stream allocated to each of the plurality of stations, and the station sequence includes an arrangement order of the plurality of stations. For related explanations of the station sequence, refer to the foregoing embodiment. Details are not described herein again.

Figure 6C:
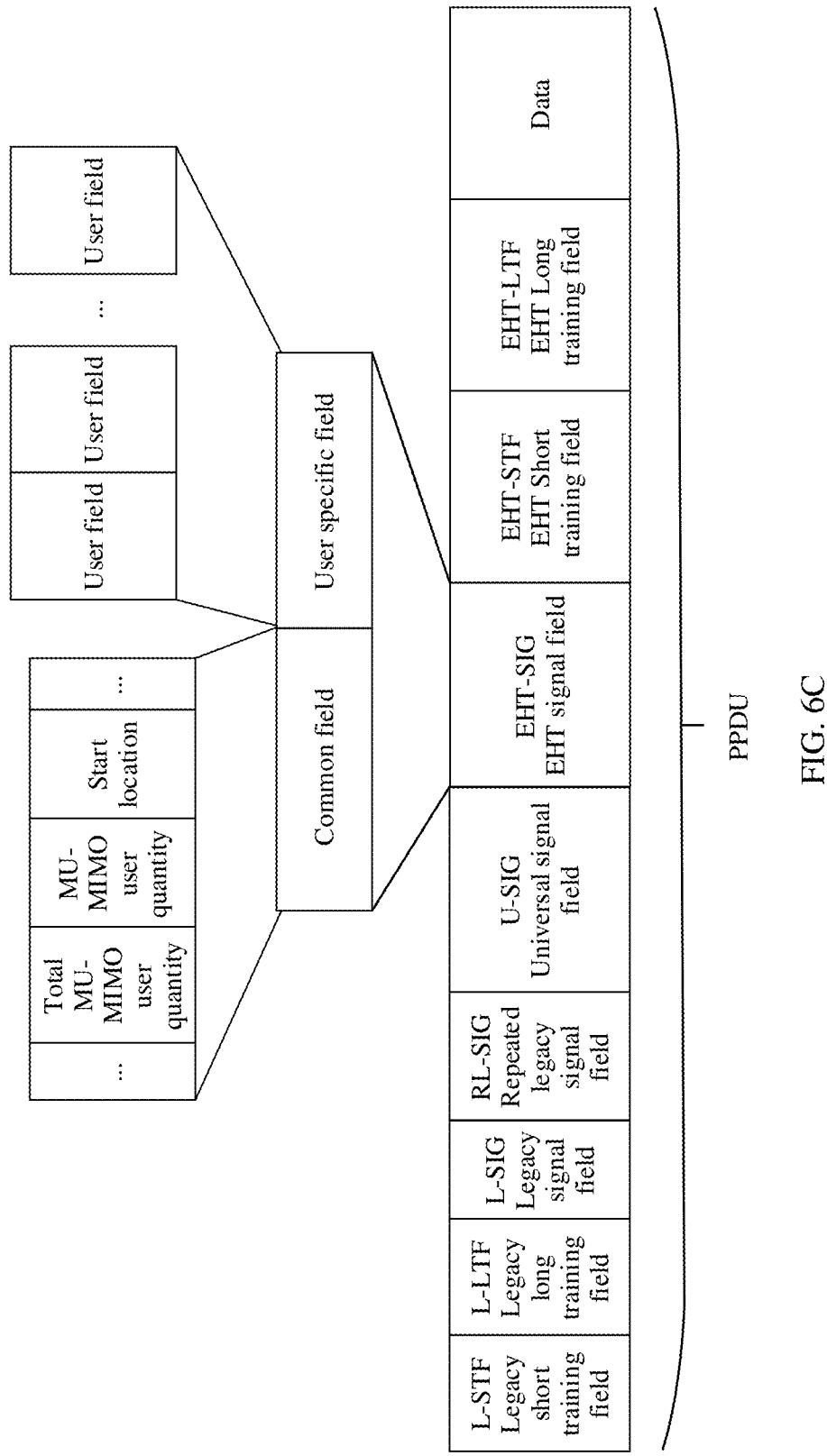
FIG. 6C is schematic diagram depicting another structure of a PPDU according to some embodiments.

In a schematic diagram depicting a structure of a PPDU shown in FIG. 6C, in some embodiments, the common field includes a total MU-MIMO user quantity indication field, a field indicating an MU-MIMO user quantity, and a field indicating a start location.

The total MU-MIMO user quantity indication field is understood as a field indicating a total quantity of stations to which an MU-MIMO frequency domain resource is allocated. The total MU-MIMO user quantity indication field indicates a quantity of the plurality of stations. Optionally, the total MU-MIMO user quantity indication field is 3 bits.

The field indicating the MU-MIMO user quantity indicates a quantity of user fields that are in a signaling field transmitted on a first frequency segment and that correspond to stations to which an MU-MIMO frequency domain resource is allocated and that park on the first frequency segment. In some embodiments, the quantity of user fields indicated by the field indicating the MU-MIMO user quantity is a quantity of stations to which the MU-MIMO frequency domain resource is allocated and that park on the first segment, instead of a total quantity of stations to which the MU-MIMO frequency domain resource is allocated.

The field indicating the MU-MIMO user quantity is referred to as, for example, but is not limited to, an MU-MIMO user quantity indication field. The field indicating the MU-MIMO user quantity is 3 bits. For example, the field indicating the MU-MIMO user quantity is a value in 000 to 111, indicating that the quantity of stations to which the MU-MIMO frequency domain resource is allocated and that park on the first segment is one of 1 to 8.

The field indicating the start location indicates a start location, in the station sequence, of a station that is of the plurality of stations and that parks on the first frequency segment. In other words, the field indicating the start location indicates a location, in the station sequence, of the first station parking on the first frequency segment. The field indicating the start location is 3 bits. For example, the field indicating the start location is a value in 000 to 111, indicating that the location, in the station sequence, of the first station parking on the first frequency segment is one of locations 1 to 8 in the station sequence.

In some embodiments, the total MU-MIMO user quantity indication field, the field indicating the MU-MIMO user quantity, and the field indicating the start location cooperates to indicate a location, in the station sequence, of a station parking on the first frequency segment.

For example, the MU-MIMO frequency domain resource is allocated to three stations (denoted as a station 1, a station 2, and a station 3). Four spatial streams are allocated to the station 1, one spatial stream is allocated to the station 2, and one spatial stream is allocated to the station 3. The station 1 and the station 2 park on the first frequency segment, and the station 3 parks on the second frequency segment.

A field (for example, is referred to as a spatial stream allocation indication field) that is in the signaling field and that indicates a quantity of spatial streams are indicated by using an index 000011 in Table 3-2. In Table 3-2, the third column in the row of the index 000011 corresponding to the station quantity 3 indicates that four spatial streams are allocated to the first station in the station sequence. The fourth column in the row of the index 000011 corresponding to the station quantity 3 indicates that one spatial stream is allocated to the second station in the station sequence. The fifth column in the row of the index 000011 corresponding to the station quantity 3 indicates that one spatial stream is allocated to the third station in the station sequence. In some embodiments, in such an indication solution, the station sequence is the station 1, the station 2, and the station 3, or the station sequence is the station 1, the station 3, and the station 2. In some embodiments, quantities of spatial streams allocated to the station 2 and the station 3 are the same, and locations of the station 2 and the station 3 in the station sequence is exchanged. Exchange of the locations of the station 2 and the station 3 does not affect indication of quantities of spatial streams allocated to the station 2 and the station 3. In this embodiment, an example in which the station sequence is the station 1, the station 2, and the station 3 is used for description. In some embodiments, the third column in the row of the index 000011 corresponding to the station quantity 3 corresponds to the first station (the station 1) in the station sequence, and a quantity of spatial streams indicated by the third column is a quantity of spatial streams allocated to the station 1. The fourth column and the fifth column correspond to the station 2 and the station 3 in the station sequence, respectively indicating quantities of spatial streams of the station 2 and the station 3. A start location, in the station sequence, of the station 1 and the station 2 parking on the first frequency segment is the first station. A start location, in the station sequence, of the station 3 parking on the second frequency segment is the third station.

In the signaling field of the PPDU transmitted on the first frequency segment, the total MU-MIMO user quantity indication field in the common field part indicates that the MU-MIMO frequency domain resource is allocated to three stations. The field indicating the MU-MIMO user quantity is, for example, 001, indicating that the MU-MIMO frequency domain resource is allocated to two stations parking on the first frequency segment (current frequency segment), and the field indicating the start location is, for example, 000, indicating that the start location of the station to which the MU-MIMO frequency domain resource is allocated is the first location in the station sequence.

In the signaling field of the PPDU transmitted on the second frequency segment, the total MU-MIMO user quantity indication field of the common field indicates that the MU-MIMO frequency domain resource is allocated to three stations. The field indicating the MU-MIMO user quantity is, for example, 001, indicating that the MU-MIMO frequency domain resource is allocated to one station parking on the second frequency segment (current frequency segment), and the field indicating the start location is, for example, 010, indicating that the start location of the station to which the MU-MIMO frequency domain resource is allocated is the third location in the station sequence.

In some embodiments, the user field includes a user field of a station parking on the frequency segment, and a station receiving the PPDU further determines, according to the total MU-MIMO user quantity indication field, the field indicating the MU-MIMO user quantity, and the subfield indicating the start location in the common field, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

Figure 6D:
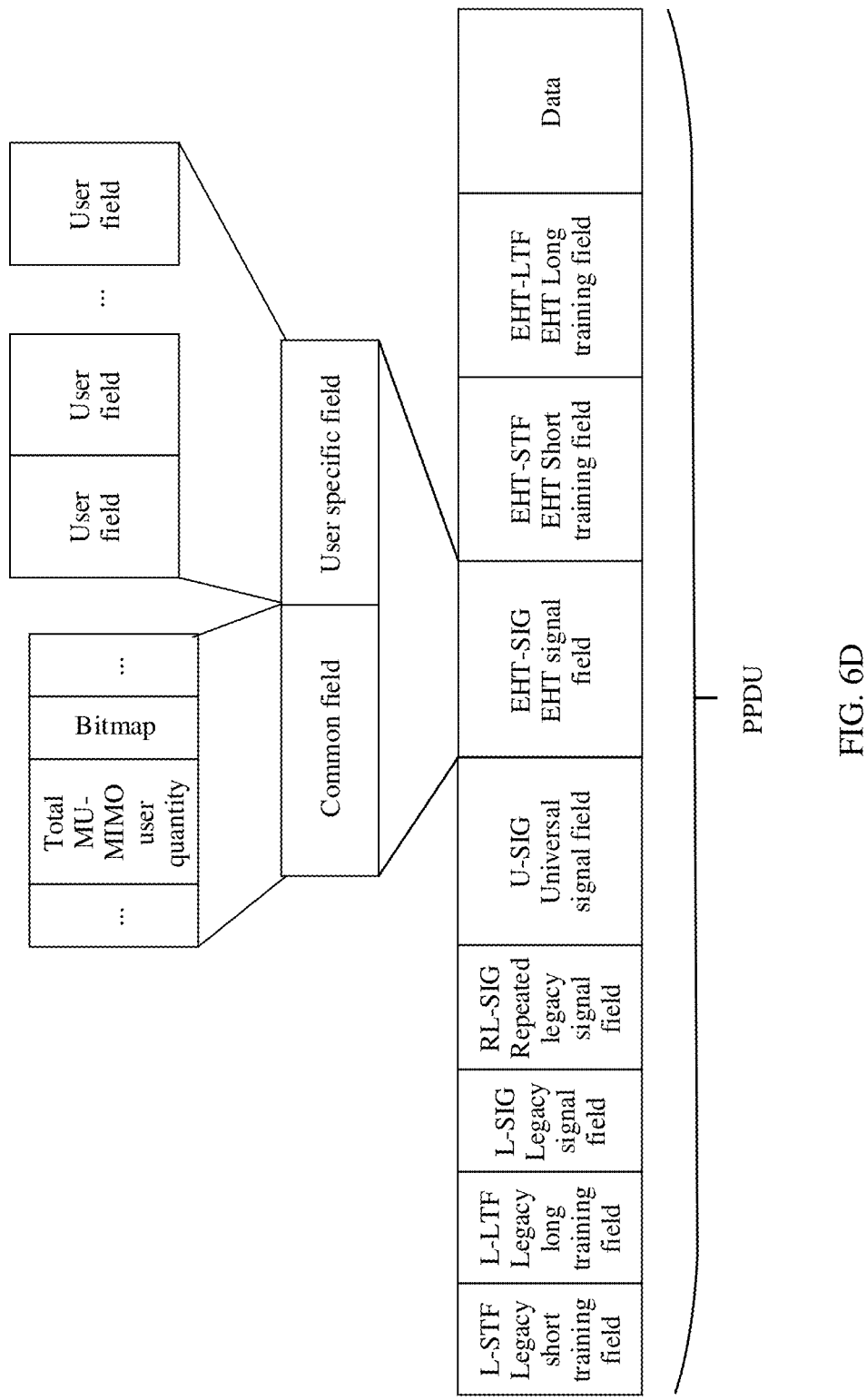
FIG. 6D is a schematic diagram depicting still another structure of a PPDU according to some embodiments.

In a schematic diagram depicting a structure of a PPDU shown in FIG. 6D, in some other embodiments, the common field includes a total MU-MIMO user quantity indication field and a bitmap. The total MU-MIMO user quantity indication field indicates a quantity of the plurality of stations, and the bitmap indicates a start location, in a station sequence, of a station that is of the plurality of stations and that parks on the first frequency segment.

The total MU-MIMO user quantity indication field is understood as a field indicating a total quantity of stations to which an MU-MIMO frequency domain resource is allocated.

The bitmap indicates a location, in the station sequence, of a station parking on the first frequency segment. The spatial stream allocation indication field is indicated by using an index indicating spatial stream allocation. The $1^{st}$ to the $N^{th}$ bits of the bitmap one-to-one correspond with the $1^{st}$ to the $N^{th}$ stations in the station sequence. N is the total quantity of stations to which the MU-MIMO frequency-domain resource is allocated. A quantity of bits of the bitmap is a maximum quantity of users that is supported by MU-MIMO and that is specified in a communication standard, or is a total quantity of MU-MIMO users.

For example, the MU-MIMO frequency domain resource is allocated to three stations (denoted as a station 1, a station 2, and a station 3). A quantity of spatial streams of the station 1 is 4, a quantity of spatial streams of the station 2 is 1, and a quantity of spatial streams of the station 3 is 1. The station 1 and the station 2 park on the first frequency segment, and the station 3 parks on the second frequency segment. According to related descriptions of the embodiment corresponding to FIG. 6C, the station sequence is the station 1, the station 2, and the station 3.

In response to the maximum quantity of users that is supported by MU-MIMO and that being specified in a communication standard is 8, the quantity of bits of the bitmap is 8. In the signaling field of the PPDU transmitted on the first frequency segment, the total MU-MIMO user quantity indication field in the common field indicates that the MU-MIMO frequency domain resource is allocated to three stations. The bitmap is, for example, 11000000, indicating that the MU-MIMO frequency domain resource is allocated to two stations parking on the first frequency segment (current frequency segment), and the two stations are the first station (station 1) and the second station (station 2) in a station sequence based on which the spatial stream indication field indicates spatial stream allocation.

In the signaling field of the PPDU transmitted on the second frequency segment, the MU-MIMO total user quantity indication field in the common field indicates that the MU-MIMO frequency domain resource is allocated to three stations. The bitmap is, for example, 00100000, indicating that the MU-MIMO frequency domain resource is allocated to one station parking on the first frequency segment (current frequency segment), and the one station is the third station (station 3) in the station sequence based on which the spatial stream indication field indicates spatial stream allocation.

In such an embodiment, the user field includes a user field of a station parking on the frequency segment, and a station receiving the PPDU further determines, according to the total MU-MIMO user quantity indication field and the bitmap, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

some embodiments, compared with indicating, in each user field, a location of a station corresponding to the user field in a station sequence, the foregoing embodiment of indicating, in the common field, the location of the station corresponding to the user field in the station sequence reduces overheads of the signaling field.

Optionally, the common field and the user-specific field is located in an EHT-SIG. A U-SIG includes an EHT-SIG symbol quantity indication field (or an EHT-SIG symbol quantity indication subfield), and the EHT-SIG symbol quantity indication field indicates a quantity of symbols of the EHT-SIG. In some embodiments, an apparatus receiving the PPDU accurately obtains the quantity of EHT-SIG symbols, so that the EHT-SIG is accurately received and read.

Optionally, the total MU-MIMO user quantity indication field, the field indicating the MU-MIMO user quantity, and the field indicating the start location in the embodiment corresponding to FIG. 6C is located in the U-SIG, and the total MU-MIMO user quantity indication field and the bitmap in the embodiment corresponding to FIG. 6D further is located in the U-SIG.

Optionally, the U-SIG further includes a compression mode indication field, to indicate a compression mode. For example, a compression mode is indicated to indicate that a resource is allocated in an MU-MIMO mode in a non-OFDMA scenario. Alternatively, the compression mode indication field indicates another compression mode to indicate that the common field includes a field (for example, a field or a bitmap indicating a start location) indicating which station in a plurality of stations to which an MU-MIMO transmission resource is allocated is a station corresponding to a user field of the EHT-SIG.

For example, based on the embodiment corresponding to FIG. 6C, the compression mode indication field indicates, by indicating a compression mode of the EHT-SIG, that the signaling field includes or does not include the total MU-MIMO user quantity indication field, the field indicating the MU-MIMO user quantity, and the field indicating the start location. For another example, based on the embodiment corresponding to FIG. 6D, the compression mode indication field indicates, by indicating a compression mode of the EHT-SIG, that the signaling field includes or does not include the total MU-MIMO user quantity indication field and the bitmap.

Certainly, in another embodiment, another field is used to indicate that the signaling field includes or does not include the total MU-MIMO user quantity indication field, the field indicating the MU-MIMO user quantity, and the field indicating the start location, or another field is used to indicate whether the signaling field includes or does not include the total MU-MIMO user quantity indication field and the bitmap.

In some embodiments, station sequence is not limited to a station sequence corresponding to an index indicating spatial stream allocation in Table 3-1 or Table 3-2, and further is a station sequence corresponding to another index indicating spatial stream allocation.

In some embodiments, the index indicating spatial stream allocation indicates a spatial stream allocated to each of the N stations based on the station sequence of the N stations. In the common field of the signaling field, a field (for example, the field indicating the start location or the bitmap) indicating a station in the station sequence indicates that each station parking on the current frequency segment is which of the N stations indicated by the index indicating spatial stream allocation, so that each station parking on the current frequency segment corresponds to one of the N stations indicated by the index indicating spatial stream allocation. In some embodiments, a spatial stream allocated to each station parking on the current frequency segment is accurately indicated.

To further reduce overheads of the signaling field, some embodiments provide some spatial stream indication manners that are irrelevant to an arrangement order of user fields. In such a solution, a special user field is unable to be set in the signaling field, but a function of a field indicating a spatial stream in each user field is improved, so that overheads of the signaling field is further reduced.

The user field includes a field indicating a station identifier, a spatial stream allocation indication field, and a modulation and coding scheme indication field. In some embodiments, the spatial stream allocation indication field includes a starting spatial stream subfield and a number of spatial streams subfield. Refer to Table 13. Table 13 shows a content structure of the user field in this embodiment.

TABLE 13

| Quantity of bits (number of bits) | Field (subfield) |
|---|---|
| 11 | Station identifier (STA ID) |
| Greater than or equal to 4 | Starting spatial stream (starting spatial stream) |
| Greater than or equal to 2 | Number of spatial streams (number of spatial stream) |
| . . . | Modulation and coding scheme (modulation and coding scheme, MCS) |
| . . . | . . . |

The starting spatial stream subfield indicates a starting spatial stream of a spatial stream allocated to a STA corresponding to the user field, and the starting spatial stream subfield is a binary character string. In other words, the starting spatial stream subfield indicates the first spatial stream allocated to the station corresponding to the station identifier. A value of the binary string plus 1 is a sequence number of the starting spatial stream. A quantity of bits of the starting spatial stream subfield is a maximum quantity of streams that is supported by MU-MIMO. For example, in 802.11be, the maximum quantity of streams that is supported by MU-MIMO is 16, and the quantity of bits of the starting spatial stream subfield is 4. The quantity of bits of the starting spatial stream subfield is not limited to 4, for example, further is a positive integer such as 5, 6, or 7. In response to the maximum quantity of streams that is supported by MU-MIMO being another value, the quantity of bits of the starting spatial stream subfield is adjusted accordingly. For example, in response to the maximum quantity of streams that is supported by MU-MIMO being N, the quantity of bits of the starting spatial stream subfield is $\log_2 N$.

The number of spatial streams subfield indicates a quantity of spatial streams allocated to the STA. The number of spatial streams subfield is a binary character string, and a value of the binary character string plus 1 is the quantity of spatial streams allocated to the STA. A quantity of bits of the number of spatial streams subfield is a quantity of bits occupied by a binary character string corresponding to a maximum quantity of streams that is allocated to a single user in MU-MIMO. For example, in 802.11be, the maximum quantity of streams that is allocated to a single user in MU-MIMO is 4, and the quantity of bits of the number of spatial streams subfield is 2. The quantity of bits of the number of spatial streams subfield is not limited to 2, for example, further is a positive integer such as 3, 4, or 5. In response to the maximum quantity of streams that is allocated to a single user in MU-MIMO being another value, the quantity of bits of the number of spatial streams subfield is adjusted accordingly. For example, the maximum quantity of streams that is allocated to a single user in MU-MIMO is K, and the quantity of bits of the number of spatial streams subfield is $\log_2 K$.

This manner of indicating spatial stream allocation is irrelevant to a quantity and an arrangement order of user fields. In some embodiments, with reference to the foregoing first possible manner of signaling field setting, in response to a quantity of user fields being reduced, a spatial stream allocated to a STA corresponding to each user field further is accurately indicated, and no special user field calls to be added. In both the non-OFDMA scenario and the OFDMA scenario, the user field is configured to use this indication manner to indicate spatial stream allocation.

For example, based on 802.11be, in the examples in FIG. 8A and FIG. 8B, in response to spatial streams allocated to the STA a being the first to third streams corresponding to the 106-tone RU, a content structure of the user field a corresponding to the STA a is shown in Table 14. A starting spatial stream subfield in the user field a is 0000, indicating that a start location is the first stream corresponding to the 106-tone RU; and a number of spatial streams subfield is 10, indicating that a quantity of spatial streams allocated to the STA is 3. In this case, the STA a determines, according to the user field a, that spatial streams allocated to the STA a are the first to third streams corresponding to the 106-tone RU.

TABLE 14

| Quantity of bits (number of bits) | Field (subfield) |
|---|---|
| 11 | Station identifier (STA ID) |
| 4 | 0000 |
| 2 | 10 |
| . . . | Modulation and coding scheme (Modulation and Coding Scheme, MCS) |
| . . . | . . . |

Similarly, in response to spatial streams allocated to the STA b being the fourth to fifth streams corresponding to the 106-tone RU, a content structure of the user field b corresponding to the STA b is shown in Table 15. A starting spatial stream subfield in the user field b is 0011, indicating that a start location is the fourth stream corresponding to the 106-tone RU; and a number of spatial streams subfield is 01, indicating that a quantity of spatial streams allocated to the STA is 2. In this case, the STA b determines, according to the user field b, that spatial streams allocated to the STA b are the fourth to fifth streams corresponding to the 106-tone RU.

TABLE 15

| Quantity of bits (number of bits) | Field (subfield) |
|---|---|
| 11 | Station identifier (STA ID) |
| 4 | 0011 |
| 2 | 01 |
| ... | Modulation and coding scheme (Modulation and Coding Scheme, MCS) |
| ... | ... |

For another example, based on 802.11be, in the example in FIG. 9A, in response to spatial streams allocated to the STA a being the first to third streams corresponding to the 242-tone RU, a content structure of the user field a corresponding to the STA a is shown in Table 16. A starting spatial stream subfield in the user field a is 0000, indicating that a start location is the first stream corresponding to the 242-tone RU; and a number of spatial streams subfield is 10, indicating that a quantity of spatial streams allocated to the STA a is 3. In this case, the STA a determines, according to the user field a, that spatial streams allocated to the STA a are the first to third streams corresponding to the 242-tone RU.

TABLE 16

| Quantity of bits (number of bits) | Field (subfield) |
|---|---|
| 11 | Station identifier (STA ID) |
| 4 | 0000 |
| 2 | 10 |
| ... | Modulation and coding scheme (Modulation and Coding Scheme, MCS) |
| ... | ... |

Similarly, in response to spatial streams allocated to the STA c being the fourth to fifth streams corresponding to the 242-tone RU, a content structure of the user field c corresponding to the STA c is shown in Table 17. A starting spatial stream subfield in the user field c is 0011, indicating that a start location is the fourth stream corresponding to the 242-tone RU; and a number of spatial streams subfield is 01, indicating that a quantity of spatial streams allocated to the STA is 2. In this case, the STA c determines, according to the user field c, that spatial streams allocated to the STA c are the fourth to fifth streams corresponding to the 242-tone RU.

TABLE 17

| Quantity of bits (number of bits) | Field (subfield) |
|---|---|
| 11 | Station identifier (STA ID) |
| 4 | 0011 |
| 2 | 01 |
| ... | Modulation and coding scheme (Modulation and Coding Scheme, MCS) |
| ... | ... |

For another example, based on 802.11be, in the example in FIG. 11A, in response to spatial streams allocated to the STA1 being the first to second streams corresponding to the 320 MHz channel bandwidth, a content structure of the user field corresponding to the STA1 is shown in Table 18. A starting spatial stream subfield in the user field is 0000, indicating that a start location is the first stream corresponding to the 320 MHz channel bandwidth; and a number of spatial streams subfield is 01, indicating that a quantity of spatial streams allocated to the STA1 is 2. In this case, the STA1 determines, according to the user field, that spatial streams allocated to the STA1 are the first to second streams corresponding to the 320 MHz channel bandwidth.

TABLE 18

| Quantity of bits (number of bits) | Field (subfield) |
|---|---|
| 11 | Station identifier (STA ID) |
| 4 | 0000 |
| 2 | 01 |
| ... | Modulation and coding scheme (Modulation and Coding Scheme, MCS) |
| ... | ... |

Similarly, in response to a spatial stream allocated to the STA3 being the third stream corresponding to the 320 MHz channel bandwidth, a content structure of the user field of the STA3 is shown in Table 19. A starting spatial stream subfield in the user field 3 is 0010, indicating that a start location is the third stream corresponding to the 320 MHz channel bandwidth; and a number of spatial streams subfield is 00, indicating that a quantity of spatial streams allocated to the STA3 is 1. In this case, the STA3 determines, according to the user field, that a spatial stream allocated to the STA3 is the third stream corresponding to the 320 MHz channel bandwidth.

TABLE 19

| Quantity of bits (number of bits) | Field (subfield) |
|---|---|
| 11 | Station identifier (STA ID) |
| 4 | 0010 |
| 2 | 00 |
| ... | Modulation and coding scheme (Modulation and Coding Scheme, MCS) |
| ... | ... |

In this embodiment, a quantity of LTFs depends on a maximum quantity of streams in a plurality of segments, instead of a maximum quantity of streams in a user field of a segment of the LTF.

In some other embodiments, the spatial stream allocation indication field in the user field includes a starting spatial stream subfield and an ending spatial stream subfield. The starting spatial stream subfield indicates the first spatial stream allocated to the station corresponding to the user field, and the ending spatial stream subfield indicates the last spatial stream allocated to the station corresponding to the user field. Refer to Table 20. Table 20 shows a content structure of the user field in this embodiment. For a manner of determining a quantity of bits of the starting spatial stream subfield in this embodiment, refer to the manner of determining the starting spatial stream subfield in the foregoing embodiment. In this embodiment, a quantity of bits of the ending spatial stream subfield is the same as the quantity of bits of the starting spatial stream subfield.

TABLE 20

| Quantity of bits (number of bits) | Field (subfield) |
|---|---|
| 11 | Station identifier (STA ID) |
| Greater than or equal to 4 | Starting spatial stream (starting spatial stream) |
| Greater than or equal to 4 | Ending spatial stream (ending of spatial stream) |
| ... | Modulation and coding scheme (modulation and coding scheme, MCS) |
| ... | ... |

A manner of starting spatial stream subfield setting is consistent with the manner of starting spatial stream setting in the foregoing embodiment, and the manner of starting spatial stream setting is not described in detail in this embodiment.

The field indicating the ending spatial stream is a binary character string, and a value of the binary character string plus 1 is a sequence number of the last spatial stream allocated to the station corresponding to the user field. A quantity of bits of a subfield of the field indicating the ending spatial stream is the same as a quantity of bits of the starting spatial stream subfield.

This manner of indicating spatial stream allocation is further irrelevant to a quantity and an arrangement order of user fields. Similarly, in response to a quantity of user fields being reduced, a spatial stream allocated to a STA corresponding to each user field further is accurately indicated, and a special user field does not call to be added. In both the non-OFDMA scenario and the OFDMA scenario, the user field indicates spatial stream allocation in such a manner.

For example, based on 802.11be, in the example in FIG. 8A, in response to spatial streams allocated to the STA b being the fourth to fifth streams corresponding to the 106-tone RU, a content structure of the user field b corresponding to the STA b is shown in Table 21. A starting spatial stream subfield in the user field b is 0011, indicating that a start location is the fourth stream corresponding to the 106-tone RU; and an ending spatial stream subfield is 0100, indicating that the last spatial stream allocated to the STA is the fifth stream. In this case, the STA b determines, according to the user field b, that spatial streams allocated to the STA b are the fourth to fifth streams corresponding to the 106-tone RU.

TABLE 21

| Quantity of bits (number of bits) | Field (subfield) |
|---|---|
| 11 | Station identifier (STA ID) |
| 4 | 0011 |
| 4 | 0100 |
| ... | Modulation and coding scheme (Modulation and Coding Scheme, MCS) |
| ... | ... |

For another example, in the example in FIG. 9A, in response to spatial streams allocated to the STA c being the fourth to fifth streams corresponding to the 242-tone RU, a content structure of the user field c corresponding to the STA c is shown in Table 22. A spatial stream allocation field in the user field c is 0011, indicating that a start location is the fourth stream corresponding to the 242-tone RU; and an ending spatial stream subfield is 0100, indicating that the last spatial stream allocated to the STA is the fifth stream. In this case, the STA c determines, according to the user field c, that spatial streams allocated to the STA c are the fourth to fifth streams corresponding to the 242-tone RU.

TABLE 22

| Quantity of bits (number of bits) | Field (subfield) |
|---|---|
| 11 | Station identifier (STA ID) |
| 4 | 0011 |
| 4 | 0100 |
| ... | Modulation and coding scheme (Modulation and Coding Scheme, MCS) |
| ... | ... |

For another example, in the example in FIG. 11A, in response to a spatial stream allocated to the STA3 being the third stream corresponding to the 320 MHz channel bandwidth, a content structure of the user field of the STA3 is shown in Table 23. A spatial stream allocation field in the user field 3 is 0010, indicating that a start location is the third stream corresponding to the 320 MHz channel bandwidth; and an ending spatial stream subfield is 0010, indicating that the last spatial stream allocated to the STA3 is the third stream corresponding to the 320 MHz channel bandwidth. In this case, the STA3 determines, according to the user field, that a spatial stream allocated to the STA3 is the third stream corresponding to the 320 MHz channel bandwidth.

TABLE 23

| Quantity of bits (number of bits) | Field (subfield) |
|---|---|
| 11 | Station identifier (STA ID) |
| 4 | 0010 |
| 4 | 0000 |
| ... | Modulation and coding scheme (Modulation and Coding Scheme, MCS) |
| ... | ... |

The following describes the second possible manner of signaling field setting. A quantity of MU-MIMO users indicated by a signaling field transmitted on a first frequency segment is a total quantity of user fields corresponding to an MU-MIMO frequency domain resource for MU-MIMO transmission. The signaling field includes a null user field and a user field of a STA to which the MU-MIMO frequency domain resource is allocated and that parks on the first frequency segment (current frequency segment). The null user field is set at a location corresponding to a user field of a STA to which the MU-MIMO frequency domain resource is located and that does not park on the first frequency segment. The null user field indicates that the user field herein is null. The null user field is, for example, "2046".

In other words, in this embodiment, the null user field is used to replace the user field of the STA to which the MU-MIMO frequency domain resource is allocated and that does not park on the current frequency segment. Actually, compared with a quantity of users corresponding to the MU-MIMO frequency domain resource, a quantity of user fields does not decrease in the signaling field. In some embodiments, in response to segment-based transmission being performed, in a signaling field transmitted on a frequency segment, a sequence location, in a plurality of user fields, of a user field of a STA that parks on the frequency segment and to which an MU-MIMO frequency domain resource is allocated accurately corresponds to a corresponding frequency domain resource, and a field indicating a quantity of spatial streams accurately indicates a spatial stream allocated to a STA corresponding to each user field. STAs that park on different frequency segments and to which an MU-MIMO frequency domain resource is allocated accurately determines an allocated MU-MIMO frequency domain resource based on a sequence location, in a plurality of user fields, of a user field that is in a signaling field transmitted on a frequency segment in which the STA parks and that includes a station identifier of the STA, and receive data on the MU-MIMO frequency domain resource allocated to the STA, so that STAs parking on at least two frequency segments performs MU-MIMO transmission on a same MU-MIMO frequency domain resource.

The second possible manner of signaling field setting is used in both an OFDMA scenario and a non-OFDMA scenario. The following separately describes the second possible manner of signaling field setting in the OFDMA scenario and the non-OFDMA scenario with reference to examples.

In an OFDMA scenario, an MU-MIMO frequency domain resource for MU-MIMO transmission in the foregoing channel bandwidth is understood as an RU for MU-MIMO transmission.

Figure 16A:
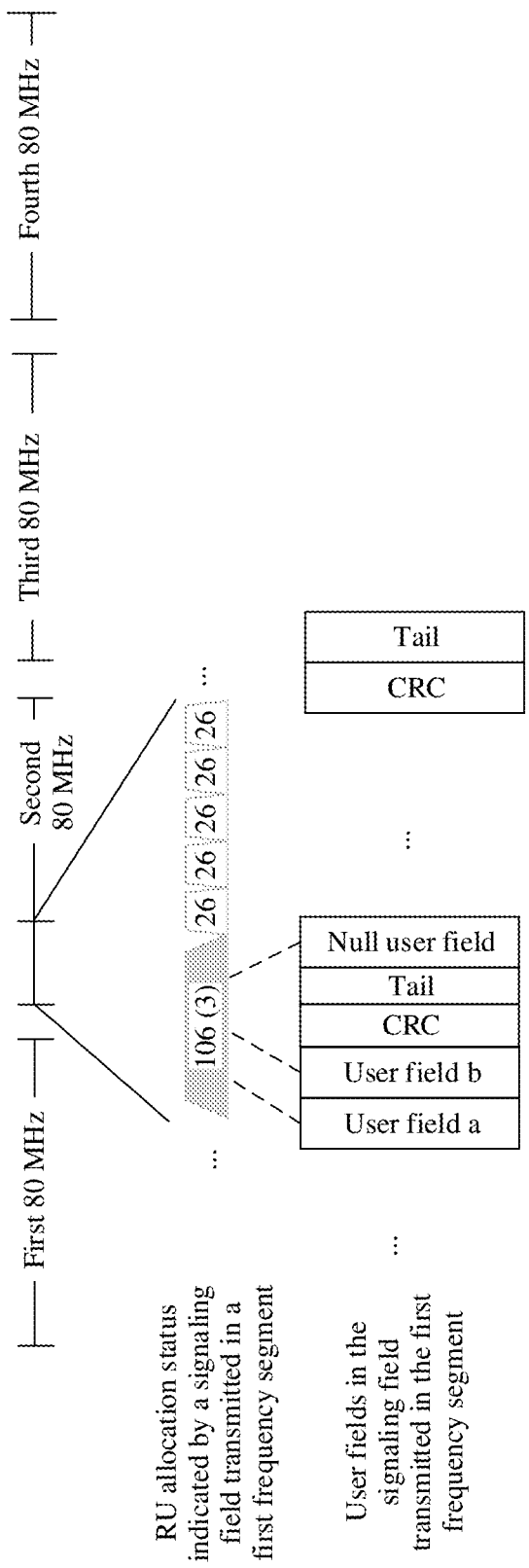
FIG. 16A is a schematic diagram of another scenario in which a signaling field indicates RU allocation according to some embodiments.

FIG. 16A is a schematic diagram of another scenario in which a signaling field indicates RU allocation according to some embodiments. For example, refer to FIG. 16A. In response to resource unit allocation being the same as that in the examples corresponding to FIG. 8A and FIG. 8B, in response to the second possible manner of signaling field setting being used, in a signaling field transmitted on a first frequency segment, a resource unit allocation subfield corresponding to the 20 MHz frequency band indicates that RUs corresponding to the 20 MHz frequency band are a 106-tone RU, a 26-tone RU, a 26-tone RU, a 26-tone RU, a 26-tone RU, and a 26-tone RU, and indicates that a quantity of user fields corresponding to the 106-tone RU is 3. The signaling field transmitted on the first frequency segment includes three user fields corresponding to the 106-tone RU: a user field a, a user field b, and a null user field. In response to a STA c parking on the first frequency segment, the STA c determines, based on an arrangement order of a user field c including a station identifier of the STA c in a plurality of user fields corresponding to the resource unit allocation subfield, that an RU corresponding to the user field c is the first 26-tone RU, so as to determine that an RU allocated to the STA c is the 26-tone RU.

Figure 16B:
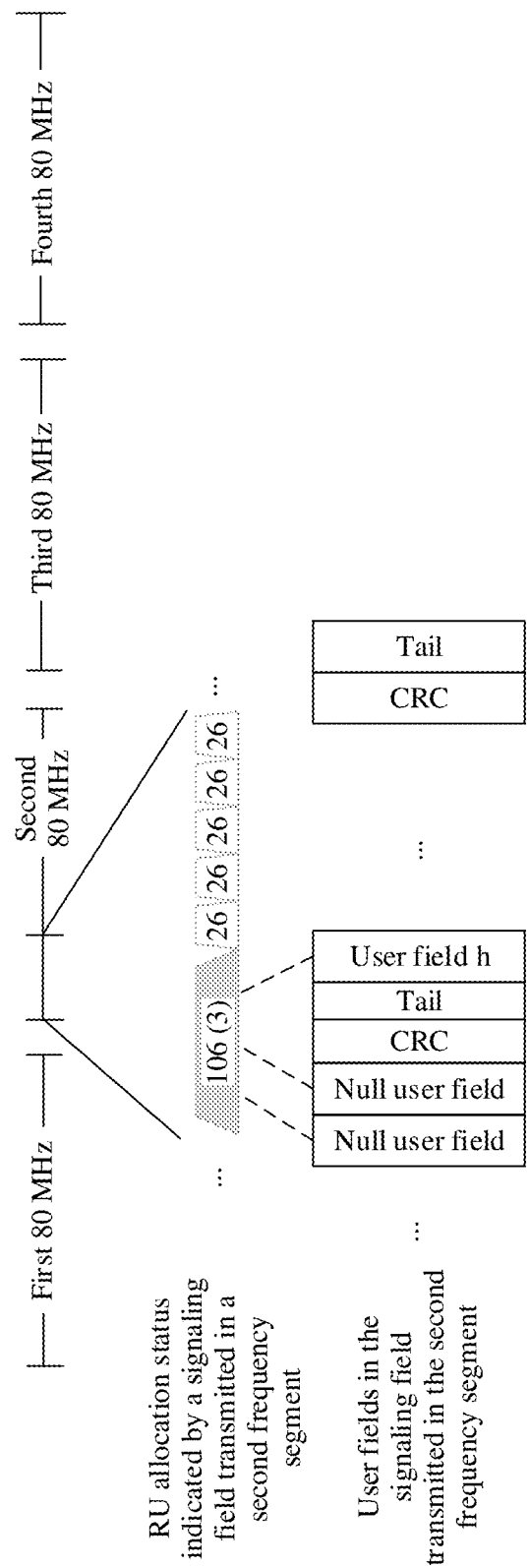
FIG. 16B is a schematic diagram of another scenario in which a signaling field indicates RU allocation according to some embodiments.

Refer to a schematic diagram of a scenario in which a signaling field indicates RU allocation shown in FIG. 16B, in a signaling field transmitted on a second frequency segment, a resource unit allocation subfield corresponding to the 20 MHz frequency band indicates that RUs corresponding to the 20 MHz frequency band are a 106-tone RU, a 26-tone RU, a 26-tone RU, a 26-tone RU, a 26-tone RU, and a 26-tone RU, and indicates that a quantity of user fields corresponding to the 106-tone RU is 3. The signaling field transmitted on the second frequency segment includes three user fields corresponding to the 106-tone RU: a null user field, a null user field, and a user field h. A STA h parking on the second frequency segment determines, based on that the user field h including a station identifier of the STA h is the third user field corresponding to the 106-tone RU, that an RU allocated to the STA h is the 106-tone RU.

In some embodiments, although the signaling field transmitted on the second frequency segment does not include the first user field and the second user field (the user field a and the user field b) that correspond to the 106-tone RU, because a null user field is set at a corresponding location, a sequence of user fields and an allocation sequence of RUs indicated by the resource unit allocation subfield does not mismatch. A STA parking on the first frequency segment or the second frequency segment determines, based on an RU corresponding to a location of a user field including a station identifier of the STA, an RU allocated to the STA.

Figure 17A:
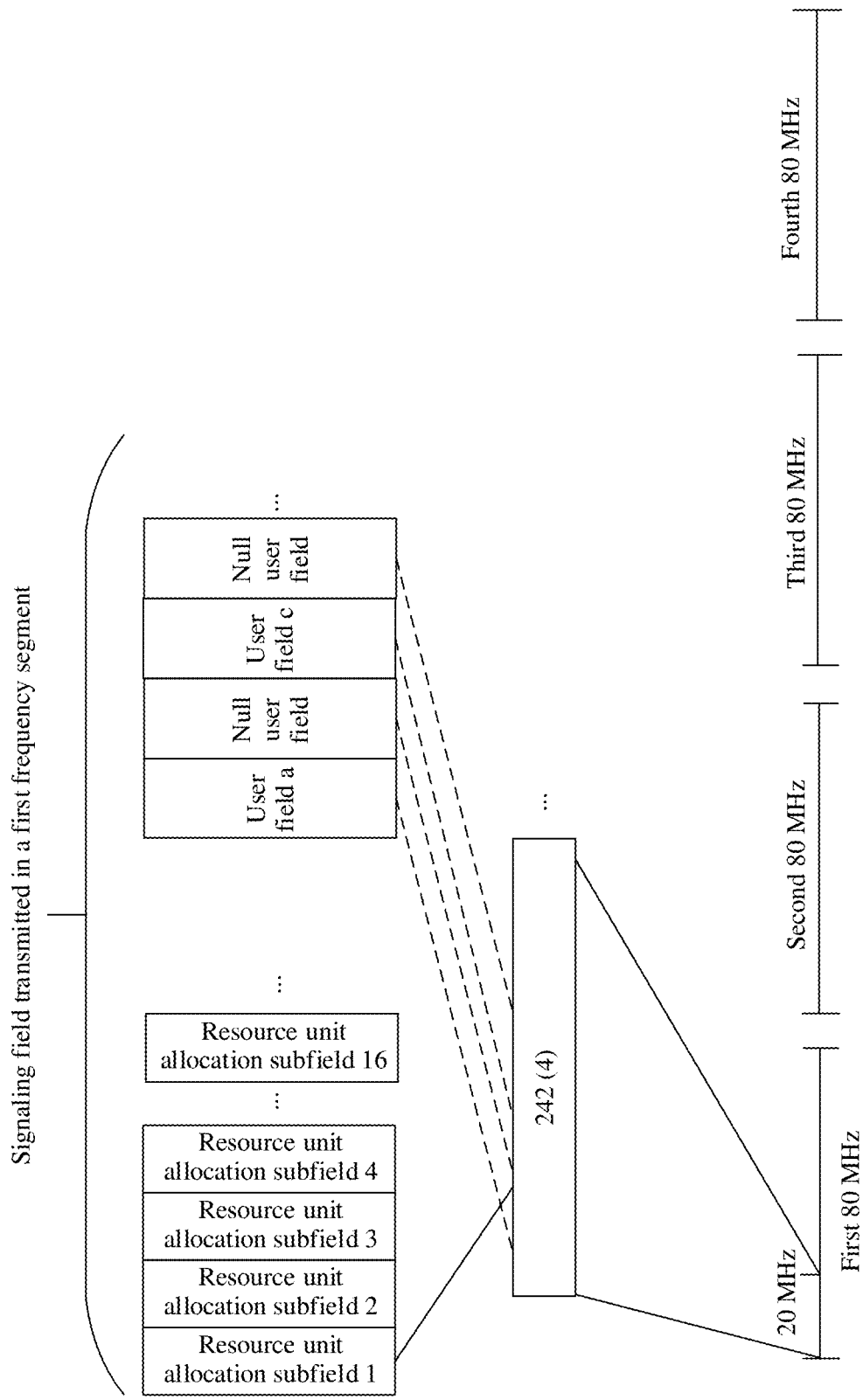
FIG. 17A is a schematic diagram of another scenario in which a signaling field indicates RU allocation according to some embodiments.
Figure 17B:
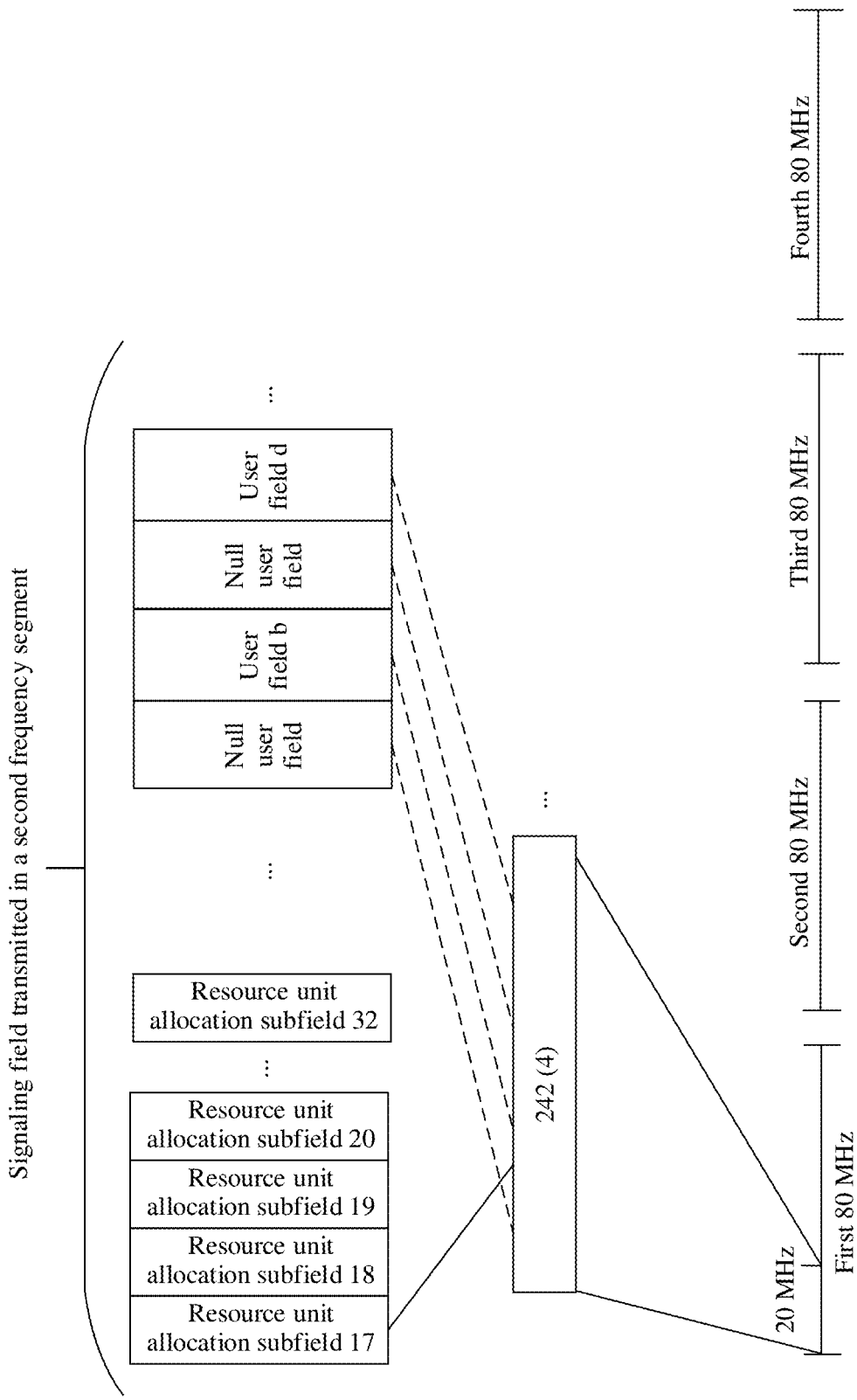
FIG. 17B is a schematic diagram of another scenario in which a signaling field indicates RU allocation according to some embodiments.

Refer to schematic diagrams of scenarios in which a signaling field indicates RU allocation shown in FIG. 17A and FIG. 17B. In response to resource unit allocation being the same as that in the examples corresponding to FIG. 9A and FIG. 9B, in response to the second possible manner of signaling field setting being used, in a signaling field transmitted on a first frequency segment, a resource unit allocation subfield 1 corresponding to a lowest frequency 20 MHz frequency band of a first 80 MHz frequency band of a 320 MHz channel bandwidth indicates a 242-tone RU, and indicates that a quantity of user fields corresponding to the 242-tone RU is 4. The signaling field transmitted on the first frequency segment sequentially includes a user field a, a null user field, a user field c, and a null user field. In a signaling field transmitted on a second frequency segment, a resource unit allocation subfield 17 corresponding to the lowest frequency 20 MHz frequency band of the first 80 MHz frequency band of the 320 MHz channel bandwidth indicates a 242-tone RU, and indicates that a quantity of user fields corresponding to the 242-tone RU is 4. The signaling field transmitted on the second frequency segment includes a null user field, a user field b, a null user field, and a user field d that correspond to the 242-tone RU and that are sequentially set. In some embodiments, location disorder of user fields is avoided by setting a null user field, and a STA parking on the first frequency segment or the second frequency segment determines, based on an RU corresponding to a location of a user field including a station identifier of the STA, an RU allocated to the STA.

Figure 18A:
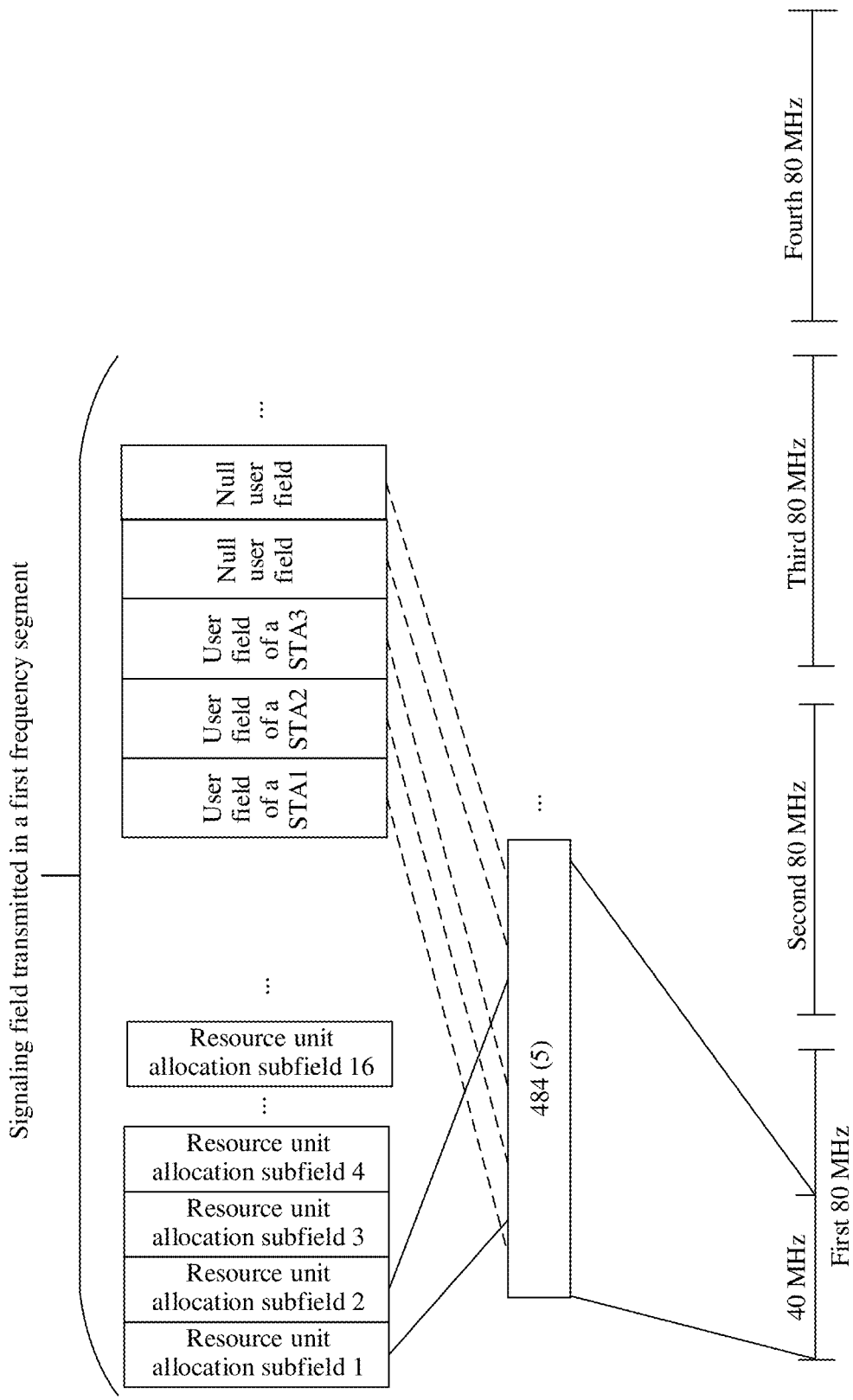
FIG. 18A is a schematic diagram of another scenario in which a signaling field indicates RU allocation according to some embodiments.
Figure 18B:
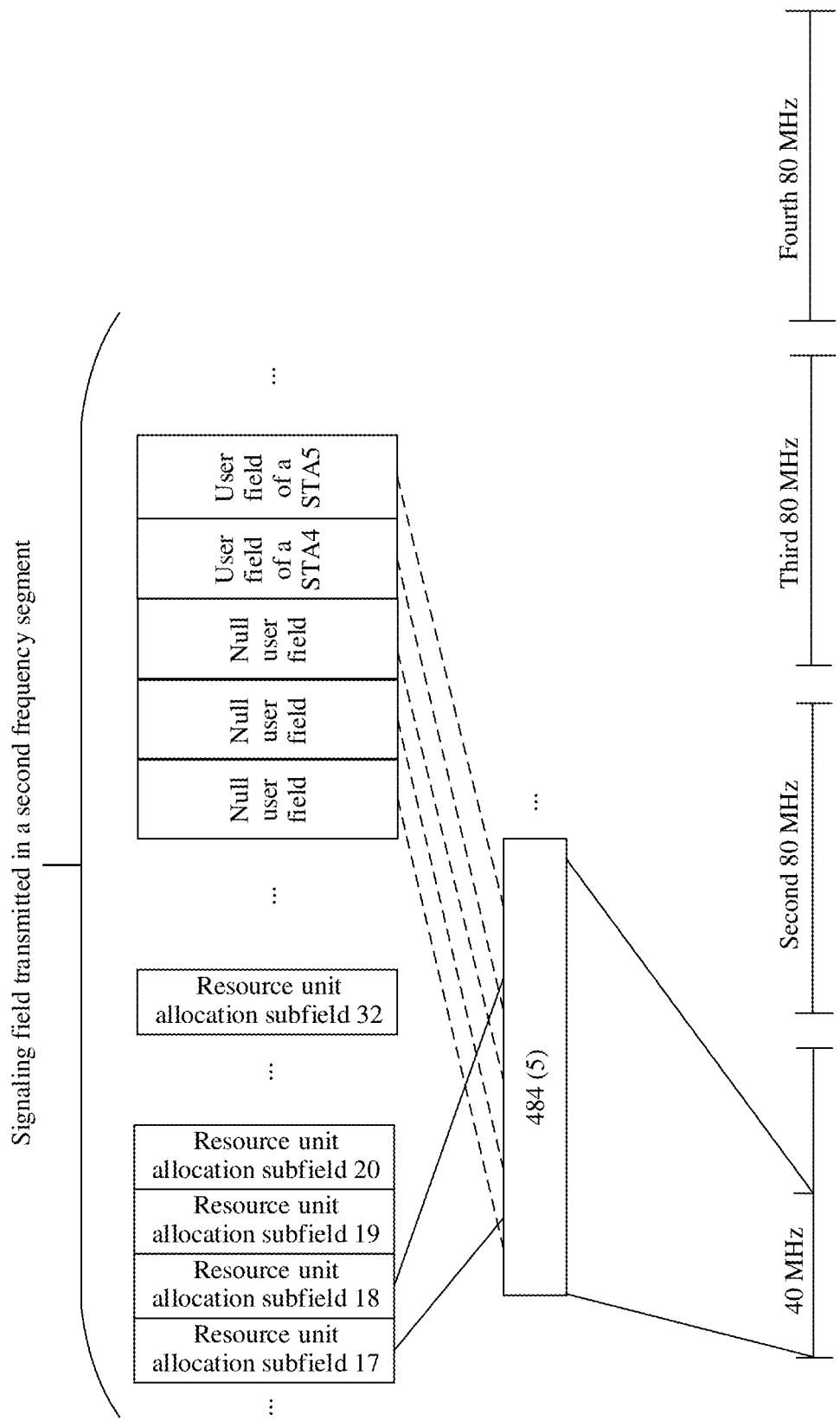
FIG. 18B is a schematic diagram of another scenario in which a signaling field indicates RU allocation according to some embodiments.

Refer to schematic diagrams of scenarios in which a signaling field indicates RU allocation shown in FIG. 18A and FIG. 18B. In response to resource unit allocation being the same as that in the examples corresponding to FIG. 10A and FIG. 10B, in response to the second possible manner of signaling field setting being used, in a signaling field transmitted on a first frequency segment, a resource unit allocation subfield 1 and a resource unit allocation subfield 2 that correspond to a lowest frequency 40 MHz frequency band of a first 80 MHz frequency band of a 320 MHz channel bandwidth indicates a 242-tone RU, and indicates that a quantity of user fields corresponding to the 242-tone RU is 5. The signaling field transmitted on the first frequency segment sequentially includes a user field of a STA1, a user field of a STA2, a user field of a STA3, a null user field, and a null user field. In a signaling field transmitted on a second frequency segment, a resource unit allocation subfield 1 and a resource unit allocation subfield 2 corresponding to the lowest frequency 40 MHz frequency band of the first 80 MHz frequency band of the 320 MHz channel bandwidth indicates a 242-tone RU, and indicates that a quantity of user fields corresponding to the 242-tone RU is 5. The signaling field transmitted on the second frequency segment includes a null user field, a null user field, a null user field, a user field of a STA4, and a user field of a STA5 that correspond to the 484-tone RU and that are sequentially set. In some embodiments, location disorder of user fields is avoided by setting a null user field, and a STA parking on the first frequency segment or the second frequency segment determines, based on an RU corresponding to a location of a user field including a station identifier of the STA, an RU allocated to the STA.

Figure 19A:
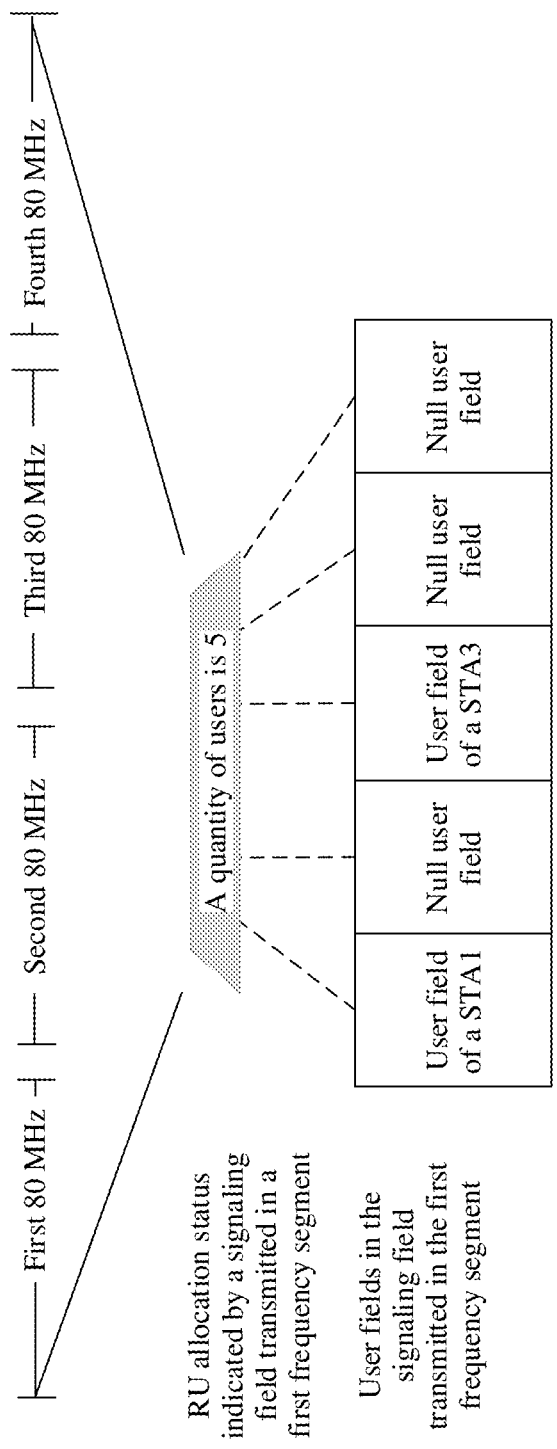
FIG. 19A is a schematic diagram of another scenario in which a signaling field indicates frequency domain resource allocation according to some embodiments.
Figure 19B:
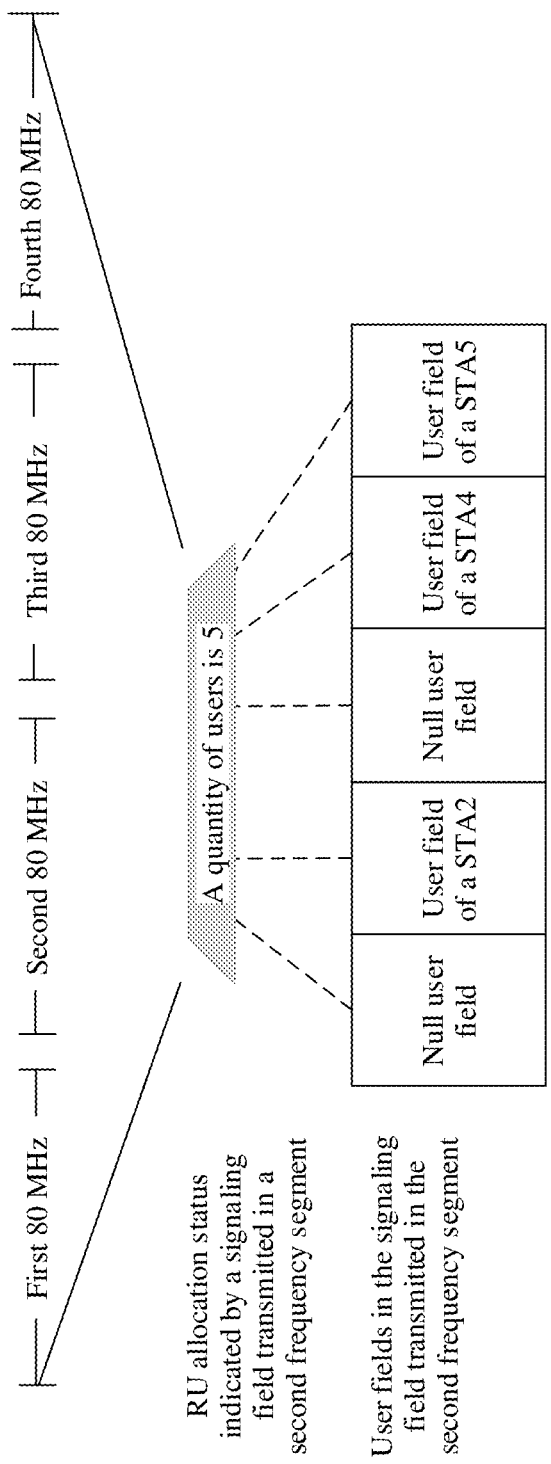
FIG. 19B is a schematic diagram of another scenario in which a signaling field indicates frequency domain resource allocation according to some embodiments.

For another example, refer to schematic diagrams of scenarios in which a signaling field indicates RU allocation shown in FIG. 19A and FIG. 19B. In response to resource unit allocation being the same as that in the examples corresponding to FIG. 11A and FIG. 11B, the second possible manner of signaling field setting is used. As shown in FIG. 19A, a signaling field transmitted on a first frequency segment indicates that a 320 MHz channel bandwidth is allocated to five stations. The signaling field includes five user fields: a user field including a station identifier of a STA1, a null user field, a user field including a station identifier of a STA3, a null user field, and a null user field in sequence.

As shown in FIG. 19B, a signaling field transmitted on a second frequency segment indicates that the 320 MHz channel bandwidth is allocated to five stations. The signaling field includes five user fields: a null user field, a user field of a STA2, a null user field, a user field of a STA4, and a user field of a STA5 in sequence.

In some embodiments, although the signaling field transmitted on the first frequency segment does not include the user fields of the STA2, the STA4, and the STA5, null user fields are set at corresponding locations. Although the signaling field transmitted on the second frequency segment does not include the user fields of the STA1 and the STA3, null user fields are further set at corresponding locations. Such a manner of user field setting does not cause a disorder of an arrangement order of user fields. A STA parking on each frequency segment determines frequency domain resource allocation of the STA based on a user field including a station identifier of the STA, and receive data on an MU-MIMO frequency domain resource allocated to the STA, so that STAs parking on at least two frequency segments performs MU-MIMO transmission on a same MU-MIMO frequency domain resource.

Some embodiments provide a solution in which a resource unit allocation subfield indicates an RU. In this solution, an RU (for example, a 106-tone RU) with less than 242 subcarriers does not support MU-MIMO transmission, that is, an RU with less than 242 subcarriers corresponds to one user. In some embodiments, a quantity of entries indicating that a 106-tone RU corresponds to different quantities of users in Table 2 is reduced. For example, a quantity of entries corresponding to 00100y2y1y0 in Table 2 is reduced from 8 to 1. Similar deletion further is performed on other related entries in Table 2.

The solution in which a resource unit allocation subfield indicates an RU in some embodiments are indicated according to the following Table 24.

TABLE 24

| Resource unit allocation subfield value (B7, B6, B5, B4, B3, B2, B1, B0) | #1 | #2 | #3 | #4 | #5 | #6 | #7 | #8 | #9 | Entry quantity |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 52 | | 52 | | — | 106 | | | | 1 |
| 17 | | 106 | | | — | 52 | | 52 | | 1 |
| 18 | 26 | 26 | 26 | 26 | 26 | | 106 | | | 1 |
| 19 | 26 | 26 | | 52 | 26 | | 106 | | | 1 |
| 20 | | 52 | 26 | 26 | 26 | | 106 | | | 1 |
| 21 | | 52 | | 52 | 26 | | 106 | | | 1 |
| 22 | | 106 | | | 26 | 26 | 26 | 26 | 26 | 1 |
| 23 | | 106 | | | 26 | 26 | 26 | 52 | | 1 |
| 24 | | 106 | | | 26 | 52 | | 26 | 26 | 1 |
| 25 | | 106 | | | 26 | 52 | | 52 | | 1 |
| 26 | | 106 | | | — | 106 | | | | 1 |
| 27 | | 52 | | 52 | — | 52 | | 52 | | 1 |
| 28 | 242-tone RU: null (zero users) | | | | | | | | | 1 |
| 29 | 484-tone RU; contributes zero user fields to the user-specific field in the same EHT-SIG content channel as this RU allocation subfield (contributes zero user fields to the user-specific field in the same EHT-SIG content channel as this RU allocation subfield) | | | | | | | | | 1 |
| 30 | 996-tone RU; contributes zero user fields to the user-specific field in the same EHT-SIG content channel as this RU allocation subfield (contributes zero user fields to the user-specific field in the same EHT-SIG content channel as this RU allocation subfield) | | | | | | | | | 1 |

TABLE 24-continued

| Resource unit allocation subfield value (B7, B6, B5, B4, B3, B2, B1, B0) | #1 | #2 | #3 | #4 | #5 | #6 | #7 | #8 | #9 | Entry quantity |
|---|---|---|---|---|---|---|---|---|---|---|
| 31 | 2 × 996-tone RU; contributes zero user fields to a user-specific field in a same EHT-SIG content channel as this resource unit allocation subfield (contributes zero user fields to the user-specific field in the same EHT-SIG content channel as this RU allocation subfield) | | | | | | | | | 1 |
| 32 | | | 106 | | 26 | | 106 | | | 1 |
| 33-255 | | | | | Remaining entries | | | | | 223 |

In some embodiments, compared with Table 2, there are more remaining entries in such an indication manner. In some embodiments, a resource unit allocation subfield indicates more resource unit allocation cases by using the remaining entries. Some cases in which a remaining entry indicates RU allocation are provided below.

In some embodiments, the remaining entries includes some entries to indicate an absolute location, in a channel bandwidth, of a frequency domain resource corresponding to an RU or a multiple resource unit (multiple RU, Multi-RU) with more than or equal to 242 subcarriers. In some embodiments, the resource unit allocation subfield indicates an absolute location, in the channel bandwidth, of a frequency domain resource corresponding to an RU with more than or equal to 242 subcarriers.

For example, in response to the channel bandwidth being 320 MHz, there are 16 possible absolute locations of a frequency domain resource corresponding to a 242-tone RU, which are respectively the first to the sixteenth 20 MHz frequency band in the 320 MHz channel bandwidth. The resource unit allocation subfield indicates, by using 16 entries in the remaining entries, absolute locations of the frequency domain resource corresponding to the 242-tone RU in the channel bandwidth.

There are four possible absolute locations of a frequency domain resource corresponding to a 242+484-tone RU, which are respectively the first to the fourth 80 MHz frequency band in the 320 MHz channel bandwidth. The resource unit allocation subfield indicates, by using four entries in the remaining entries, absolute locations of the frequency domain resource corresponding to the 242+484-tone RU in the channel bandwidth.

There are eight possible absolute locations of a frequency domain resource corresponding to a 484+996-tone RU in the channel bandwidth, which are respectively the first 160 MHz frequency band and the second 160 MHz frequency band in the 320 MHz channel bandwidth. The resource unit allocation subfield indicates, by using two entries in the remaining entries, absolute locations of the frequency domain resource corresponding to the 484+996-tone RU in the channel bandwidth.

In some embodiments, for another RU or multi-RU with more than 242 subcarriers, the resource unit allocation subfield is configured to use a remaining entry to indicate an absolute location of a frequency domain resource in the channel bandwidth. Examples are not described herein one by one.

In some other embodiments, the remaining entries includes some entries to indicate an absolute location, in a channel bandwidth, of an RU or a multi-RU with more than or equal to 242 subcarriers, and a quantity of user fields corresponding to the RU or the MRU. In some embodiments, the resource unit allocation subfield indicates an absolute location, in the channel bandwidth, of a frequency domain resource corresponding to an RU with more than or equal to 242 subcarriers and a corresponding MU-MIMO user quantity.

For example, in response to the channel bandwidth being 320 MHz, there are 16 possible absolute locations of a frequency domain resource corresponding to a 242-tone RU, which are respectively the first to the sixteenth 20 MHz frequency band in the 320 MHz channel bandwidth. In response to the absolute location of the frequency domain resource corresponding to the 242-tone RU being any one of the first to the sixteenth 20 MHz frequency band of the 320 MHz channel bandwidth, a corresponding quantity of users are any value of 1 to 8. In other words, that the absolute location of the frequency domain resource corresponding to the 242-tone RU is each of the first to sixteenth 20 MHz frequency bands of the 320 MHz channel bandwidth corresponds to eight user quantities. The resource unit allocation subfield indicates, by using 16×8=128 entries in the remaining entries, the absolute location of the frequency domain resource corresponding to the 242-tone RU in the channel bandwidth and an MU-MIMO user quantity corresponding to the 242-tone RU.

There are four possible absolute locations of a frequency domain resource corresponding to a 242+484-tone RU, which are respectively the first to the fourth 80 MHz frequency band in the 320 MHz channel bandwidth. In response to the absolute location of the frequency domain resource corresponding to the 242+484-tone RU being any one of the first to the fourth 80 MHz frequency band in the 320 MHz channel bandwidth, a corresponding quantity of users are any value of 1 to 8. In other words, that the absolute location of the frequency domain resource corresponding to the 242+484-tone RU is each of the first to fourth 80 MHz frequency band of the 320 MHz channel bandwidth corresponds to eight user quantities. The resource unit allocation subfield indicates, by using 4×8=32 entries in the remaining entries, the absolute location of the frequency domain resource corresponding to the 242+484-tone RU in the channel bandwidth and an MU-MIMO user quantity corresponding to the 242+484-tone RU.

There are eight possible absolute locations of a frequency domain resource corresponding to a 484+996-tone RU in the channel bandwidth, which are respectively the first 160 MHz frequency band and the second 160 MHz frequency band in the 320 MHz channel bandwidth. That the absolute location of the frequency domain resource corresponding to the 484+996-tone RU in the channel bandwidth is the first 160 MHz frequency band or the second 160 MHz frequency band in the 320 MHz channel bandwidth corresponds to eight user quantities. The resource unit allocation subfield indicates, by using 2×8=16 entries in the remaining entries, the absolute location of the frequency domain resource corresponding to the 484+996-tone RU in the channel bandwidth and an MU-MIMO user quantity corresponding to the 484+996-tone RU.

In some embodiments, for another RU or multi-RU with more than 242 subcarriers, the resource unit allocation subfield is configured to use a remaining entry to indicate an absolute location of a frequency domain resource in the channel bandwidth. Examples are not described herein one by one.

To further reduce overheads of a signaling field of a PPDU in an OFDMA scenario, some embodiments further provides a solution for simplifying a resource unit allocation subfield in a signaling field, to reduce a quantity of resource unit allocation subfields in the signaling field, so as to reduce overheads of the signaling field. In this solution, the resource unit allocation subfield of the signaling field includes a resource unit allocation subfield indicating RU allocation to a STA parking on a current frequency segment, and does not include a resource unit allocation subfield indicating RU allocation to a STA not parking on the current frequency segment. The signaling field further includes a resource unit allocation subfield indication field, and the resource unit allocation subfield indication field indicates whether a corresponding resource unit allocation subfield exists in the signaling field for a frequency domain resource at each granularity of a channel bandwidth for transmitting a PPDU. In other words, the resource unit allocation subfield indication field indicates a frequency domain resource corresponding to each resource unit allocation subfield in the signaling field. A frequency domain resource at each granularity is a frequency domain resource corresponding to a resource unit allocation subfield.

In some embodiments, in this embodiment, the solution for simplifying the resource unit allocation subfield in the signaling field is implemented separately, or is implemented in combination with any one of the foregoing manners of signaling field setting.

The resource unit allocation subfield indication field in this embodiment performs indication by using a bitmap. A length of the bitmap is a multiple of a channel bandwidth for transmitting a PPDU relative to a frequency domain resource of one granularity. Each bitmap corresponds to a frequency domain resource of one granularity. In the bitmap, a value of each bit indicates whether the signaling field includes a resource unit allocation subfield indicating a frequency domain resource corresponding to the bit.

For example, the channel bandwidth for transmitting the PPDU is 320 MHz, and a granularity of each resource unit allocation subfield is 20 MHz. In this case, resource allocation of the channel bandwidth is sequentially indicated by 16 resource unit allocation subfields (resource unit allocation subfields 1 to 16) in an ascending order of frequencies. Frequency domain resources indicated by the resource unit allocation subfields 1, 3, 4, 7, and 9 are allocated to STAs parking on the first frequency segment. A frequency domain resource indicated by the resource unit allocation subfield 1 is allocated to a STA1 corresponding to a user field 1, a STA2 corresponding to a user field 2, and a STA3 corresponding to a user field 3. A frequency domain resource indicated by the resource unit allocation subfield 3 is allocated to a STA4 corresponding to a user field 4 and a STA5 corresponding to a user field 5. A frequency domain resource indicated by the resource unit allocation subfield 4 is allocated to a STA6 corresponding to a user field 6. A frequency domain resource indicated by the resource unit allocation subfield 7 is allocated to a STAT corresponding to a user field 7. A frequency domain resource indicated by the resource unit allocation subfield 9 is allocated to the STA 9 corresponding to a user field 8.

Figure 20A:
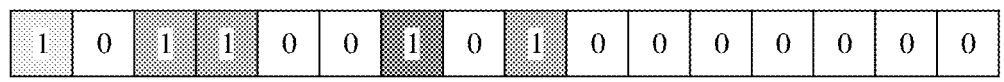
FIG. 20A is a schematic diagram depicting a structure of a resource unit allocation subfield indication field according to some embodiments.
Figure 20B:
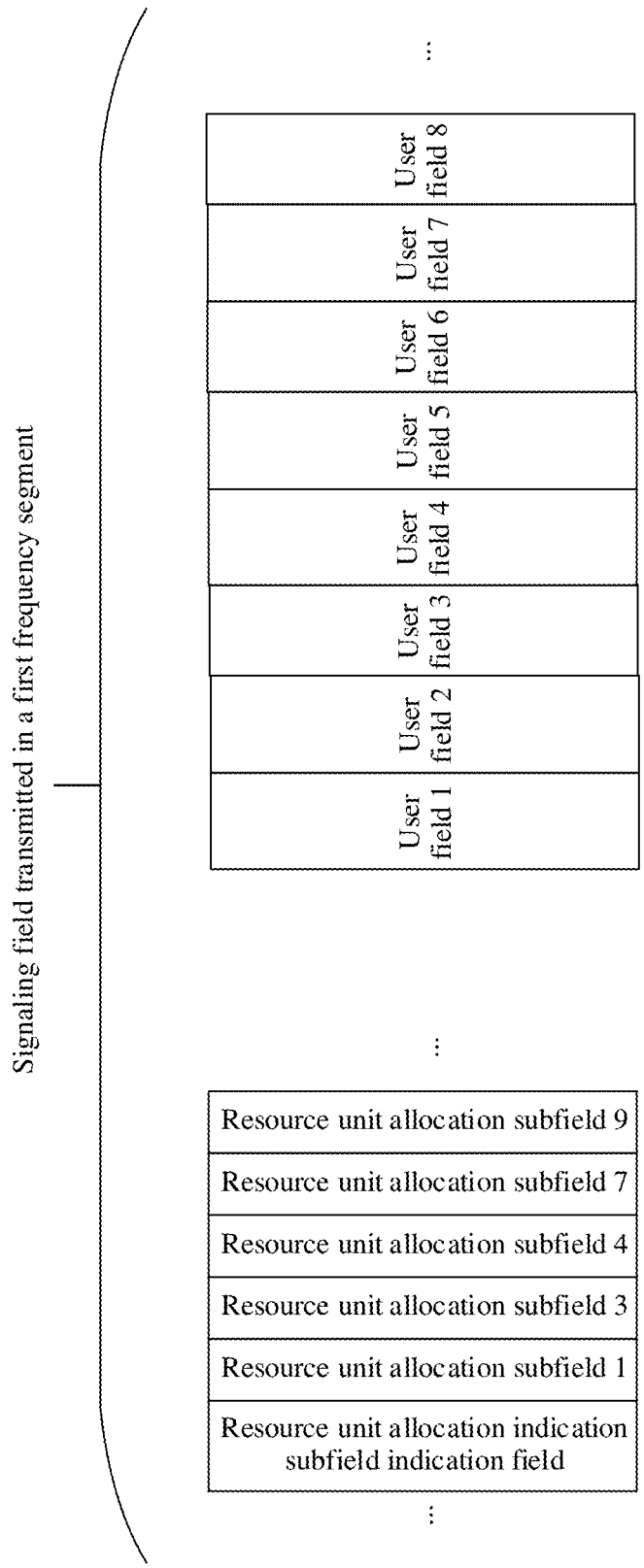
FIG. 20B is a schematic diagram depicting a structure of a signaling field according to some embodiments.

In this case, the resource unit allocation subfield indication field included in the signaling field transmitted on the first frequency segment is a 16-bit bitmap. FIG. 20A is a schematic diagram depicting a structure of a resource unit allocation subfield indication field according to some embodiments. As shown in FIG. 20A, in response to "1" being used to indicate that a frequency domain resource of one granularity includes corresponding resource unit allocation subfields, the bitmap is "1011001010000000". As shown in FIG. 20B, FIG. 20B is a schematic diagram depicting a structure of the signaling field according to some embodiments. The resource unit allocation subfield in the signaling field transmitted on the first frequency segment further includes the resource unit allocation subfields 1, 3, 4, 7, and 9 corresponding to the first, third, fourth, seventh, and ninth 20 MHz frequency band, but does not include resource unit allocation subfields corresponding to the second, fifth, sixth, eighth, tenth, eleventh, twelfth, thirteenth, fourteenth, fifteenth, and sixteenth 20 MHz frequency band. In addition, user fields in the signaling field transmitted on the first frequency segment further includes the user fields 1 to 8 corresponding to frequency domain resources of the first, third, fourth, seventh, and ninth 20 MHz frequency band.

Further, the resource unit allocation subfields in the signaling field is divided into two parts, and the two parts are respectively transmitted on two CCs (a CC1 and a CC2). In a possible implementation, resource unit allocation subfields in the signaling field transmitted on the first frequency segment includes a plurality of resource unit allocation subfields that indicate allocation to STAs parking on the frequency segment. The plurality of resource unit allocation subfields are arranged in an ascending order of frequencies, and each two adjacent resource unit allocation subfield in the plurality of resource unit allocation subfields are respectively set on the CC1 and the CC2. Alternatively, a resource unit allocation subfield with an odd number is transmitted on the CC1, and a resource unit allocation subfield with an even number is transmitted on the CC2. Similarly, a user field transmitted on each CC further includes a user field corresponding to a resource unit allocation subfield transmitted on the CC.

For example, as shown in FIG. 20C, FIG. 20C is schematic diagram depicting another structure of a signaling field according to some embodiments. Based on the example in FIG. 20A, the five resource unit allocation subfields in the signaling field are respectively the resource unit allocation subfields 1, 3, 4, 7, and 9 corresponding to the first, third, fourth, seventh, and ninth 20 MHz frequency bands.

A resource unit allocation subfield indication field transmitted on the CC1 is 1001000010000000, and the first, third, and fifth resource unit allocation subfields (resource unit allocation subfields 1, 4, and 9 corresponding to the first, fourth, and ninth 20 MHz frequency bands) in the five resource unit allocation subfields are transmitted on the CC1. The user fields 1 to 3 corresponding to the resource unit allocation subfield 1, the user field 6 corresponding to the resource unit allocation subfield 4, and the user field 8 corresponding to the resource unit allocation subfield 9 are transmitted on the CC1.

A resource unit allocation subfield indication field transmitted on the CCs is 0010001000000000. The second and the fourth resource unit allocation subfields (resource unit allocation subfields 3 and 7 corresponding to the third and the seventh 20 MHz frequency bands) in the five resource unit allocation subfields are transmitted on the CC2. The user fields 4 and 5 corresponding to the resource unit allocation subfield 2 and the user field 7 corresponding to the resource unit allocation subfield 4 are transmitted on the CC2.

In some embodiments, a quantity of resource unit allocation subfields and a quantity of user fields on each CC are reduced, so that overheads of the signaling field is reduced.

Further, the resource unit allocation subfield allocated to each CC is adjusted, so that an absolute value of a difference between quantities of resource unit allocation subfields on the two CCs is the smallest; or the resource unit allocation subfield allocated to each CC is adjusted, so that an absolute value of a difference between quantities of user fields on the two CCs is the smallest.

For example, refer to FIG. 20D. FIG. 20D is schematic diagram depicting still another structure of a signaling field according to some embodiments. Based on the example in FIG. 20C, the resource unit allocation subfield 9 is adjusted and transmitted on the CC2. The user field 8 is further transmitted on the CC2. In this case, a resource unit allocation subfield indication field of the CC1 is 1001000000000000, and a resource unit allocation subfield of the CC2 is 0010001010000000. In some embodiments, an absolute value of a difference between quantities of resource unit allocation subfields of the two CCs is 1, and a difference between quantities of user fields of the two CCs is 0. Therefore, quantities of resource allocation subfields and quantities of user fields that are transmitted on the two CCs is more balanced.

Some embodiments provide a solution for simplifying a user field in a signaling field by simplifying RU allocation indication. In this solution, a frequency domain resource corresponding to a multi-RU or an RU belongs to a plurality of frequency segments (a cross-segment multi-RU or RU). In response to the frequency domain resource not being allocated to a STA parking on one of the frequency segments, in a signaling field transmitted on the frequency segment, a resource unit allocation subfield indicating RU allocation of the frequency domain resource corresponding to the multi-RU is unable to indicate an RU of the frequency domain resource based on a situation.

For example, a highest frequency 20 MHz frequency band of a first frequency segment and a lowest frequency 40 MHz frequency band of a second frequency segment correspond to a 242+484-tone RU, and the 242+484-tone RU is allocated to a station parking on the second frequency segment, and is not allocated to a station parking on the first frequency segment. In this case, a resource unit allocation subfield that is transmitted on the first frequency segment and that corresponds to the highest frequency 20 MHz frequency band of the first frequency segment is unable to indicate the 242+484-tone RU and a quantity of user fields corresponding to the 242+484-tone RU based on a situation, and the indication is performed in a simplified manner. For example, the resource unit allocation subfield corresponding to the highest frequency 20 MHz of the first frequency segment indicates that the 20 MHz frequency band corresponds to a 242-tone RU, and indicate that a quantity of user fields corresponding to the 242-tone RU is 0. In some embodiments, a user field corresponding to the multi-RU not parking on the frequency segment is omitted.

For another example, an 80 MHz frequency band of a first frequency segment and an 80 MHz frequency band of a second frequency segment correspond to a 2×996-tone RU, the 2×996-tone RU is allocated to a station parking on the second frequency segment, and is not allocated to a station parking on the first frequency segment. In this case, a resource unit allocation subfield that is transmitted on the first frequency segment and that corresponds to the 80 MHz frequency band of the first frequency segment is unable to indicate the 2×996-tone RU and a quantity of user fields corresponding to the 2×996-tone RU based on a situation, and the indication is performed in a simplified manner. For example, the resource unit allocation subfield that is transmitted on the first frequency segment and that corresponds to the 80 MHz frequency band of the first frequency segment indicates that the 80 MHz frequency band corresponds to a 996-tone RU, and indicate that a quantity of user fields corresponding to the 996-tone RU is 0. In some embodiments, a user field corresponding to the multi-RU not parking on the frequency segment is omitted.

Figure 21:
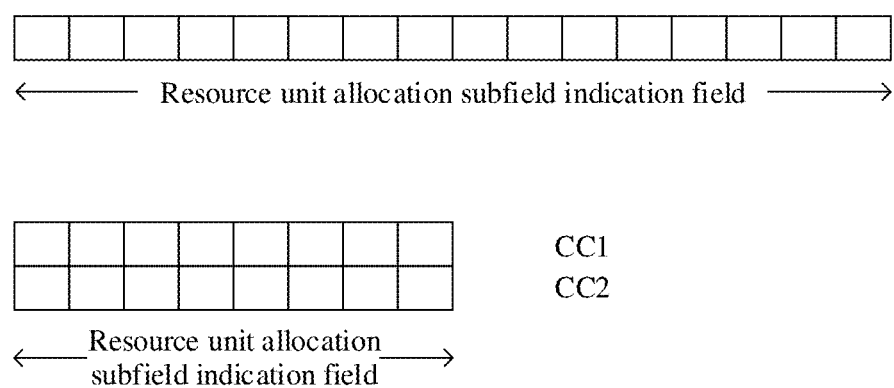
FIG. 21 is schematic diagram depicting another structure of a resource unit allocation subfield indication field according to some embodiments.

FIG. 21 is schematic diagram depicting another structure of a resource unit allocation subfield indication field according to some embodiments. As shown in FIG. 21, the resource unit allocation subfield indication field further is divided into two parts, and the two parts are respectively transmitted on a CC1 and a CC2. In some embodiments, a length of a resource unit allocation subfield indication field transmitted on each CC is shortened, so as to reduce overheads of a signaling field. The resource unit allocation subfield indication field transmitted on each CC indicates a frequency domain resource corresponding to a resource unit allocation subfield transmitted on the CC.

In a possible implementation, a part of a resource unit allocation subfield indication field transmitted on the CC1 indicates that in a channel bandwidth for transmitting a PPDU, whether a resource unit allocation subfield corresponding to each frequency domain resource with an odd sequence number and at one granularity is included in a signaling field, and another part of the resource unit allocation subfield indication field transmitted on the CC2 indicates whether a resource unit allocation subfield corresponding to each frequency domain resource with an even sequence number and at a unit granularity is included in the signaling field. A frequency domain resource at one granularity means that one resource unit allocation subfield indicates an RU corresponding to a frequency domain resource of one granularity.

For example, the channel bandwidth for transmitting the PPDU is 320 MHz, and a granularity of each resource unit allocation subfield is 20 MHz. A part of the resource unit allocation subfield indication field is transmitted on the CC1, indicating whether resource unit allocation subfields corresponding to first, third, fifth, seventh, ninth, eleventh, and fifteenth 20 MHz frequency bands are included in the signaling field. A part of the resource unit allocation subfield indication field is transmitted on the CC2, indicating whether resource unit allocation subfields corresponding to the second, fourth, sixth, eighth, tenth, twelfth, fourteenth, and sixteenth 20 MHz frequency bands are included in the signaling field. With reference to the example in FIG. 20A, a part of the resource unit allocation subfield indication field is transmitted on the CC1, and another part of the resource unit allocation subfield indication field is transmitted on the CC2. In this case, the part of the resource unit allocation subfield indication field transmitted on the CC1 is 11011000, indicating that resource unit allocation subfields corresponding to the first, third, seventh, and ninth 20 MHz frequency bands are included in the signaling field. The part of the resource unit allocation subfield indication field transmitted on the CC2 is 01000000, indicating that a resource unit allocation subfield corresponding to the fourth 20 MHz frequency band is included in the signaling field.

In another possible implementation, a part of a resource unit allocation subfield indication field transmitted on the CC1 indicates that in a channel bandwidth for transmitting a PPDU, whether resource unit allocation subfields corresponding to the first half of frequency domain resources in an ascending order of frequencies are included in a signaling field; and a part of the resource unit allocation subfield indication field transmitted on the CC2 indicates whether resource unit allocation subfields corresponding to the second half of the frequency domain resources are included in the signaling field.

For example, the channel bandwidth for transmitting the PPDU is 320 MHz, and a unit granularity of each resource unit allocation subfield is 20 MHz. A part of the resource unit allocation subfield indication field is transmitted on the CC1, indicating whether resource unit allocation subfields corresponding to the first to eighth 20 MHz frequency bands are included in the signaling field. A part of the resource unit allocation subfield indication field is transmitted on the CC2, indicating whether resource unit allocation subfields corresponding to the ninth to sixteenth 20 MHz frequency bands are included in the signaling field. With reference to the example in 15A, the part of the resource unit allocation subfield indication field transmitted on the CC1 is 10110010, indicating that resource unit allocation subfields corresponding to the first, third, fourth, and seventh 20 MHz frequency bands are included in the signaling field; and the part of the resource unit allocation subfield indication field transmitted on the CC2 is 10000000, indicating that a resource unit allocation subfield corresponding to the ninth 20 MHz frequency bands is included in the signaling field.

In some embodiments compared with transmitting a complete resource unit allocation subfield indication field on one CC, in the solution of some embodiments, overheads for transmitting a resource unit allocation subfield indication field on each CC is halved, reducing overheads of a signaling field.

The following provides several optional embodiments of the resource unit allocation subfield indication field. The following several optional embodiments are implemented independently, or is implemented in combination with the foregoing embodiments in a proper case.

Figure 22:
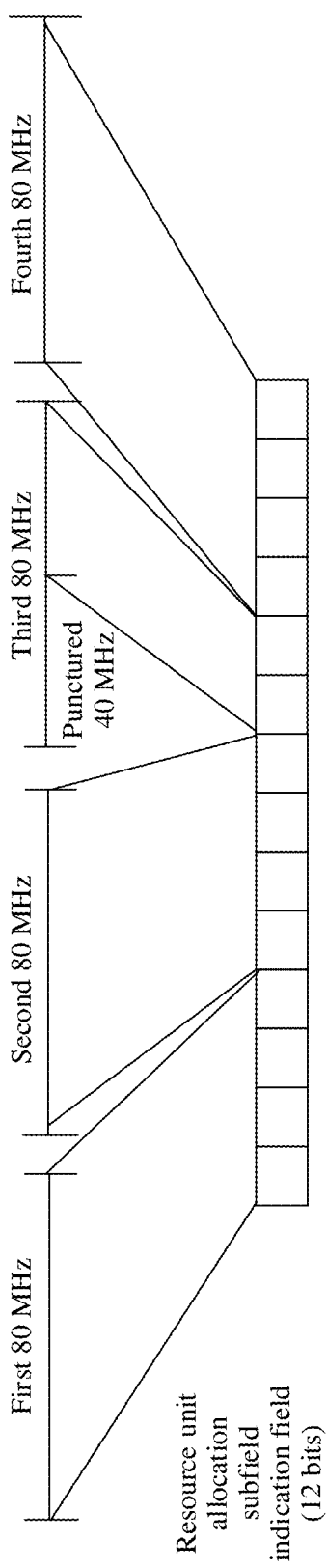
FIG. 22 is schematic diagram depicting still another structure of a resource unit allocation subfield indication field according to some embodiments.

In an optional embodiment, a resource unit allocation subfield indication field is unable to indicate a resource unit allocation subfield corresponding to a punctured frequency domain resource. In some embodiments, a length of the resource unit allocation subfield indication field is shortened. A field indicating preamble puncturing is indicated in a signaling field. FIG. 22 is schematic diagram depicting still another structure of a resource unit allocation subfield indication field according to some embodiments. As shown in FIG. 22, a third 80 MHz frequency band in a channel bandwidth 320 MHz for transmitting a PPDU is punctured, and a resource unit allocation subfield indication field does not indicate a resource unit allocation subfield corresponding to the 80 MHz frequency band. In some embodiments, the resource unit allocation subfield indication field is 12 bits, indicating resource unit allocation subfields corresponding to the first to the eighth 20 MHz frequency bands in the 320 MHz channel bandwidth and resource unit allocation subfields corresponding to the thirteenth to the sixteenth 20 MHz frequency bands.

In another optional embodiment, for a multi-RU with more than 242 subcarriers, one resource unit allocation subfield is used for indication. In some embodiments, a quantity of resource unit allocation subfields is reduced.

Figure 23:
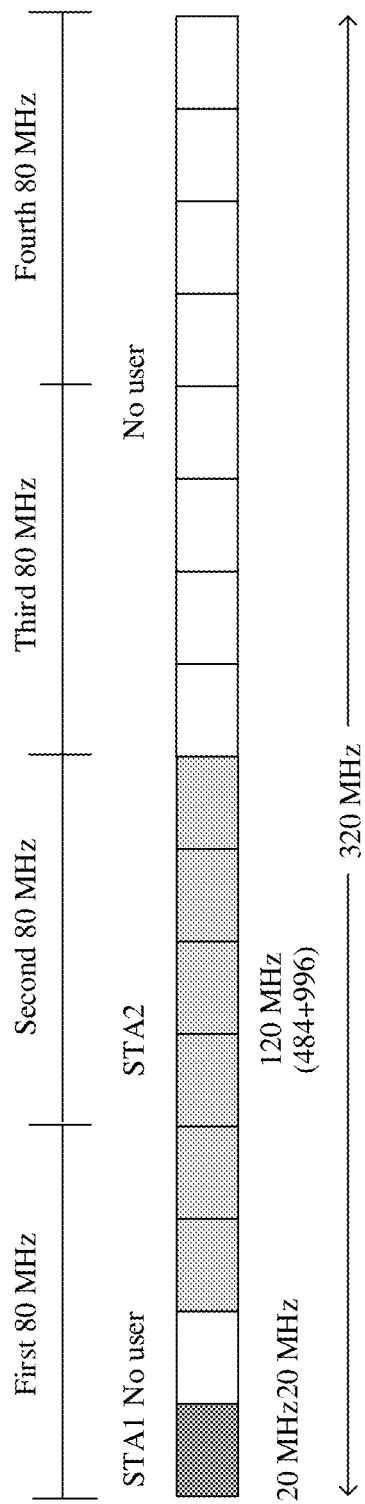
FIG. 23 is a schematic diagram of a scenario of resource unit allocation according to some embodiments.

FIG. 23 is a schematic diagram of a scenario of resource unit allocation according to some embodiments. For example, as shown in FIG. 23, in a first 80 MHz frequency band, an RU corresponding to the first 80 MHz frequency band and a lowest frequency 40 MHz frequency band of a second 80 MHz frequency band is a 484+996-tone RU. Other frequency domain resources in a 320 MHz channel bandwidth for transmitting a PPDU are not allocated to a STA parking on a first frequency segment. In this case, a resource unit allocation subfield indication field in a signaling field transmitted on the first frequency segment is 1000000000000000.

Further, in response to the resource unit allocation subfield indication field being transmitted on two CCs, two resource unit allocation subfields alternatively is used to indicate one multi-RU, and the two resource unit allocation subfields are respectively transmitted on the two CCs. In some embodiments, load of the two CCs is more balanced. Based on the foregoing example, the resource unit allocation subfield indication field in the signaling field transmitted on the first frequency segment is 1100000000000000. An odd-numbered bit of the resource unit allocation subfield indication field is transmitted on the CC1, and an even-numbered bit of the resource unit allocation subfield indication field is transmitted on the CC2. A resource unit allocation subfield corresponding to an odd-numbered bit in the resource unit allocation subfield indication field and a user field corresponding to the resource unit allocation subfield are transmitted on the CC1, and a resource unit allocation subfield corresponding to an even-numbered bit in the resource unit allocation subfield indication field and a user field corresponding to the resource unit allocation subfield are transmitted on the CC2. In some embodiments, a plurality of user fields corresponding to one multi-RU is divided into two parts for transmission on the CC1 and the CC2, so that load of the two CCs is more balanced.

In still another optional embodiment, a resource unit allocation subfield indication field included in a signaling field transmitted on each frequency segment indicates a resource unit allocation subfield corresponding to the frequency segment. For example, in response to each frequency segment being an 80 MHz frequency band, the resource unit allocation subfield indication field includes 4 bits, and indicates four resource unit allocation subfields corresponding to the 80 MHz frequency band. In some embodiments, a length of a resource unit allocation subfield indication field is reduced, so as to reduce overheads of a signaling field.

In some embodiments, such a solution is not limited to allocating a frequency domain resource of a current frequency segment to a STA parking on the current frequency segment. The resource unit allocation subfield indicates cross-segment resource allocation by indicating a multi-RU.

For example, based on the example shown in FIG. 23, a lowest frequency 20 MHz frequency band of the first 80 MHz frequency band is allocated to a STA1 parking on the first frequency segment, and a highest frequency 40 MHz frequency band of the first 80 MHz frequency band and the second 80 MHz frequency band are allocated to a STA2 parking on the first frequency segment. In this case, the resource unit allocation subfield indication field transmitted on the frequency segment is 1010, where 1 in the first bit corresponds to the lowest frequency 20 MHz frequency band of the first 80 MHz frequency band, and a resource unit allocation subfield corresponding to the 20 MHz frequency band indicates that an RU corresponding to the 20 MHz frequency band is allocated to the STA1. 1 in the third bit corresponds to the third 20 MHz frequency band of the first 80 MHz frequency band in an ascending order of frequencies, and a resource unit allocation subfield corresponding to the 20 MHz frequency band indicates that the 20 MHz frequency band belongs to the 484+996-tone RU, and the 484+996-tone RU is allocated to the STA2. In some embodiments, a frequency domain resource of another frequency segment is allocated to a STA parking on the current frequency segment.

In a non-OFDMA scenario, in response to a signaling field not including a resource unit allocation subfield, a resource unit allocation subfield indication field is unable to be set in the signaling field. Alternatively, a signaling field includes a resource unit allocation subfield indication field, and the resource unit allocation subfield indication field indicates that a channel bandwidth for transmitting a PPDU is punctured. For example, in response to the resource unit allocation subfield indication field being a bitmap, each bit of the bitmap indicates that a frequency domain resource at one unit granularity is punctured.

Some embodiments describe the method provided in some embodiments from perspectives of the access point and the station. To implement functions in the method provided in some embodiments, the access point and the station includes a hardware structure and a software module, and implement the functions in a form of the hardware structure, the software module, or a combination of the hardware structure and the software module. A function in the foregoing functions are performed in a form of the hardware structure, the software module, or a combination of the hardware structure and the software module.

Figure 24:
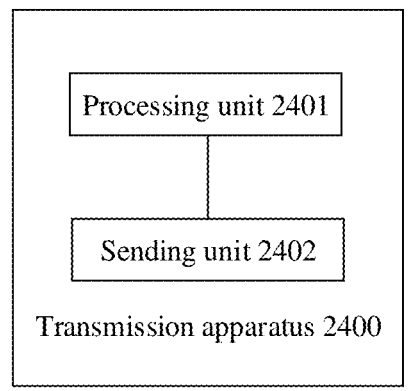
FIG. 24 is a schematic diagram of modules of a data transmission apparatus according to some embodiments.

Refer to FIG. 24. FIG. 24 is a schematic diagram depicting a structure of a data transmission apparatus according to some embodiments. Some embodiments provide a data transmission apparatus 2400, including:

a processing unit 2401, configured to generate a signaling field of a physical layer protocol data unit PPDU, where a channel bandwidth for transmitting the PPDU includes at least two frequency segments, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment;

the signaling field includes a common field and a user-specific field, the user-specific field includes a user field corresponding to the RU, and the user field corresponding to the RU is a user field of the station that is of the plurality of stations and that parks on the first frequency segment; and the common field includes a resource unit allocation subfield corresponding to the RU, indicating the RU and a quantity of user fields corresponding to the RU; and a sending unit 2402, configured to send the signaling field on the first frequency segment.

The data transmission apparatus 2400 is, for example, a communication apparatus or an access point. Alternatively, the data transmission apparatus is deployed in a communication apparatus or an access point. The processing unit 2401 of the data transmission apparatus 2400 is a processor, and the sending unit 2402 of the data transmission apparatus 2400 is a transceiver. The data transmission apparatus is used, for example, in an OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, a quantity that is of user fields corresponding to the RU and that is indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an RU for MU-MIMO transmission.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a station identifier indication field and a spatial stream allocation indication field. The station identifier indication field indicates a station identifier corresponding to the user field, the spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the RU for MU-MIMO transmission is allocated, that is, determine a sequence number of the station among the stations to which the RU for MU-MIMO transmission is allocated. In some embodiments, an allocated spatial stream is determined based on an index that indicates a spatial stream and that is included in the user field.

In some embodiments, the common field includes one or more resource unit allocation subfields, and at least one RU indicated by any resource unit allocation subfield is allocated to the station parking on the first frequency segment. In some embodiments, the resource unit allocation subfield of the signaling field includes a resource unit allocation subfield indicating RU allocation to a station parking on the first frequency segment, and does not include a resource unit allocation subfield indicating RU allocation to a station not parking on the first frequency segment. In some embodiments, a quantity of resource unit allocation subfields in the signaling field is reduced, reducing overheads of the signaling field.

Figure 25:
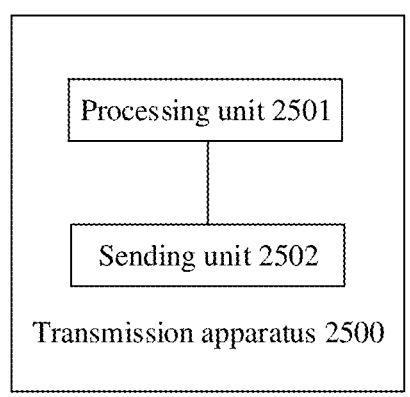
FIG. 25 is a schematic diagram of modules of a data transmission apparatus according to some embodiments.

Refer to FIG. 25. FIG. 25 is a schematic diagram depicting a structure of a data transmission apparatus according to some embodiments. The data transmission apparatus 2500 in some embodiments includes:

a processing unit 2501, configured to generate a signaling field of a physical layer protocol data unit PPDU, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; and the signaling field includes a user field of the station that is of the plurality of stations and that parks on the first frequency segment, and a field indicating an MU-MIMO user quantity, where the field indicating the MU-MIMO user quantity indicates a quantity of user fields of stations that are of the plurality of stations and that park on the first frequency segment; and a sending unit 2502, configured to send the signaling field on the first frequency segment.

The data transmission apparatus 2500 is, for example, a communication apparatus or an access point. Alternatively, the data transmission apparatus 2500 is deployed in a communication apparatus or an access point. The processing unit 2501 of the data transmission apparatus 2500 is a processor, and the sending unit 2502 of the data transmission apparatus 2500 is a transceiver. The data transmission apparatus is used, for example, in a non-OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the MU-MIMO user quantity indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an MU-MIMO frequency domain resource for MU-MIMO transmission.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In some embodiments, the signaling field includes a common field and a user-specific field. The user-specific field includes the user field, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations.

The common field includes the field indicating the MU-MIMO user quantity, a total MU-MIMO user quantity indication field, and a field indicating a start location. The total MU-MIMO user quantity indication field indicates a quantity of the plurality of stations, and the field indicating the start location indicates a start location, in the station sequence, of the station parking on the first frequency segment.

In some embodiments, the user field includes a user field of a station parking on the frequency segment, and a station receiving the PPDU further determines, according to the total MU-MIMO user quantity indication field, the field indicating the MU-MIMO user quantity, and the subfield indicating the start location in the common field, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field. In addition, compared with indicating, in each user field, a location of a station corresponding to the user field in the station sequence, indicating, in the common field, the location of the station corresponding to the user field in the station sequence reduces overheads of the signaling field.

Figure 26:
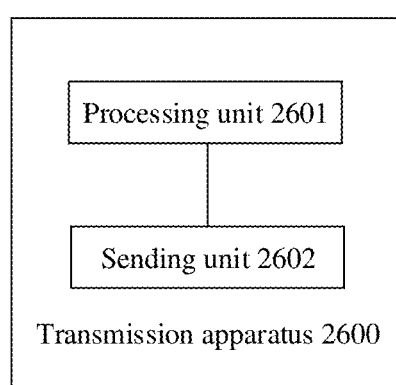
FIG. 26 is a schematic diagram of modules of a data transmission apparatus according to some embodiments.

Refer to FIG. 26. FIG. 26 is a schematic diagram depicting a structure of a data transmission apparatus according to some embodiments. The data transmission apparatus 2600 in some embodiments includes:

a processing unit 2601, configured to generate a signaling field of a PPDU, where a channel bandwidth for transmitting the PPDU includes at least two frequency segments, the at least two frequency segments include a first frequency segment, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment; the signaling field includes a common field and a user-specific field, and the common field includes a resource unit allocation subfield corresponding to the RU, indicating the RU and a quantity of user fields corresponding to the RU; the user-specific field includes the user fields corresponding to the RU, and the user fields corresponding to the RU are user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and a sending unit 2602, configured to send the signaling field on the first frequency segment.

The data transmission apparatus 2600 is, for example, a communication apparatus or an access point. Alternatively, the data transmission apparatus 2600 is deployed in a communication apparatus or an access point. The processing unit 2601 of the data transmission apparatus 2600 is a processor, and the sending unit 2602 of the data transmission apparatus 2600 is a transceiver. The data transmission apparatus is used, for example, in an OFDMA scenario.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the user field of the STA not parking on the frequency segment is padded with a null user field. In some embodiments, the sequence location of the user field corresponding to the STA that participates in MU-MIMO transmission and that parks on the frequency segment does not change in user fields corresponding to stations receiving the PPDU, so that a signaling field transmitted on each frequency segment accurately indicates a user field corresponding to an RU for MU-MIMO transmission.

Figure 27:
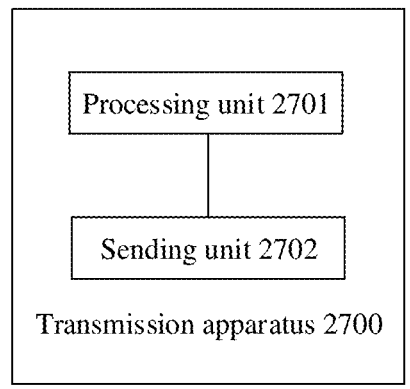
FIG. 27 is a schematic diagram of modules of a data transmission apparatus according to some embodiments.

Refer to FIG. 27. FIG. 27 is a schematic diagram depicting a structure of a data transmission apparatus according to some embodiments. The data transmission apparatus 2700 in some embodiments includes:

a processing unit 2701, configured to generate a signaling field of a physical layer protocol data unit PPDU, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; the signaling field includes user fields of the plurality of stations and a field indicating an MU-MIMO user quantity, where the field indicating the MU-MIMO user quantity indicates a quantity of user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and a sending unit 2702, configured to send the signaling field on the first frequency segment.

The data transmission apparatus 2700 is, for example, a communication apparatus or an access point. Alternatively, the data transmission apparatus 2700 is deployed in a communication apparatus or an access point. The data transmission apparatus is used, for example, in an OFDMA scenario. The processing unit 2701 of the data transmission apparatus 2700 is a processor, and the receiving unit 2702 of the data transmission apparatus 2700 is a transceiver. The method is applied, for example, in a non-OFDMA scenario.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the user field of the STA not parking on the frequency segment is padded with a null user field. In some embodiments, the sequence location of the user field of the STA that participates in MU-MIMO transmission and that parks on the frequency segment does not change in user fields corresponding to stations receiving the PPDU, so that a signaling field transmitted on each frequency segment accurately indicates a user field corresponding to a frequency domain resource for MU-MIMO transmission.

Figure 28:
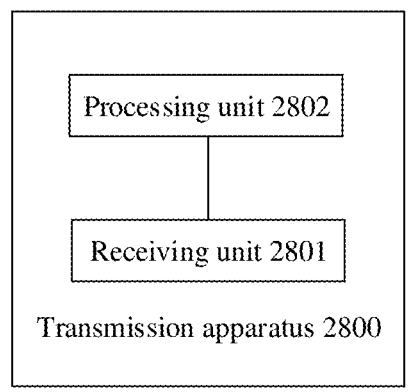
FIG. 28 is a schematic diagram of modules of a data transmission apparatus according to some embodiments.

Refer to FIG. 28. FIG. 28 is a schematic diagram depicting a structure of a data transmission apparatus according to some embodiments. The data transmission apparatus 2800 in some embodiments includes:

a receiving unit 2801, configured to receive a signaling field of a physical layer protocol data unit PPDU on a first frequency segment, where a channel bandwidth for transmitting the PPDU includes at least two frequency segments, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment; the signaling field includes a common field and a user-specific field, the user-specific field includes a user field corresponding to the RU, and the user field corresponding to the RU is a user field of the station that is of the plurality of stations and that parks on the first frequency segment; and the common field includes a resource unit allocation subfield corresponding to the RU, indicating the RU and a quantity of user fields corresponding to the RU; and a processing unit 2802, configured to obtain, from the signaling field, a user field carrying an identifier of a current station, and obtain data transmitted on an RU corresponding to the user field carrying the identifier of the current station.

The data transmission apparatus 2800 is, for example, a communication apparatus or a station. Alternatively, the data transmission apparatus 2800 is deployed in a communication apparatus or a station. The processing unit 2802 of the data transmission apparatus 2800 is a processor, and the receiving unit 2801 of the data transmission apparatus 2800 is a transceiver. The data transmission apparatus is used, for example, in an OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, a quantity that is of user fields corresponding to the RU and that is indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an RU for MU-MIMO transmission. A station determines an RU allocated to the station based on a sequence location of a user field including a station identifier of the station in a plurality of user fields.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a station identifier indication field and a spatial stream allocation indication field. The station identifier indication field indicates a station identifier corresponding to the user field, the spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the RU for MU-MIMO transmission is allocated, that is, determine a sequence number of the station among the stations to which the RU for MU-MIMO transmission is allocated. In some embodiments, an allocated spatial stream is determined based on an index that indicates a spatial stream and that is included in the user field.

In some embodiments, the common field includes one or more resource unit allocation subfields, and at least one RU indicated by any resource unit allocation subfield is allocated to the station parking on the first frequency segment. In some embodiments, the resource unit allocation subfield of the signaling field includes a resource unit allocation subfield indicating RU allocation to a station parking on the first frequency segment, and does not include a resource unit allocation subfield indicating RU allocation to a station not parking on the first frequency segment. In some embodiments, a quantity of resource unit allocation subfields in the signaling field is reduced, reducing overheads of the signaling field.

Figure 29:
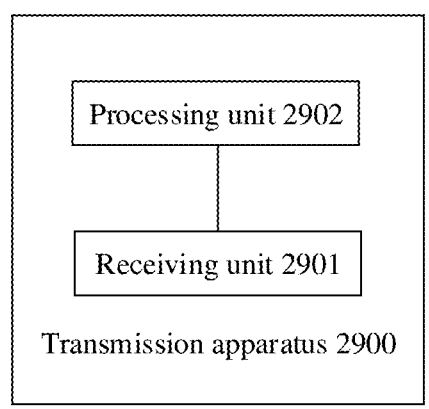
FIG. 29 is a schematic diagram of modules of a data transmission apparatus according to some embodiments.

Refer to FIG. 29. FIG. 29 is a schematic diagram depicting a structure of a data transmission apparatus according to some embodiments. The data transmission apparatus 2900 in some embodiments includes:

a receiving unit 2901, configured to receive a signaling field of a physical layer protocol data unit PPDU on a first frequency segment, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; and the signaling field includes a user field of the station that is of the plurality of stations and that parks on the first frequency segment, and a field indicating an MU-MIMO user quantity, where the field indicating the MU-MIMO user quantity indicates a quantity of user fields of stations that are of the plurality of stations and that park on the first frequency segment; and a processing unit 2902, configured to obtain, from the signaling field, a user field carrying an identifier of a current station, and obtain data transmitted on an RU corresponding to the user field carrying the identifier of the current station.

The data transmission apparatus 2900 is, for example, a communication apparatus or a station. Alternatively, the data transmission apparatus 2900 is deployed in a communication apparatus or a station. The processing unit 2902 of the data transmission apparatus 2900 is a processor, and the receiving unit 2901 of the data transmission apparatus 2900 is a transceiver. The data transmission apparatus is used, for example, in a non-OFDMA scenario.

In some embodiments, a user field in a signaling field transmitted on each frequency segment includes a user field corresponding to a STA that is of STAs participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the MU-MIMO user quantity indicated in the signaling field of the PPDU is a quantity of stations that participate in MU-MIMO transmission and that park on the frequency segment, instead of a total quantity of stations that participate in MU-MIMO transmission. In some embodiments, ensuring that a signaling field transmitted on each frequency segment accurately indicates a user field corresponding to an MU-MIMO frequency domain resource for MU-MIMO transmission.

In some embodiments, the user field includes a station identifier indication field and a spatial stream allocation indication field. The station identifier indication field indicates a station identifier corresponding to the user field. The spatial stream allocation indication field includes a starting spatial stream subfield and a number of spatial streams subfield. The starting spatial stream subfield indicates a first spatial stream allocated to a station corresponding to the station identifier, and the number of spatial streams subfield indicates a quantity of spatial streams allocated to the station corresponding to the station identifier. This manner of indicating spatial stream allocation is irrelevant to a quantity and an arrangement order of user fields. This manner helps accurately indicate a spatial stream allocated to a STA corresponding to each user field while reducing a quantity of user fields.

In some embodiments, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations. The signaling field further includes a special user field, where the special user field indicates a quantity of the plurality of stations and indicates a sequence location, in the station sequence, of the station that is of the plurality of stations and that parks on the first frequency segment. In some embodiments, a station determines, according to the special user field, a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In some embodiments, the signaling field includes a common field and a user-specific field. The user-specific field includes the user field, the user field includes a field indicating a station identifier of a station corresponding to the user field and a spatial stream allocation indication field. The spatial stream allocation indication field indicates a spatial stream allocated to each of the plurality of stations according to a station sequence corresponding to the spatial stream allocation, and the station sequence includes an arrangement order of the plurality of stations.

The common field includes the field indicating the MU-MIMO user quantity, a total MU-MIMO user quantity indication field, and a field indicating a start location. The total MU-MIMO user quantity indication field indicates a quantity of the plurality of stations, and the field indicating the start location indicates a start location, in the station sequence, of the station parking on the first frequency segment.

In some embodiments, the user field includes a user field of a station parking on the frequency segment, and a station receiving the PPDU further determines, according to the total MU-MIMO user quantity indication field, the field indicating the MU-MIMO user quantity, and the subfield indicating the start location in the common field, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field. In addition, compared with indicating, in each user field, a location of a station corresponding to the user field in the station sequence, indicating, in the common field, the location of the station corresponding to the user field in the station sequence reduces overheads of the signaling field.

Figure 30:
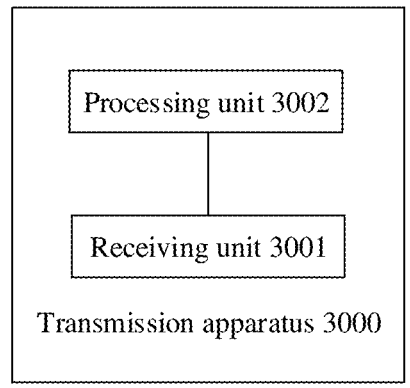
FIG. 30 is a schematic diagram of modules of a data transmission apparatus according to some embodiments.

Refer to FIG. 30. FIG. 30 is a schematic diagram depicting a structure of a data transmission apparatus according to some embodiments. The data transmission apparatus 3000 in some embodiments includes:

a receiving unit 3001, configured to receive a signaling field of a physical layer protocol data unit PPDU on a first frequency segment, where a channel bandwidth for transmitting the PPDU includes at least two frequency segments, the at least two frequency segments include a first frequency segment, the at least two frequency segments include a first frequency segment, the channel bandwidth includes an RU for multi-user multiple input multiple output MU-MIMO transmission, the RU is allocated to a plurality of stations, and the plurality of stations include a station parking on the first frequency segment and a station not parking on the first frequency segment; the signaling field includes a common field and a user-specific field, and the common field includes a resource unit allocation subfield corresponding to the RU, indicating the RU and a quantity of user fields corresponding to the RU; the user-specific field includes the user fields corresponding to the RU, and the user fields corresponding to the RU are user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and a processing unit 3002, configured to obtain, from the signaling field, a user field carrying an identifier of a current station, and obtain data transmitted on an RU corresponding to the user field carrying the identifier of the current station.

The data transmission apparatus 3000 is, for example, a communication apparatus or a station. Alternatively, the data transmission apparatus 3000 is deployed in a communication apparatus or a station. The data transmission apparatus is used, for example, in an OFDMA scenario. The processing unit 3002 of the data transmission apparatus 3000 is a processor, and the receiving unit 3001 of the data transmission apparatus 3000 is a transceiver.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment. In addition, the user field of the STA not parking on the frequency segment is padded with a null user field. In some embodiments, the sequence location of the user field corresponding to the STA that participates in MU-MIMO transmission and that parks on the frequency segment does not change in user fields corresponding to stations receiving the PPDU, so that a signaling field transmitted on each frequency segment accurately indicates a user field corresponding to an RU for MU-MIMO transmission. In some embodiments, a station determines an RU allocated to the station based on a sequence location of a user field including a station identifier of the station in a plurality of user fields.

Figure 31:
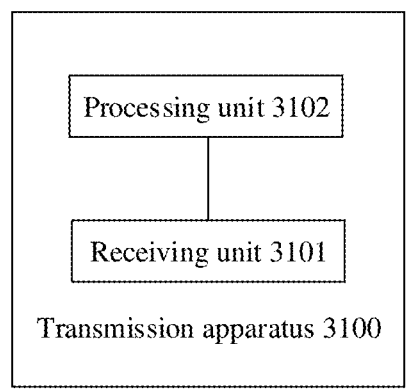
FIG. 31 is a schematic diagram of modules of a data transmission apparatus according to some embodiments.

Refer to FIG. 31. FIG. 31 is a schematic diagram depicting a structure of a data transmission apparatus according to some embodiments. The data transmission apparatus 3100 in some embodiments includes:

- a receiving unit 3101, configured to receive a signaling field of a physical layer protocol data unit PPDU on a first frequency segment, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment; the signaling field includes user fields of the plurality of stations and a field indicating an MU-MIMO user quantity, where the field indicating the MU-MIMO user quantity indicates a quantity of user fields of the plurality of stations; and in the plurality of user fields corresponding to the RU, a user field of the station that is of the plurality of stations and that parks on the first frequency segment includes a station identifier of the user field, and a user field of the station that is of the plurality of stations and that does not park on the first frequency segment is a null user field; and
- a processing unit 3102, configured to obtain, from the signaling field, a user field carrying an identifier of a current station, and obtain data transmitted on an RU corresponding to the user field carrying the identifier of the current station.

The data transmission apparatus 3100 is, for example, a communication apparatus or a station. Alternatively, the data transmission apparatus 3100 is deployed in a communication apparatus or a station. The data transmission apparatus is used, for example, in a non-OFDMA scenario.

In some embodiments, a user field in a signaling field transmitted on each frequency segment includes a user field corresponding to a STA that is of stations participating in MU-MIMO transmission and that parks on the frequency segment, and does not include a user field corresponding to a STA that is of the STAs participating in MU-MIMO transmission and that does not park on the frequency segment. This simplifies the user field in the signaling field transmitted on each frequency segment.

Figure 32:
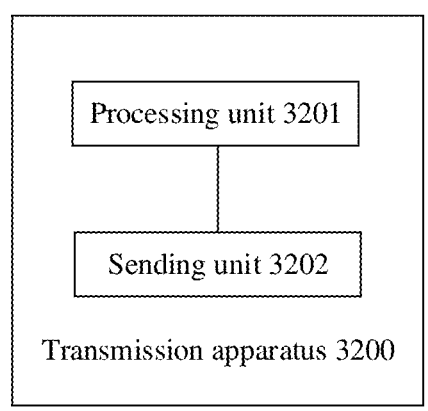
FIG. 32 is a schematic diagram of modules of a data transmission apparatus according to some embodiments.

Refer to FIG. 32. FIG. 32 is a schematic diagram depicting a structure of a data transmission apparatus according to some embodiments. The data transmission apparatus 3200 in some embodiments includes:

- a processing unit 3201, configured to generate a signaling field of a PPDU, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment;
- the signaling field includes a common field and a user-specific field, where the user-specific field includes a user field of the station parking on the first frequency segment, the user field includes a field indicating a station identifier of a station corresponding to the user field and a spatial stream allocation indication field, the spatial stream allocation indication field indicates a spatial stream allocated to each of the plurality of stations according to a station sequence corresponding to the spatial stream allocation, and the station sequence includes an arrangement order of the plurality of stations; and
- the common field includes a total MU-MIMO user quantity indication field and a bitmap, where the total MU-MIMO user quantity indication field indicates a quantity of the plurality of stations, and the bitmap indicates a start location, in the station sequence, of the station that is of the plurality of stations and that parks on the first frequency segment; and
- a sending unit 3202, configured to send the signaling field on the first frequency segment.

The data transmission apparatus 3200 is, for example, a communication apparatus or a station. Alternatively, the data transmission apparatus 3200 is deployed in a communication apparatus or a station. The data transmission apparatus 3200 is used, for example, in a non-OFDMA scenario.

In some embodiments, the user field includes a user field of a station parking on the frequency segment, and a station receiving the PPDU further determines, according to the total MU-MIMO user quantity indication field and the bitmap, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In addition, compared with indicating, in each user field, a location of a station corresponding to the user field in the station sequence, indicating, in the common field, the location of the station corresponding to the user field in the station sequence reduces overheads of the signaling field.

Figure 33:
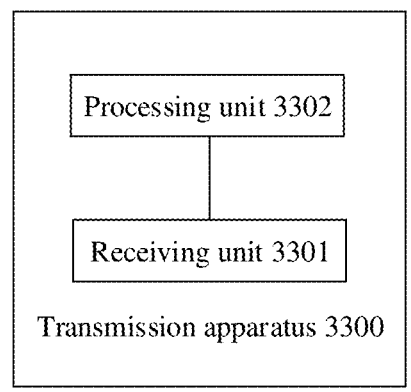
FIG. 33 is a schematic diagram of modules of a data transmission apparatus according to some embodiments.

Refer to FIG. 33. FIG. 33 is a schematic diagram depicting a structure of a data transmission apparatus according to some embodiments. The data transmission apparatus 3300 in some embodiments includes:

- a receiving unit 3301, configured to receive a signaling field of a PPDU on a first frequency segment, where a channel bandwidth for transmitting the PPDU includes at least two frequency segments, the at least two frequency segments include a first frequency segment, the channel bandwidth includes an MU-MIMO frequency domain resource for MU-MIMO transmission, the MU-MIMO frequency domain resource is allocated to a plurality of stations, and the plurality of stations include a station parking on the first frequency segment and a station not parking on the first frequency segment;
- the signaling field includes a common field and a user-specific field, where the user-specific field includes a user field of the station parking on the first frequency segment, the user field includes a field indicating a station identifier of a station corresponding to the user field and a spatial stream allocation indication field, the spatial stream allocation indication field indicates a spatial stream allocated to each of the plurality of stations according to a station sequence corresponding to the spatial stream allocation, and the station sequence includes an arrangement order of the plurality of stations; and the common field includes a total MU-MIMO user quantity indication field and a bitmap, where the total MU-MIMO user quantity indication field indicates a quantity of the plurality of stations, and the bitmap indicates a start location, in the station sequence, of the station that is of the plurality of stations and that parks on the first frequency segment; and a processing unit 3302, configured to obtain, from the signaling field, a user field carrying an identifier of a current station, and obtain data transmitted on an RU corresponding to the user field carrying the identifier of the current station.

The data transmission apparatus 3300 is, for example, a communication apparatus or a station. Alternatively, the data transmission apparatus 3300 is deployed in a communication apparatus or a station. The data transmission apparatus 3300 is used, for example, in a non-OFDMA scenario.

In some embodiments, the user field includes a user field of a station parking on the frequency segment, and a station receiving the PPDU further determines, according to the total MU-MIMO user quantity indication field and the bitmap, a location in the station sequence, of the station corresponding to the user field including a station identifier of the station, and determine a sequence location of the station in the plurality of stations to which the MU-MIMO frequency domain resource is allocated, that is, determine a sequence number of the station among the stations to which the MU-MIMO frequency domain resource is allocated. In some embodiments, an allocated spatial stream is determined based on an index that indicates a spatial stream and that is included in the user field.

In addition, compared with indicating, in each user field, a location of a station corresponding to the user field in the station sequence, indicating, in the common field, the location of the station corresponding to the user field in the station sequence reduces overheads of the signaling field.

For related content of the foregoing data transmission apparatus embodiments, refer to related content of the foregoing method embodiments. Details are not described herein again.

A person skilled in the art is able to further understand that various illustrative logical blocks (illustrative logic block) and steps (step) that are listed in some embodiments are implemented by using electronic hardware, computer software, or a combination thereof. Whether the functions are implemented by using hardware or software depends on particular applications and a design condition of the entire system. A person skilled in the art is configured to use various methods to implement the described functions for each particular application, but implementation beyond the scope of the embodiments is unconsidered.

Some embodiments provide a computer-readable storage medium. The computer-readable storage medium stores a computer program, and in response to the computer-readable storage medium being executed by a computer, a function of any one of the foregoing method embodiments is implemented.

Some embodiments provide a computer program product. In response to the computer program product being executed by a computer, functions of any one of the foregoing method embodiments are implemented.

All or a part of the foregoing embodiments are implemented by using software, hardware, firmware, or any combination thereof. In response to software being used to implement the embodiments, all or a part of the embodiments are implemented in a form of a computer program product. The computer program product includes one or more computer instructions. In response to the computer instructions being loaded and executed on the computer, the procedure or functions according to some embodiments are all or partially generated. The computer is a general-purpose computer, a dedicated computer, a computer network, or another programmable apparatus. The computer instructions are stored in a computer-readable storage medium or is transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

A person of ordinary skill in the art is able to understand that various numerals such as "first" and "second" in some embodiments are used for differentiation for ease of description, and are not used to limit the scope of some embodiments or represent a sequence.

The correspondences shown in the tables in some embodiments are configured, or is predetermined. Values of the information in the tables are examples, and other values are configured. This is not limited in some embodiments. In response to a correspondence between information and each parameter being configured, not all correspondences shown in the tables call to be configured. For example, in the tables in some embodiments, correspondences shown in some rows are alternatively unable to be configured. For another example, proper deformations and adjustments such as splitting and combination is performed based on the foregoing tables. Names of the parameters shown in titles of the foregoing tables alternatively is other names that is understood by a communication apparatus, and values or representation manners of the parameters alternatively is other values or representation manners that is understood by the communication apparatus. During implementation of the foregoing tables, another data structure, such as an array, a queue, a container, a stack, a linear table, a pointer, a linked list, a tree, a graph, a structure, a class, a pile, or a hash table, alternatively is used.

"Predetermine" in some embodiments are understood as "described", "predetermine", "store", "pre-store", "pre-negotiate", "pre-configure", "build into", or "pre-burn".

A person of ordinary skill in the art is aware that, in combination with the units and algorithm steps in the examples described in the embodiments disclosed is implemented by electronic hardware or a combination of computer software and electronic hardware. Whether the func-

What is claimed is:

1. A data transmission method, comprising:
    generating a signaling field of a physical layer protocol data unit (PPDU), wherein:
        a channel bandwidth for transmitting the PPDU includes at least two frequency segments that include a first frequency segment, wherein:
        the channel bandwidth includes a resource unit (RU) for multi-user multiple input multiple output (MU-MIMO) transmission;
    allocating the RU to a plurality of stations;
    parking, a first station from the plurality of stations, on the first frequency segment;
    leaving unparked a second station from the plurality of stations from the first frequency segment;
    wherein:
        the signaling field includes a common field and a user specific field;
        the user specific field includes a user field corresponding to the RU;
        the user field corresponding to the RU is a user field of the first station; and
        the common field includes a resource unit allocation subfield corresponding to the RU that indicates the RU and a quantity of user fields corresponding to the RU; and
    sending the signaling field on the first frequency segment.

2. The method according to claim 1, wherein:
    the user field includes a station identifier indication field and a spatial stream allocation indication field;
    the station identifier indication field indicates a station identifier corresponding to the user field;
    the spatial stream allocation indication field includes a starting spatial stream subfield and a number of spatial streams subfield;
    the starting spatial stream subfield indicates a first spatial stream allocated to a station corresponding to the station identifier; and
    the number of spatial streams subfield indicates a quantity of spatial streams allocated to the station corresponding to the station identifier.

3. The method according to claim 1, wherein:
    the user field includes a station identifier indication field and a spatial stream allocation indication field;
    the station identifier indication field indicates a station identifier corresponding to the user field;
    the spatial stream allocation indication field indicates a spatial stream allocated to each of the plurality of stations according to a station sequence corresponding to a spatial stream allocation;
    the station sequence includes an arrangement order of the plurality of stations; and
    the signaling field further includes a special user field that indicates a quantity of the plurality of stations and indicates a sequence location, in the station sequence, of the first station.

4. The method according to claim 1, wherein:
    the common field includes one or more resource unit allocation subfields; and
    at least one RU indicated by any of the one or more resource unit allocation subfields is allocated to the first station.

5. The method according to claim 1, wherein parking the first station on the first frequency segment, further comprises parking the first station on at least one additional frequency segment of the at least two of frequency segments.

6. The method according to claim 1, wherein parking the first station on the first frequency segment comprises establishing a semi-static relationship between the first frequency segment and the first station.

7. The method according to claim 1, further comprising parking a third station of the plurality of stations on the first frequency segment while the first station is parked on the first frequency segment.

8. A communication apparatus, comprising:
    a processor, configured to generate a signaling field of a physical layer protocol data unit (PPDU), wherein:
        a channel bandwidth for transmitting the PPDU includes at least two frequency segments;
        the at least two frequency segments includes a first frequency segment;
        the channel bandwidth includes a resource unit (RU) for multi-user multiple input multiple output (MU-MIMO) transmission;
        the RU is allocated to a plurality of stations, and the plurality of stations include a first station parking on the first frequency segment and a second station not parking on the first frequency segment;
        the signaling field includes a common field and a user specific field;
        the user specific field includes a user field corresponding to the RU;
        the user field corresponding to the RU is a user field of the first station;
        the common field includes a resource unit allocation subfield corresponding to the RU that indicates the RU and a quantity of user fields corresponding to the RU; and
    a transceiver, configured to send the signaling field on the first frequency segment.

9. The apparatus according to claim 8, wherein:
    the user field includes a station identifier indication field and a spatial stream allocation indication field;
    the station identifier indication field indicates a station identifier corresponding to the user field;
    the spatial stream allocation indication field includes a starting spatial stream subfield and a number of spatial streams subfield;
    the starting spatial stream subfield indicates a first spatial stream allocated to a station corresponding to the station identifier; and the number of spatial streams subfield indicates a quantity of spatial streams allocated to the station corresponding to the station identifier.

10. The apparatus according to claim 8, wherein:
the user field includes a station identifier indication field and a spatial stream allocation indication field;
the station identifier indication field indicates a station identifier corresponding to the user field;
the spatial stream allocation indication field indicates a spatial stream allocated to each of the plurality of stations according to a station sequence corresponding to a spatial stream allocation;
the station sequence includes an arrangement order of the plurality of stations; and
the signaling field further includes a special user field that indicates a quantity of the plurality of stations and indicates a sequence location, in the station sequence, of the first station.

11. The apparatus according to claim 8, wherein:
the common field includes one or more resource unit allocation subfields; and
at least one RU indicated by any of the one or more resource unit allocation subfields is allocated to the first station.

12. The apparatus according to claim 8, wherein the first station is parked on the first frequency segment and on at least one additional frequency segment of the at least two of frequency segments.

13. The apparatus according to claim 8, wherein the first station parked on the first frequency segment indicates a semi-static relationship between the first frequency segment and the first station.

14. The apparatus according to claim 8, wherein a third station of the plurality of stations is parked on the first frequency segment while the first station is parked on the first frequency segment.

15. A communication apparatus, comprising:
a transceiver, configured to receive, by a first station parking on a first frequency segment, a signaling field of a physical layer protocol data unit (PPDU) on the first frequency segment, wherein:
a channel bandwidth for transmitting the PPDU includes at least two frequency segments;
the at least two frequency segments includes the first frequency segment;
the channel bandwidth includes a resource unit (RU) for multi-user multiple input multiple output (MU-MIMO) transmission;
the RU is allocated to a plurality of stations;
the plurality of stations includes the first station and a second station not parking on the first frequency segment;
the signaling field includes a common field and a user specific field that includes a user field corresponding to the RU;
the user field corresponding to the RU is a user field of the first station; and
the common field includes a resource unit allocation subfield corresponding to the RU that indicates the RU and a quantity of user fields corresponding to the RU; and
a processor, configured to obtain, from the signaling field, a user field carrying an identifier of the first station, and obtain data transmitted on an RU corresponding to the user field carrying the identifier of the first station.

16. The apparatus according to claim 15, wherein:
the user field includes a station identifier indication field and a spatial stream allocation indication field;
the station identifier indication field indicates a station identifier corresponding to the user field; and
the spatial stream allocation indication field includes a starting spatial stream subfield and a number of spatial streams subfield;
the starting spatial stream subfield indicates a first spatial stream allocated to a station corresponding to the station identifier; and
the number of spatial streams subfield indicates a quantity of spatial streams allocated to the station corresponding to the station identifier.

17. The apparatus according to claim 15, wherein:
the user field includes a station identifier indication field and a spatial stream allocation indication field;
the station identifier indication field indicates a station identifier corresponding to the user field;
the spatial stream allocation indication field indicates a spatial stream allocated to each of the plurality of stations according to a station sequence corresponding to a spatial stream allocation;
the station sequence includes an arrangement order of the plurality of stations; and
the signaling field further includes a special user field that indicates a quantity of the plurality of stations and indicates a sequence location, in the station sequence, of the first station.

18. The apparatus according to claim 15, wherein:
the common field includes one or more resource unit allocation subfields; and
at least one RU indicated by any resource unit allocation subfield is allocated to the first station.

19. The apparatus according to claim 15, wherein the first station is parked on the first frequency segment and on at least one additional frequency segment of the at least two of frequency segments.

20. The apparatus according to claim 15, wherein the first station parked on the first frequency segment indicates a semi-static relationship between the first frequency segment and the first station.

* * * * *